US006885499B1

(12) United States Patent
Hoshida et al.

(10) Patent No.: US 6,885,499 B1
(45) Date of Patent: Apr. 26, 2005

(54) OPTICAL AMPLIFYING APPARATUS FOR AMPLIFYING WIDE-WAVELENGTH-BAND LIGHT, OPTICAL SENDING APPARATUS, OPTICAL TRANSMISSION SYSTEM, AND OPTICAL AMPLIFYING METHOD

(75) Inventors: Takeshi Hoshida, Richardson, TX (US); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/635,431

(22) Filed: Aug. 10, 2000

(30) Foreign Application Priority Data

Aug. 12, 1999 (JP) .......................................... 11-228545

(51) Int. Cl.[7] ................................................. H01S 3/00
(52) U.S. Cl. ............... 359/337; 359/337.1; 359/337.12; 359/341.41; 359/341.42
(58) Field of Search ....................... 359/341.41, 341.42, 359/337, 337.1, 337.12, 337.13

(56) References Cited

U.S. PATENT DOCUMENTS

| | | | | |
|---|---|---|---|---|
| 4,945,531 A | * | 7/1990 | Suzuki ........................ | 398/91 |
| 5,696,707 A | * | 12/1997 | Hentschel et al. ............ | 702/69 |
| 5,790,289 A | * | 8/1998 | Taga et al. ................... | 359/124 |
| 5,870,217 A | * | 2/1999 | Itou et al. .................... | 359/179 |
| 5,896,221 A | * | 4/1999 | Saeki ...................... | 359/341.42 |
| 6,072,601 A | * | 6/2000 | Toyohara et al. ........... | 359/484 |
| 9,088,152 | * | 7/2000 | Berger et al. ............... | 359/334 |
| 6,151,160 A | * | 11/2000 | Ma et al. .................... | 359/124 |
| 6,160,658 A | * | 12/2000 | Ishikawa .................... | 359/337 |
| 6,198,571 B1 | * | 3/2001 | Yang .......................... | 359/337 |
| 6,204,945 B1 | * | 3/2001 | Iwata et al. ................. | 359/124 |

FOREIGN PATENT DOCUMENTS

| | | | | |
|---|---|---|---|---|
| EP | 543 570 A2 | 5/1993 | ........... | H04B/10/18 |
| EP | 749 224 A2 | 12/1996 | ........... | H04J/14/02 |
| EP | 818 894 A2 | 1/1998 | ......... | H04B/10/155 |
| FR | 2 766 999 | 2/1999 | ........... | H04J/14/02 |
| WO | 99/17485 | 4/1999 | ........... | H04J/14/02 |

OTHER PUBLICATIONS

Sun, Y. et al., "A gain–flattened ultra wide band EDFA for high capacity WDM optical communications systems," ECOC '98, Sep. 20–24, 1998, Madrid, Spain, pp. 53–55.*

(Continued)

Primary Examiner—Nelson Moskowitz
Assistant Examiner—Stephen C. Cunningham
(74) Attorney, Agent, or Firm—Staas & Halsey LLP

(57) ABSTRACT

There are provided a plurality of optical adjusting sections, a wavelength-multiplexing section, and a control section. The plurality of optical adjusting sections, which are provided for respective wavelength bands, amplifies light beams in the respective wavelength bands. The wavelength-multiplexing section wavelength-multiplexes amplified light beams in the respective wavelength bands. The control section controls the outputs of the respective optical amplifying sections so that optical powers of the respective wavelength bands will become approximately identical at a predetermined point when wavelength-multiplexed light of the light beams in the respective wavelength bands travels to the predetermined point. This configuration makes it possible to eliminate optical power deviations between wavelength bands that would otherwise occur when an optical signal of a plurality of wavelength bands is transmitted, and to thereby make optical SNRs uniform.

45 Claims, 23 Drawing Sheets

OTHER PUBLICATIONS

Emori et al. "100 nm bandwidth flat gain Raman amplifiers pumped and gain–equalized by 12–wavelength–channel WDM hight power laser diodes" Feb. 21–26, 1999 OFC/IOOC '99 Tech. Digest. pp. PD19/1–PD19/3.*

Emori et al. "100 nm bandwidth flat–gain Raman amplifiers pumped and gain–equalised by 122–wavelength–channel WDM lase diode unit" Aug. 5, 1999. Electronics Letters vol. 35 No. 16 pp. 1355–1356.*

Patent Abstracts of Japan, of JP (A) No. Hei 10–229238 dated Aug. 25, 1998.

Patent Abstracts of Japan, of JP (A) No. Hei 11–103287 dated Apr. 13, 1999.

Kani, Jun–ichi et al, "Trinal–Wavelength Band WDM Transmission over Dispersion–Shifted Fiber", p. 490.

Sun, Y. et al., "A Gain–Flattened Ultra Wide Band EDFA for High Capacity WDM Optical Communications Systems", *ECOC '98*, Sep. 20–24, 1998, Madrid, Spain, pp. 53–55.

"Optical Fiber Communication Technology".

X.Y. Zou, S.M. Hwang and A.E. Wilner, "Compensation of Nonuniform Gain Induced By Raman Scattering and EDFAs in Ultralong–Distance WDM Links", Feb. 26, 1995, OFC '95 Technical Digest, pp. 152–153.

* cited by examiner

FIG. 3
A.
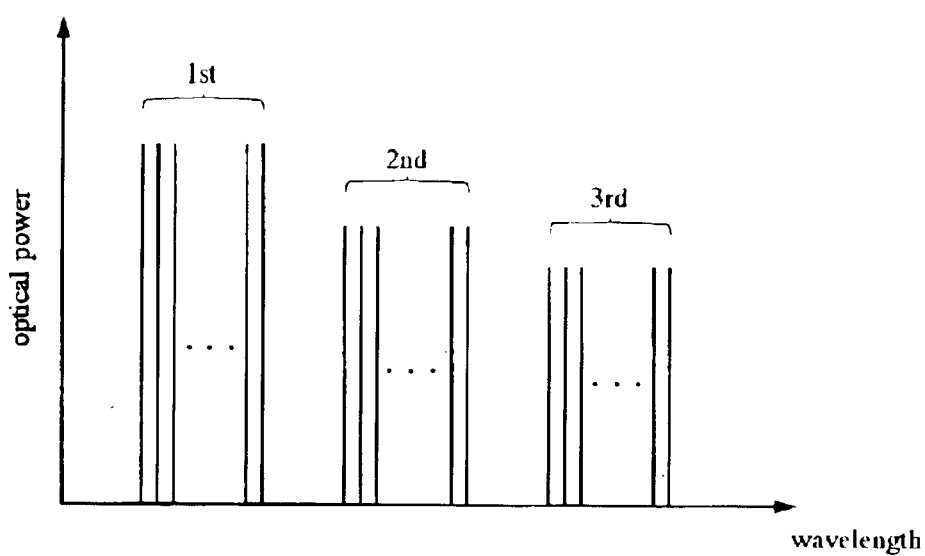
B.
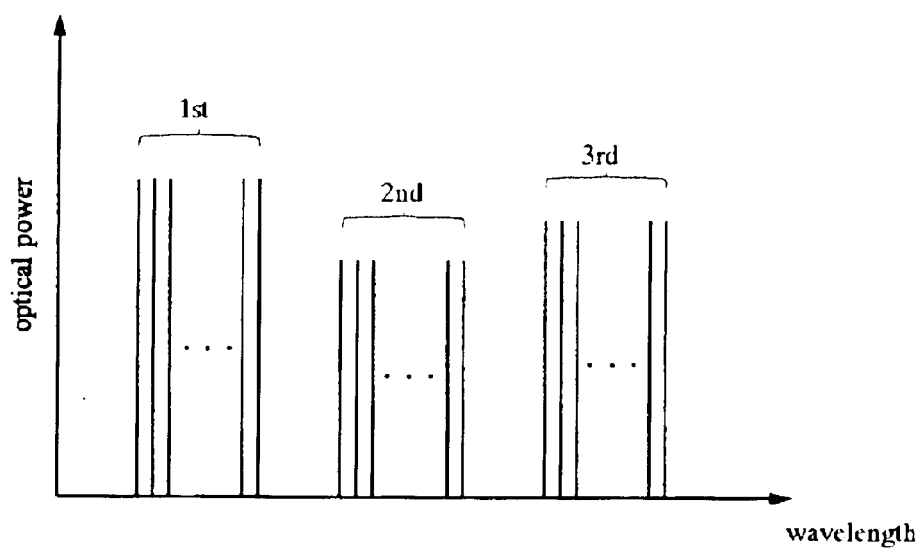

FIG. 4
A.
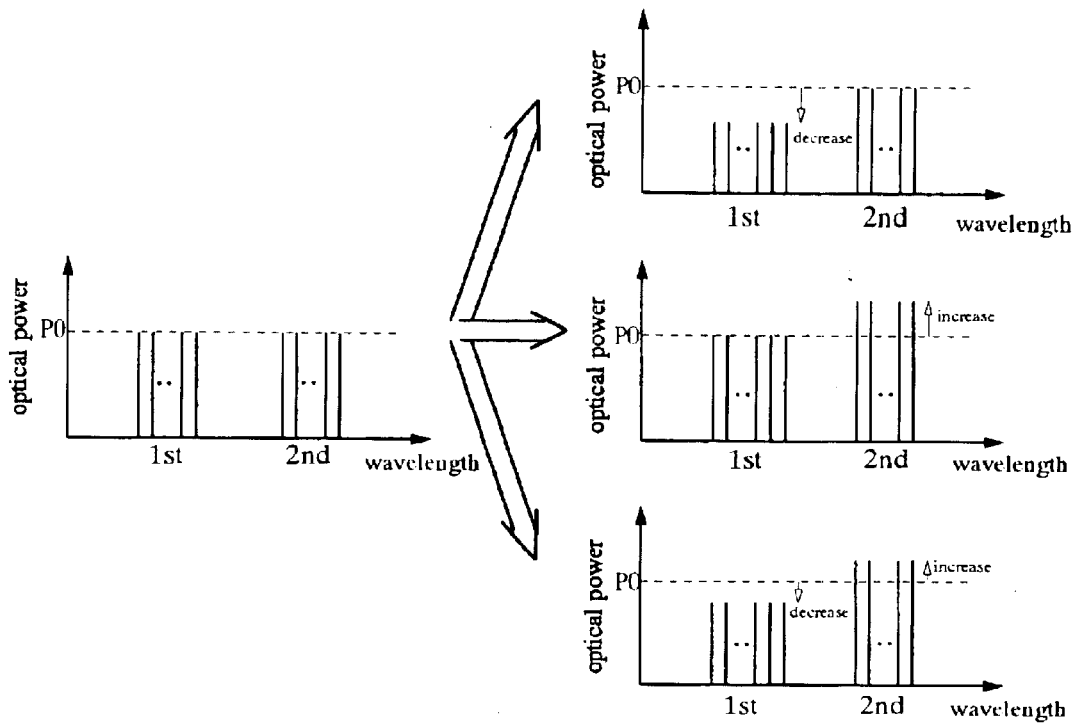
B.
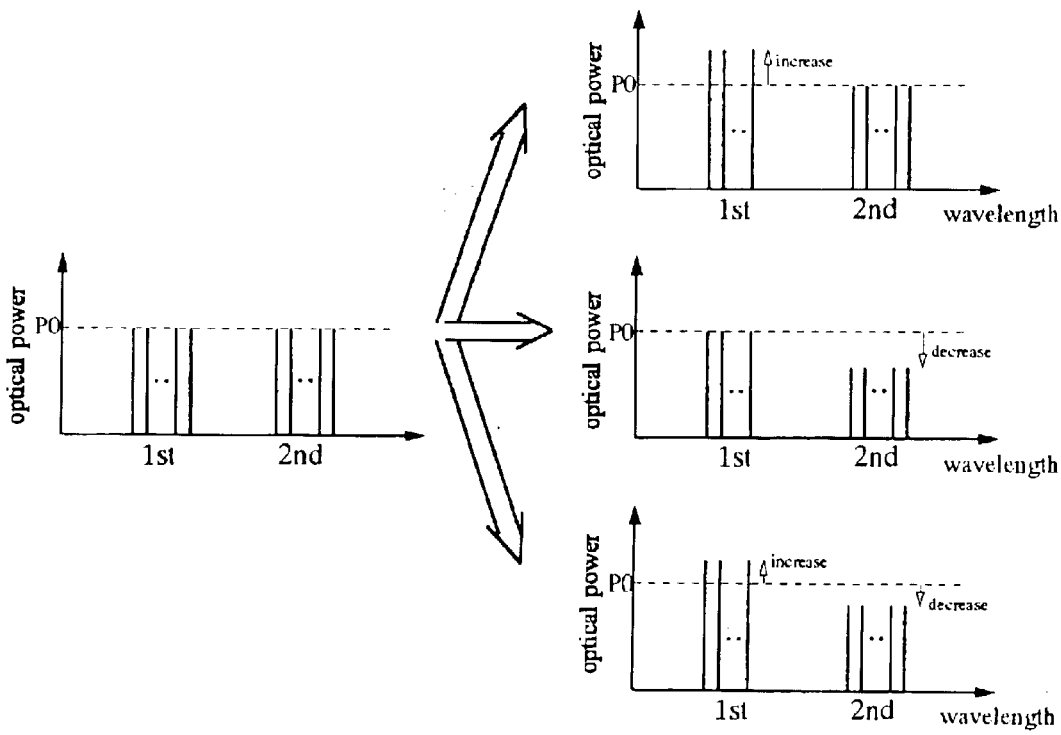

FIG. 5
A.
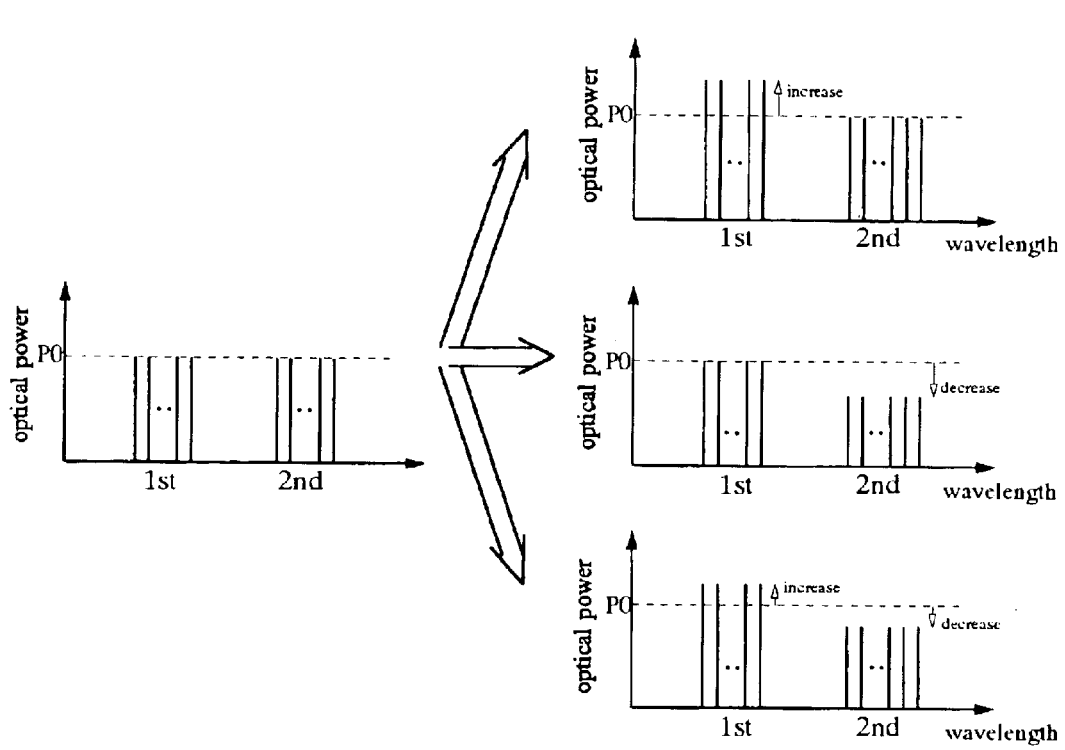
B.
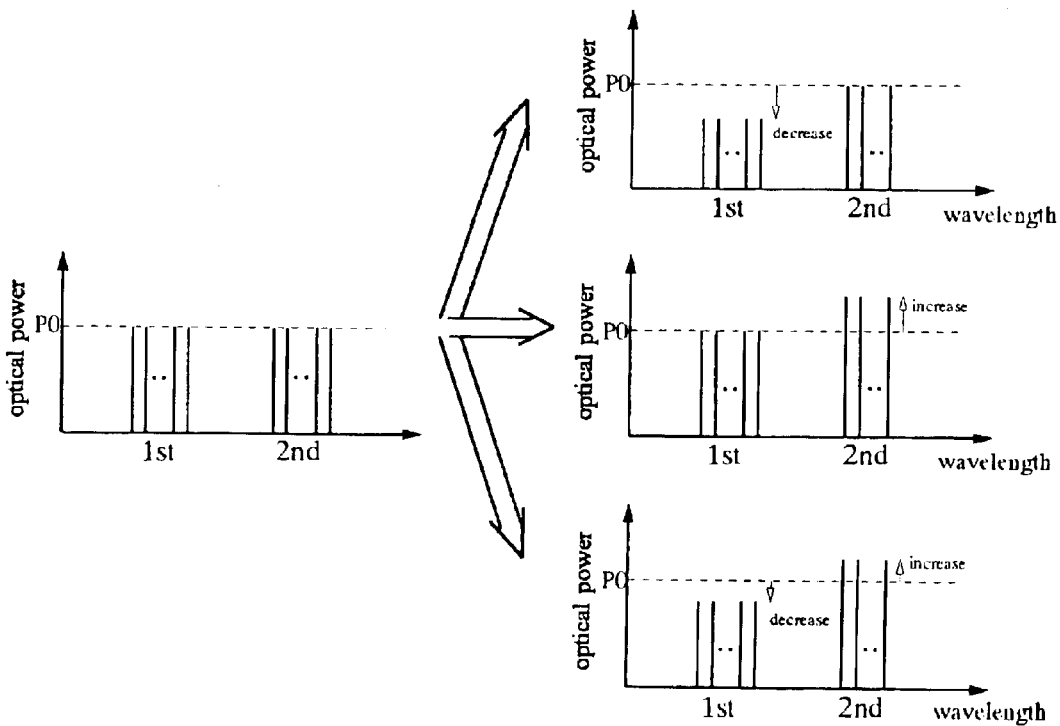

F I G. 9
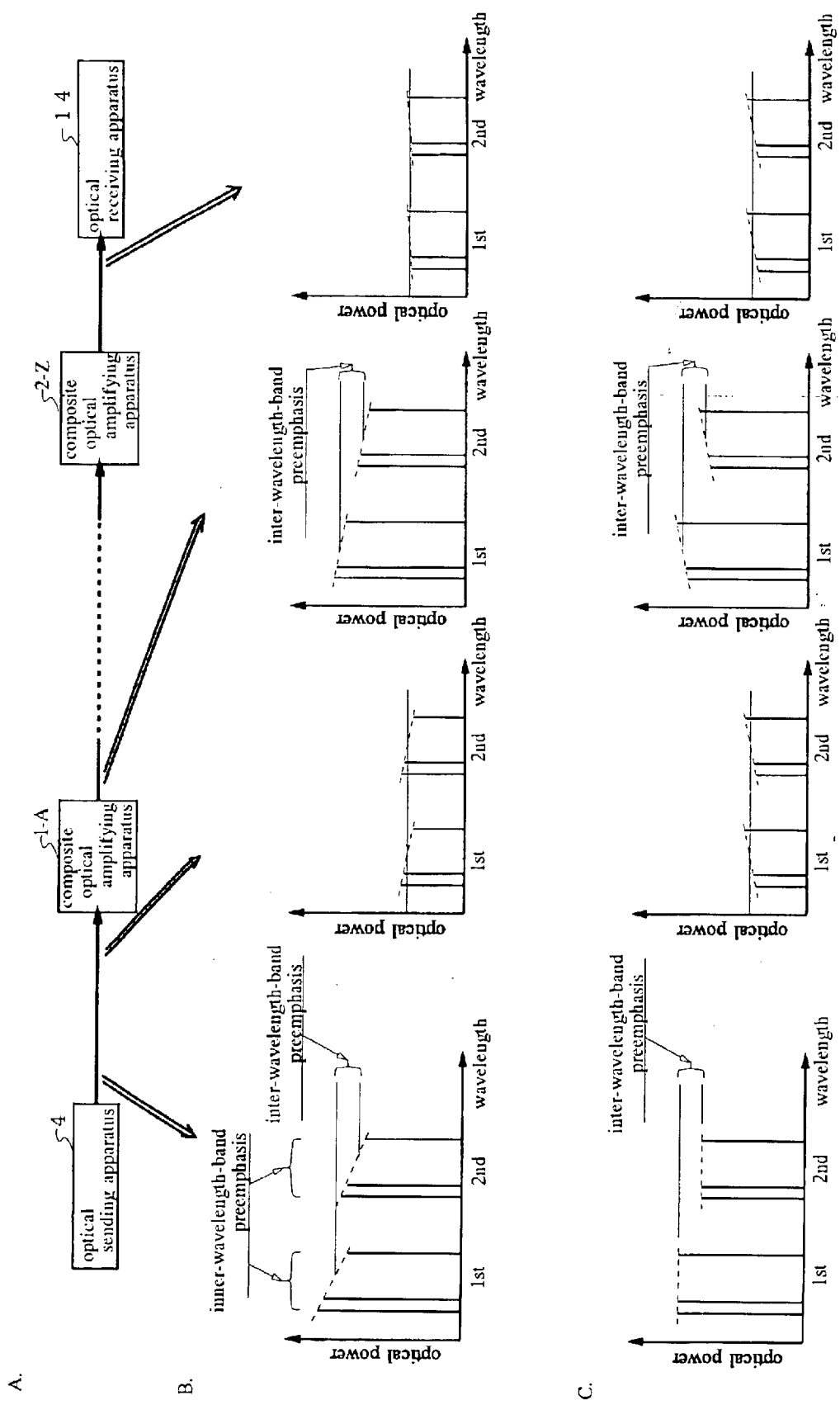

FIG. 15
A.
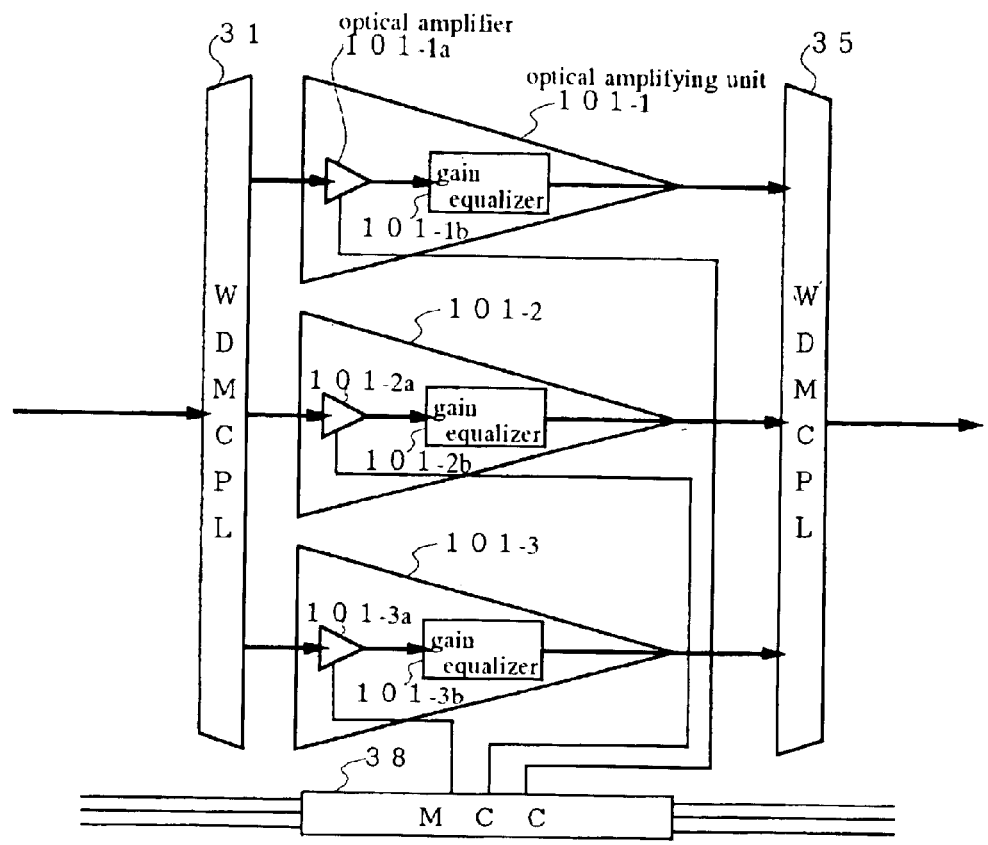
B.
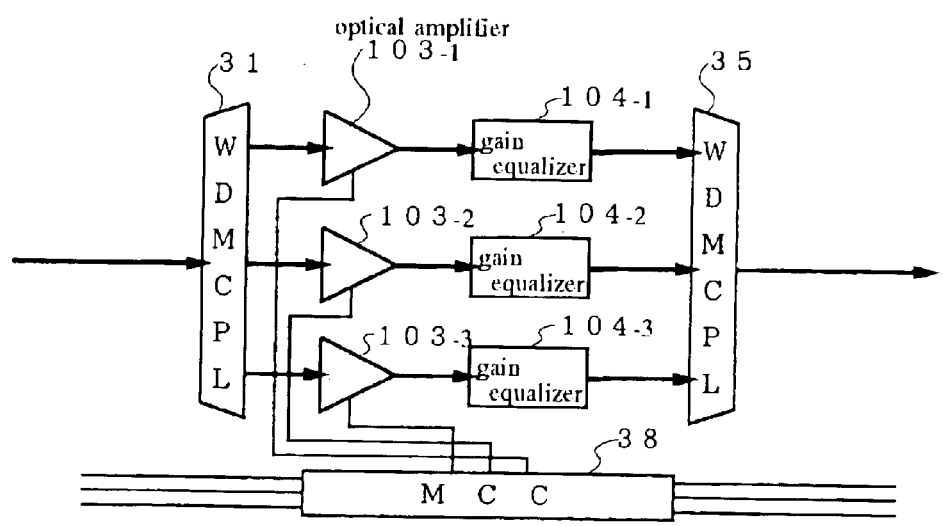

FIG. 16
A.
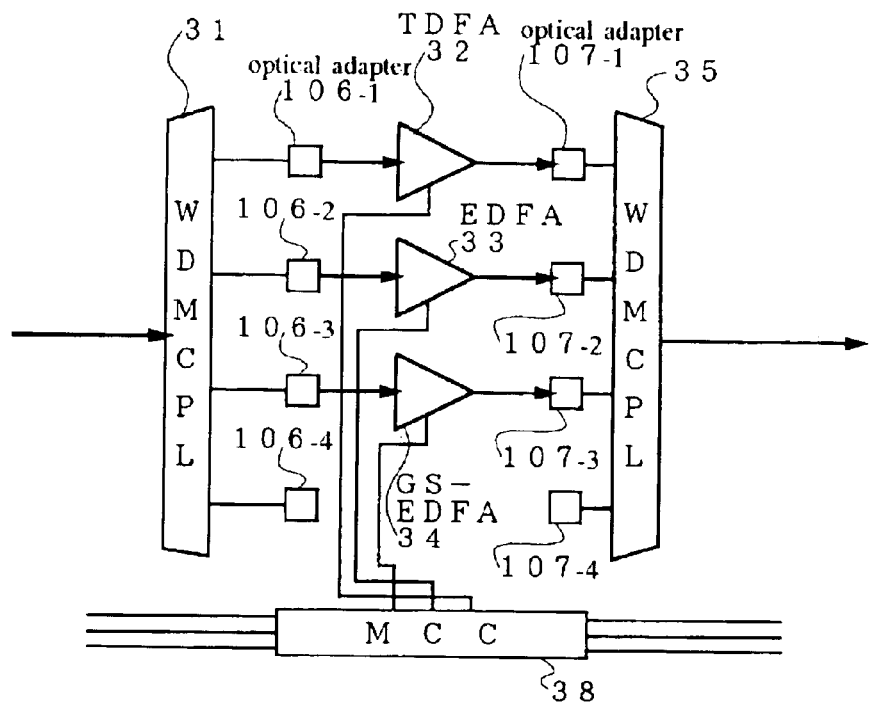
B.
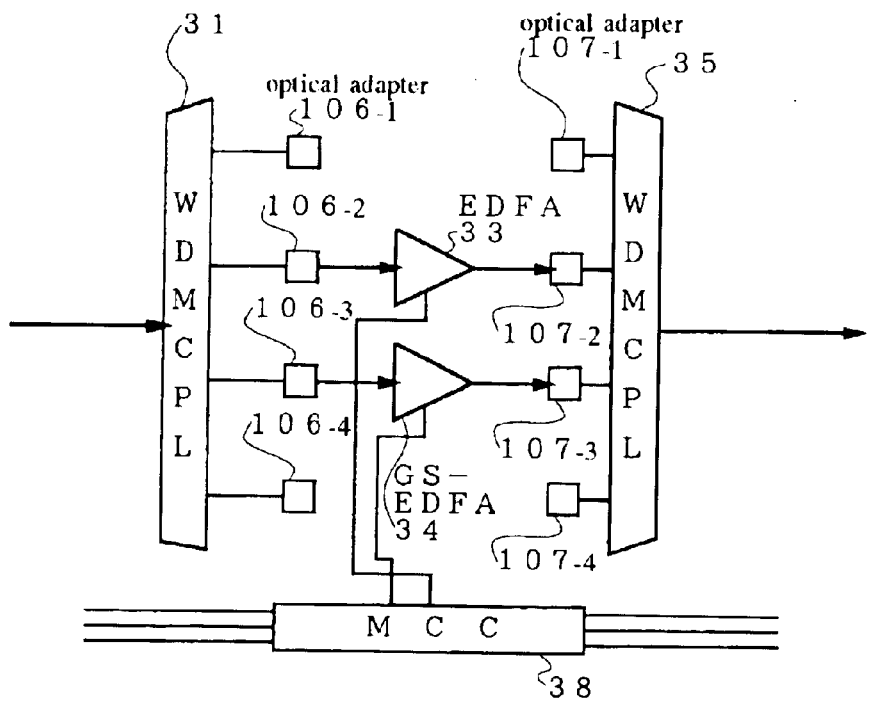

OPTICAL AMPLIFYING APPARATUS FOR AMPLIFYING WIDE-WAVELENGTH-BAND LIGHT, OPTICAL SENDING APPARATUS, OPTICAL TRANSMISSION SYSTEM, AND OPTICAL AMPLIFYING METHOD

BACKGROUND OF THE INVENTION

1. Field of the Invention

The present invention relates to an optical amplifying apparatus that has optical amplifiers corresponding to respective wavelength bands and can almost equalize optical powers of the respective wavelength bands at a point that an optical signal reaches after traveling a predetermined distance by controlling the outputs of the respective optical amplifiers, as well as to a related optical sending apparatus. The invention also relates to an optical transmission system using these apparatuses as an optical repeater. The invention further relates to an optical amplifying method in an optical amplifying apparatus that has optical amplifiers corresponding to respective wavelength bands.

To construct future multimedia networks, ultra-long-distance, large-capacity optical transmission systems are now required. The wavelength-division multiplexing (hereinafter abbreviated as WDM) is now researched and developed as a scheme for realizing such increase in capacity, because of its capability of effectively utilizing wide bandwidth and large capacity of optical fibers and other advantages.

In particular, with demand for enhancement of the WDM in bandwidth and the number of usable wavelengths, optical amplifying apparatuses for amplifying WDM optical signals that are increased in bandwidth and the number of wavelengths are now researched and developed extensively.

2. Description of the Related Art

An optical amplifying apparatus for amplifying WDM optical signals that are increased in bandwidth and the number of wavelengths was reported ("Trinal-wavelength-band WDM transmission over dispersion-shifted fiber", Jun-ichi Kani et al., 1999 IEICE General Conference).

Referring to FIG. 23 that is drawn based on the above report, 16 laser diodes (hereinafter abbreviated as LDS) 150-1 to 150-16 emit laser beams having wavelengths that correspond to channel-1 to channel 16 of the S$^+$ band, respectively. The emitted laser beams are input to an arrayed waveguide grating (hereinafter abbreviated as AWG) 151-1. The AWG 151-1 generates WDM light by wavelength-multiplexing the laser beams of channel-1 to channel-16. The WDM light is input to a Mach-Zehnder interferometer type optical modulator (hereinafter abbreviated as "MZ modulator") 152-1, where it is modulated with information to be transmitted and thereby converted into a WDM optical signal. The WDM optical signal is input to a thulium-doped fiber amplifier (hereinafter abbreviated as TDFA) 153. Being a rare-earth-element-doped fiber amplifier that amplifies light in a 1,450-nm band, the TDFA 153 can amplify an S$^+$-band WDM optical signal. The amplified WDM optical signal is input to a wavelength-multiplexing coupler (hereinafter referred to as "WDM coupler") 156 that is a dielectric multilayer optical filter.

A C-band WDM optical signal is generated by a block that is similar to the above block and is composed of LDs 150-17 to 150-32, an AWG 151-2, an MZ modulator 152-2, and an erbium-doped fiber amplifier (hereinafter abbreviated as EDFA) 154 that is provided instead of the TDFA 153 and performs amplification in a 1,550 nm band. The C-band WDM optical signal is input to the WDM coupler 156.

An L-band WDM optical signal is generated by a block that is similar to the above block and is composed of LDs 150-33 to 150-48, an AWG 151-3, an MZ modulator 152-3, and a gain-shifted erbium-doped fiber amplifier (hereinafter abbreviated as GS-EDFA) 155 that is provided instead of the TDFA 153 and performs amplification in a 1,580 nm band. The L-band WDM optical signal is input to the WDM coupler 156.

The WDM coupler 156 generates a three-wavelength-band WDM optical signal by wavelength-multiplexing the S$^+$-band, C-band, and L-band WDM optical signals. The three-wavelength-band WDM optical signal is sent to an optical transmission line, that is, a dispersion-shifted fiber (hereinafter abbreviated as DSF) 157.

In the above optical transmission system, WDM optical signals that are channel-allocated to the wavelength bands of the S$^+$ band (1,450–1,490 nm), the C band (1,530–1,570 nm), and the L band (1,570–1,610 nm), respectively, are generated, amplified by the rare-earth-element-doped fiber amplifiers on a wavelength band basis, and wavelength-multiplexed into a three-wavelength-band WDM optical signal, which is sent to the optical transmission line.

Incidentally, it is known that crosstalk occurs between WDM optical signals traveling through an optical transmission line owing to nonlinear optical phenomena such as stimulated Raman scattering, four-wave mixing, and cross-phase modulation.

In particular, the stimulated Raman scattering makes optical powers of respective channels non-uniform because it causes shorter-wavelength optical power to be transferred to a longer-wavelength side through interaction with optical phonons in the optical transmission line. This causes a gain gradient and hence deteriorates the optical signal-to-noise ratios (hereinafter abbreviated as "optical SNRs") of WDM optical signals of shorter-wavelength channels.

Where a WDM optical signal is in a frequency band of 15 THz having Raman gain, the proportion D of optical power that is removed from the shortest-wavelength channel of the WDM optical signal is given by $$D = \sum_{i=1}^{N-1} \left(\frac{\lambda i}{\lambda 0}\right) \times \left(\frac{Pi\gamma iLe}{2Aeff}\right) \tag{1}$$

where N is the number of channels and $\lambda i$, $Pi$, and $\gamma i$ are the wavelength, optical power, and Raman gain coefficient, respectively, of an i-th channel. Le is the effective length of the optical transmission line and is given by $Le = \{1-\exp(-\alpha)\}/\alpha$ where $\alpha$ is the loss coefficient of the optical transmission line. Aeff is the effective core cross section of the optical transmission line.

In general, the Raman gain coefficient is triangle-approximated and given by $$\gamma i = \frac{i \Delta f \gamma p}{1.5 \times 1'0^{13}} \tag{2}$$

where $\Delta f$ is the space between channels and $\gamma p$ is the peak gain coefficient that is the maximum value of Raman gain coefficients that are obtained by the triangle approximation.

Formulae relating to the stimulated Raman scattering including the above equations are described on pp. 276–278 of "Optical Fiber Communication Technology" (supervised by Yoshihiro Konishi, The Nikkan Kogyo Shinbun, Ltd.).

It is known that if a 32-wave WDM optical signal is transmitted over a certain distance through an optical fiber, stimulated Raman scattering causes part of the optical power of channel-1 to be transferred to longer-wavelength channels and hence causes a gain gradient in the WDM signal. That is, it is known that a gain gradient due to stimulated Raman scattering occurs in a WDM optical signal in a single wavelength band.

Incidentally, it is calculated that the range of the interaction of the stimulated Raman scattering in a wavelength band around 1,550 nm covers a wide wavelength band of 130 nm or more. Therefore, when a three-wavelength-band WDM optical signal whose channels are set in three wavelength bands are transmitted over 100 km in the optical transmission system of FIG. 23, it is expected that at point X, which is the point where the transmission ends, the optical SNRs deteriorate because stimulated Raman scattering causes part of the optical power of the $S^+$ band that is a shorter-wavelength band to be transferred to the C band and the L band that are longer-wavelength bands.

Based on the above understanding, a measurement was performed to evaluate how the stimulated Raman scattering influences a two-wavelength-band WDM optical signal that is transmitted in both of the C band and L band.

Referring to FIG. 17, 32 LDs 120-1 to 120-32 emit laser beams having wavelengths that correspond to channel-1 to channel-32 of the C-band, respectively. The emitted laser beams are input to an AWG 121-1, where they are wavelength-multiplexed into WDM light. The WDM light is input to an EDFA 122 and amplified there. The amplified WDM light is input to an attenuator (hereinafter abbreviated as ATT) 123 that attenuates optical power. The WDM light whose optical power has been attenuated to a predetermined level is input to a WDM coupler 126.

L-band WDM light is generated by a block that is similar to the above block and is composed of LDs 120-33 to 120-64, an AWG 121-2, a GS-EDFA 124 that is provided instead of the EDFA 122, and an ATT 125. The generated L-band WDM light is input to a WDM coupler 126.

The WDM coupler 126 generates a two-wavelength-band WDM light by wavelength-multiplexing the C-band and L-band WDM light beams, and sends it to a single-mode fiber (hereinafter abbreviated as SMF) 127.

After being transmitted through the SMF 127 over 80 km, the two-wavelength-band WDM light is input to an optical spectrum analyzer 128 that measure the wavelength and the power of light entered.

The attenuation amounts of the respective ATTs 123 and 125 are so adjusted that the optical power of each channel in the C band and that in the L band are equalized at a point immediately downstream of the output point of the WDM coupler 126, that is, at point Y shown in FIG. 17.

In the above measurement system, WDM light beams having channels in the wavelength bands of the C band and the L band are generated, the optical powers are then adjusted on a wavelength band basis by the rare-earth-element-doped fiber amplifiers 122 and 124 and the ATTs 123 and 125, and resulting WDM light beams are wavelength-multiplexed into two-wavelength-band WDM light, which is sent to the SMF 127. Two-wavelength-band WDM light that has been transmitted through the SMF 127 over 80 km is measured by the optical spectrum analyzer 128.

Comparison between measurement results of FIGS. 18 and 19 shows that whereas in FIG. 18 the optical powers of the C band and the L band are approximately identical, in FIG. 19 (after transmission over 80 km) the optical powers of the C-band are smaller than those of the L band.

In FIGS. 18 and 19, the vertical axis represents the optical power in dBm and the horizontal axis represents the wavelength in nm. In FIG. 20, the vertical axis represents the Raman gain in dB and the horizontal axis represents the wavelength in nm.

FIG. 20 is a graph that is drawn based on FIGS. 18 and 19 to clarify the above finding. In FIG. 20, mark "x" represents optical powers that are obtained when only C-band WDM light s transmitted over 80 km, marks "▼" represent optical powers that are obtained only L-band WDM light is transmitted over 80 km, and marks "♦" represent optical powers that are obtained when both of C-band and L-band WDM light beams are transmitted over 80 km.

It is seen from FIG. 20 that when both of C-band and L-band WDM light beams are transmitted, the optical power of the C band decreases and the optical power of the L band increases, that is, the stimulated Raman scattering causes part of the power of the C band to be transferred to the L band.

The above measurement is directed to the case where C-band and L-band WDM light beams are transmitted in the same direction. A similar measurement was performed for a case where C-band and L-band WDM light beams are bidirectionally transmitted.

FIG. 21 shows a measurement system for the latter case. This measurement system is the same as the measurement system of FIG. 17 except that the block in FIG. 17 for generating L-band WDM light that is composed of the LDs 120-33 to 120-64, the AWG 120-2, the GS-EDFA 124, and the ATT 125 is provided on the side that is opposite, with respect to the SMF 127, to the side where C-band WDM light is generated and that an optical spectrum analyzer 130 for measuring a spectrum of L-band WDM light is added. Therefore, a description of the configuration of this measurement system is omitted.

In this measurement system, the optical power of generated C-band WDM light is adjusted by the EDFA 122 and the ATT 123 and resulting C-band WDM light is sent to the SMF 127. C-band WDM light that has been transmitted through the SMF 127 over 80 km is measured by the optical spectrum analyzer 128. On the other hand, the optical power of generated L-band WDM light is adjusted by the GS-EDFA 124 and the ATT 125 and resulting L-band WDM light is sent to the SMF 127. L-band WDM light that has been transmitted through the SMF 127 over 80 km is measured by the optical spectrum analyzer 130.

The ATTs 123 and 125 make such adjustments as to equalize the optical power of each channel in the C band at point Z1 (see FIG. 21) and that in the L band at point Z2 (see FIG. 21).

It is seen from a measurement result of FIG. 22 that the phenomenon that part of the optical power of the C band is transferred to the L band occurs in the same manner in the unidirectional transmission and the bidirectional transmission.

In FIG. 22, the vertical axis represents the Raman gain in dB and the horizontal axis represents the wavelength in nm. Marks "♦" represent optical powers in the unidirectional transmission that were transferred from FIG. 20 and marks "■" represent optical powers in the bidirectional transmission.

It is seen from FIGS. 19, 20, and 22 that when two-wavelength-band WDM light is transmitted, stimulated Raman scattering causes part of the power of C-band WDM light to be transferred to L-band WDM light. That is, the stimulated Raman scattering causes part of the power of WDM light in a shorter-wavelength band to be transferred to WDM light in a longer-wavelength band. As a result, when n-wavelength-band WDM light is transmitted, optical power deviations occur between the wavelength bands and the optical SNRs of WDM light beams in shorter-wavelength bands are lowered.

In particular, as is understood from Equation (1), the optical SNRs deteriorate more in the case of ultra-long-distance transmission because Pi and Le become larger in that case.

SUMMARY OF THE INVENTION

An object of the present invention is to provide an optical amplifying apparatus, an optical sending apparatus, and an optical transmission system that are free of deviations between optical powers of respective wavelength bands after transmission of wide-wavelength-band light.

Another object of the invention is to provide an optical transmission system that increases the optical SNRs after transmission of optical signals when transmitting wide-wavelength-band light.

A further object of the invention is to provide an optical amplifying method that is free of deviations between optical powers of respective wavelength bands after transmission of wide-wavelength-band light.

The above objects are attained by an apparatus having a plurality of optical adjusting sections, a wavelength-multiplexing section, and a control section in which the control section controls the outputs of the optical adjusting sections so that optical power of light in a shorter-wavelength band becomes larger than optical power of light in a longer-wavelength band.

Examples of an optical adjusting section are optical amplifiers and optical attenuators. A control section, for example, may adjust the outputs of the plurality of optical adjusting sections by referring to optical powers of light beams in the respective wavelength bands of wavelength-multiplexed light that has been transmitted by a predetermined distance. Alternatively, the control section, as another example, may adjust the outputs of the optical adjusting sections by referring to optical powers of part of light beams in the respective wavelength bands of wavelength-multiplexed light that has been transmitted by a predetermined distance.

Since the above apparatus can control the outputs of the optical adjusting sections, it can eliminate deviations between the wavelength bands that would otherwise occur due to wavelength-dependent amplification and losses such as stimulated Raman scattering and a loss in an optical transmission line, a loss in a wavelength-demultiplexing section, and a loss in the wavelength-multiplexing section, and hence can increase the optical SNRS. Therefore, the above apparatus can improve the performance of the entire optical transmission system.

Here the further objects and features of the invention will become apparent from the following description to be made with reference to the accompanying drawings.

BRIEF DESCRIPTION OF THE DRAWINGS

The nature, principle, and utility of the invention will become more apparent from the following detailed description when read in conjunction with the accompanying drawings in which like arts are designated by identical reference numerals, in which:

FIGS. 3A and 3B show examples of inter-wavelength-band preemphasis;

FIGS. 4A and 4B show a case where the number of channels in a first wavelength band is increased and decreased, respectively;

FIGS. 5A and 5B show a case where the number of channels in a second wavelength band is increased and decreased, respectively;

FIGS. 9A–9C illustrate the operation of the optical transmission system of FIG. 8;

FIGS. 15A and 15B show composite optical amplifying apparatuses in which the gain-wavelength characteristic of each optical amplifier is compensated for by using a gain equalizer that is an optical filter;

FIGS. 16A and 16B show a composite optical amplifying apparatus that enables decrease and increase in the number of wavelength bands;

DESCRIPTION OF THE PREFERRED EMBODIMENTS

Figure 1:
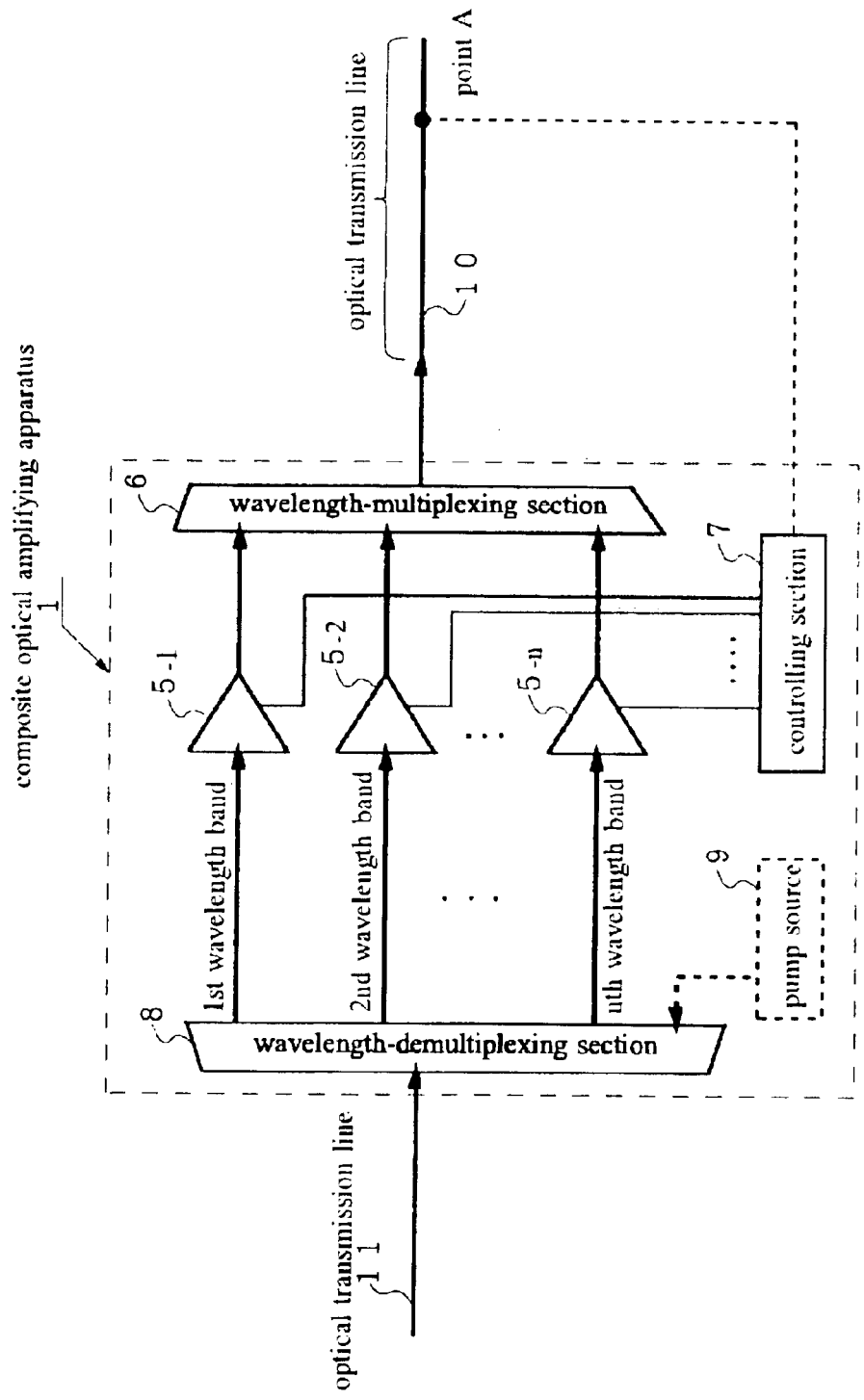
FIG. 1 is a block diagram of a composite optical amplifying apparatus according to a first embodiment of the present invention.

Embodiments of the invention will be described with reference to the accompanying drawings. In these Figures, the same constructions are designated by the same reference numerals, and their repeated description may be omitted.

Embodiment 1

As shown in FIG. 1, a composite optical amplifying apparatus 1 is composed of a wavelength-demultiplexing section 8, a plurality of optical amplifying sections 5-1 to 5-n, a wavelength-multiplexing section 6, and a control section 7.

Input light that has traveled through an optical transmission line 11 is input to the wavelength-demultiplexing section 8. The wavelength-demultiplexing section 8 demultiplexes the input light into light beams in predetermined wavelength bands and outputs the demultiplexed light beams in a separated manner.

The demultiplexed light beams in the respective wavelength bands are input to the respective optical amplifying sections 5-1 to 5-n. Provided for the respective wavelength bands of light beams to receive, the optical amplifying sections 5-1 to 5-n amplify the light beams in the respective wavelength bands.

The control section 7 controls the optical amplifying sections 5-1 to 5-n so that the output of an optical amplifying section among the optical amplifying sections 5-1 to 5-n that amplifies light in a shorter-wavelength band becomes larger than the output of an optical amplifying section among the optical amplifying sections 5-1 to 5-n that amplifies light in a longer-wavelength band.

Light beams in the respective wavelength bands that have been amplified by the respective optical amplifying sections 5-1 to 5-n are input to the wavelength-multiplexing section 6 and wavelength-multiplexed there. The wavelength-multiplexed light beams in the respective wavelengths are output to an optical transmission line 10 that is connected to the wavelength-multiplexing section 6.

The optical transmission line 10 is not limited to an optical fiber and may be a space filled with a gas.

Next, the operation principle and the advantageous effects of the first embodiment will be described.

The factors of varying the optical power of light being transmitted through the optical transmission line 10 are the stimulated Raman scattering (SRS), the loss in the optical transmission line 10, the loss in the wavelength-demultiplexing section 8, and the loss in the wavelength-multiplexing section 6. Those factors depend on the wavelength.

The reason why the loss in the wavelength-demultiplexing section 8 is taken into consideration is that the optical SNR of an optical signal that has been transmitted over a certain distance depends on the input power and the noise figure of each of the optical amplifying sections 5-1 to 5-n. Since the loss in the wavelength-demultiplexing section 8 and the loss in the wavelength-multiplexing section 6 exhibit the same characteristic, they will be dealt with as the loss in a wavelength-multiplexing/demultiplexing section. The dependence on the noise figure of the optical SNR of an optical signal that has been transmitted over a certain distance will be described later with reference to FIG. 2E.

Although the following description will be directed to a case of three wavelength bands to simplify the description, a case of an arbitrary number of wavelength bands can be explained in a similar manner.

Figure 2:
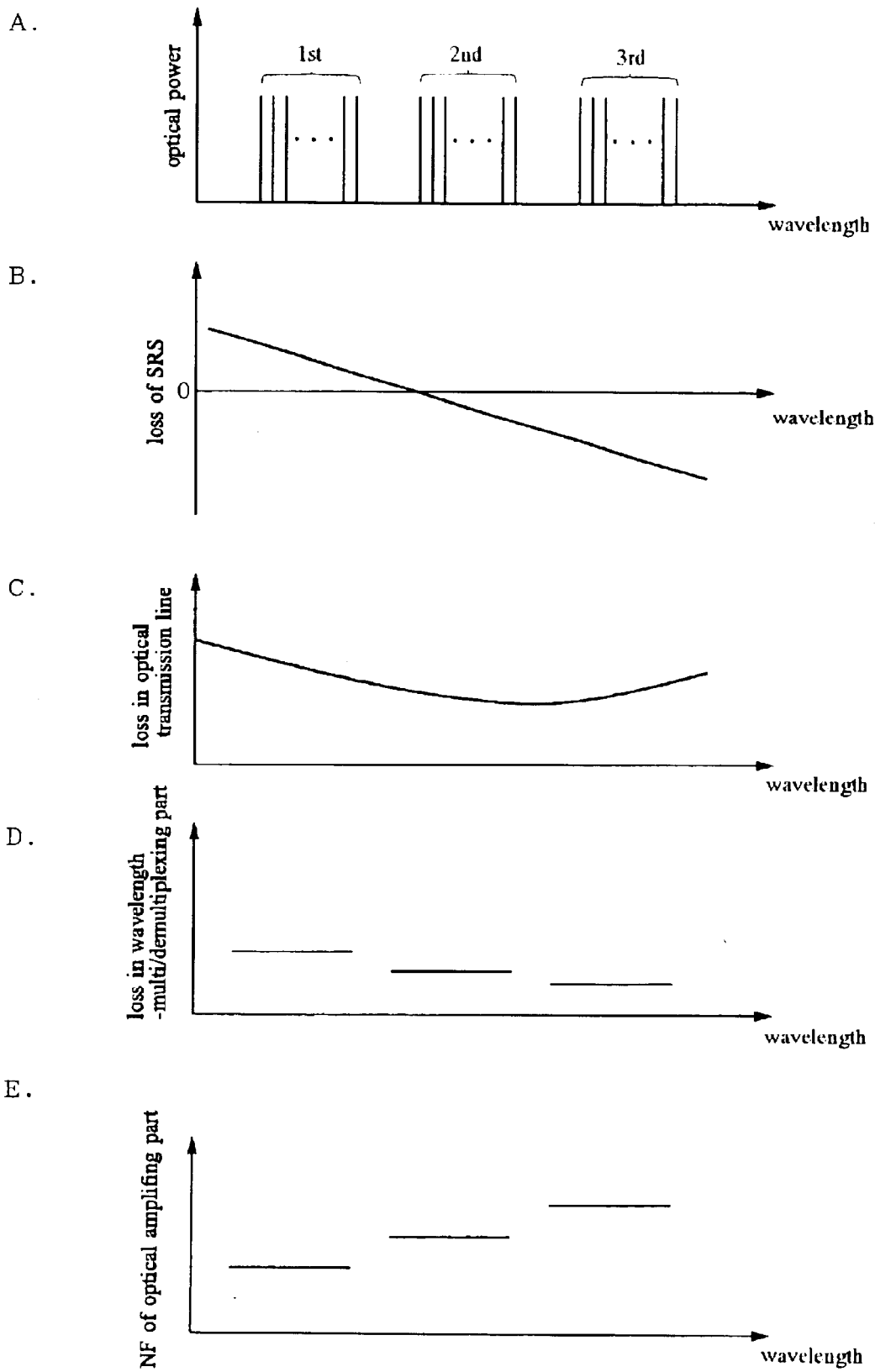
FIGS. 2A–2E illustrate the principle of operation of the optical amplifying apparatus of FIG. 1.

FIG. 2A shows light that is transmitted through the optical transmission line 10, for example, a three-wavelength-band WDM optical signal consisting of a WDM optical signal in a first wavelength band, a WDM optical signal in a second wavelength band, and a WDM optical signal in a third wavelength band.

FIG. 2B shows an example of the loss due to the stimulated Raman scattering in the above wavelength bands. As seen from FIGS. 2A and 2B, the stimulated Raman scattering causes part of the optical power of the first wavelength band to be transferred to the second and third wavelength bands and also causes part of the optical power of the second wavelength band to be transferred to the third wavelength band. As a result, the optical powers of the respective wavelength bands increase or decrease.

FIG. 2C shows an example of the loss in the optical transmission line 10. As shown in FIG. 2C, the loss in the optical transmission line 10 depends on the wavelength of light transmitted. In general, optical transmission lines have a loss-wavelength characteristic that the loss has a minimum value at a particular wavelength.

FIG. 2D shows an example of the loss in the wavelength-multiplexing/demultiplexing section. In particular, an interference filter type optical multi/demultiplexer such as a dielectric multilayer optical filter multiplexes light beams (or demultiplexes a light beam) on a wavelength band basis in a step-like manner. Therefore, light that is added (or separated) at the first stage passes through a different number of interference filters and hence is given a different loss than light that is added (or separated) at the last stage.

FIG. 2E shows an example of the noise figures (NF) of the optical amplifying sections 5-1 to 5-n. In the optical amplifying sections 5-1 to 5-n, the intensity of amplified spontaneous emission (ASE) depends on the wavelength. Therefore, the noise figure of each of the optical amplifying sections 5-1 to 5-n also depends on the wavelength. The noise figure is a value obtained by dividing the input optical SNR by the output optical SNR in each of the optical amplifying sections 5-1 to 5-n and relates to the noise power.

When the three-wavelength-band WDM optical signal shown in FIG. 2A is transmitted, since the optical transmission line 10 and the wavelength-multiplexing/demultiplexing section exhibit the wavelength-dependent losses shown in FIGS. 2B–2D, the optical powers of the respective wavelength bands of the three-wavelength-band WDM optical signal have deviations after the transmission.

That is, referring to FIG. 1, the losses shown in FIG. 2D occur in the WDM optical signals in the first to third wavelength bands when they are wavelength-demultiplexed by the wavelength-demultiplexing section 8 and when they are wavelength-multiplexed by the wavelength-multiplexing section 6 after being amplified by the respective optical amplifying sections 5-1 to 5-3. While being transmitted through the optical transmission line 10 to point A, the losses shown in FIGS. 2B and 2C occur in the three-wavelength-band WDM optical signal. Because the losses depend on the wavelength, if the outputs of the optical amplifying sections 5-1 to 5-n are not adjusted, deviations occur between the optical powers of the respective wavelength bands at point A. Therefore, the SNRs vary from one wavelength band to another.

In view of the above, the optical powers of the respective wavelength bands are pre-emphasized on a wavelength band basis by adjusting the outputs of the optical amplifying sections 5-1 to 5-3 before transmission of a three-wavelength-band WDM optical signal so as to compensate for deviations that will occur in the optical powers of the respective wavelength bands.

By performing inter-wavelength-band preemphasis in this manner, losses that occur during transmission through the optical transmission line 10 can be compensated for and hence deviations between the optical powers of the respective wavelength bands after the transmission can be reduced or even be eliminated. Therefore, the optical SNR of the entire three-wavelength-band WDM optical signal can be increased.

FIGS. 3A and 3B show first and second examples, respectively, of inter-wavelength-band preemphasis.

Where the stimulated Raman scattering loss is so large that the loss in the optical transmission line 10 and the loss in the wavelength-multiplexing/demultiplexing section are negligible, the amounts of inter-wavelength-band preemphases can be calculated according to Equations (1) and (2). In this case, since the stimulated Raman scattering causes parts of the optical powers of shorter-wavelength bands to be transferred to longer-wavelength bands, satisfactory results are obtained by setting the optical powers in such a manner that the optical power of the first wavelength band is largest, the optical power of the second wavelength band is intermediate, and the optical power of the third wavelength band is smallest.

On the other hand, where the loss in the optical transmission line 10 and the loss in the wavelength-multiplexing/demultiplexing section are not negligible, drawings corresponding to FIGS. 2C and 2D are produced by actually measuring the loss in the optical transmission line 10 and the loss in the wavelength-multiplexing/demultiplexing section. The amounts of inter-wavelength-band preemphases can be calculated by using those drawings. In this case, the manner of preemphasis varies depending on the magnitude relationship among the losses. The optical powers may be set in such a manner that the optical power decreases in order of the first wavelength band, the second wavelength band, and the third wavelength band as shown in FIG. 3A. Alternatively, the optical powers may be set in such a manner that the optical power decreases in order of the first wavelength band, the third wavelength band, and the second wavelength band as shown in FIG. 3B.

Where the noise powers in the optical amplifying sections 5-1 to 5-n have no differences or have negligible differences, inter-wavelength-band preemphasis is performed in the above manner in consideration of the stimulated Raman scattering, the loss in the optical transmission line 10, and the loss in the wavelength-multiplexing/demultiplexing section. Since the composite optical amplifying apparatus 1 can almost equalize the optical powers of respective wavelength bands after transmission in this manner, the optical SNRs can be increased.

On the other hand, where noise powers in the optical amplifying sections 5-1 to 5-n have non-negligible differences, inter-wavelength-band preemphasis is performed in the following manner. Since noise powers in the optical amplifying sections 5-1 to 5-n are transmitted as they are, the inter-wavelength-band preemphases are so adjusted as to equalize optical powers obtained by eliminating noise powers in the optical amplifying sections 5-1 to 5-n for amplifying WDM optical signals in the respective wavelength bands from optical powers of the respective wavelength bands after transmission. In this manner, the optical SNRs can further be increased. The elimination of noise powers in the optical amplifying sections 5-1 to 5-n can be performed by subtracting the noise powers in the optical amplifying sections 5-1 to 5-n from optical powers of the respective wavelength bands by expressing the two kinds of powers in dB.

The optical power of each wavelength band is larger when the number of channels in each wavelength band is larger or each wavelength band is wider. Therefore, the inter-wavelength-band preemphasis is performed in such a manner that the differences between the optical powers of shorter-wavelength bands and those of longer-wavelength bands are made larger when the number of channels in each wavelength band is larger or each wavelength band is wider.

Where as described above the stimulated Raman scattering, the loss in the optical transmission line 10, and the loss in the wavelength-multiplexing/demultiplexing section can be measured in advance, satisfactory results are obtained by the control section 7's performing control according to the above principle.

In the composite optical amplifying apparatus 1, the control section 7 controls in advance the outputs of the respective optical amplifying sections 5-1 to 5-n in consideration of optical power variations that will occur in the optical transmission line 10 from the composite optical amplifying section 1 to a point that is a predetermined distance away from the composite optical amplifying section 1. Therefore, optical powers of the respective wavelength bands after transmission over the predetermined distance are made approximately identical. Therefore, where input light beams are WDM optical signals, deterioration in optical SNR at the predetermined point can be reduced. If an optical receiving apparatus for receiving and processing WDM optical signals is provided at the predetermined point where the optical SNRs of the respective wavelength bands are made uniform, the performance of the entire optical transmission system having the composite optical amplifying apparatus 1 and the optical receiving apparatus can be improved.

In the first embodiment, it is preferable that as indicated by a broken line in FIG. 1 the composite optical amplifying apparatus 1 further has a pump source 9 for supplying optical power to input light that is connected to the wavelength demultiplexing section 8, and that the wavelength-demultiplexing section 8 inputs, to the optical transmission line 11, light that is supplied from the pump source 9. In this case, the composite optical amplifying apparatus 1 can stimulated-Raman-amplify input light in the optical transmission line 11 with pump light of the pump source 9, making it possible to compensate for attenuation amounts that occur in the wavelength-demultiplexing section 8 in demultiplexing the input light.

A description will now be made of a case where input light is a two-wavelength-band WDM optical signal consisting of a WDM optical signal in a first wavelength band and a WDM optical signal in a second wavelength band that is longer in wavelength than the first wavelength band and the number of channels of a WDM optical signal is increased or decreased.

FIG. 4A shows a case where the number of channels in the first wavelength band is changed from m to m+k, and FIG. 4B shows a case where the number of channels in the first wavelength band is changed from m to m−k.

FIG. 5A shows a case where the number of channels in the second wavelength band is changed from m to m+k, and FIG. 5B shows a case where the number of channels in the second wavelength band is changed from m to m−k.

In FIGS. 4A and 4B and FIGS. 5A and 5B, the vertical axis represents the optical power and the horizontal axis represents the wavelength.

Control to be performed by the control section 7 when the number of channels of a WDM optical signal is increased or decreased will be described with reference to FIGS. 4A and 4B and FIGS. 5A and 5B.

First, control to be performed when the number of channels in the first wavelength band is increased or decreased will be described.

It is assumed that as shown in the left-hand parts of FIGS. 4A and 4B an m-wave WDM optical signal is set in the first wavelength band, an L-wave WDM optical signal is set in the second wavelength band, and the optical power of each channel is P0.

When the number of channels in the first wavelength band is increased from m to m+k in this state, since the optical power of the first wavelength band increases, the following three kinds of control are available as control to be performed by the control section 7 as shown in the right-hand parts of FIG. 4A.

In the first control, as shown in the top-right part of FIG. 4A, the optical power per channel of the first wavelength band is decreased from P0 and the optical power per channel of the second wavelength band is kept at P0. In the second control, as shown in the middle-right part of FIG. 4A, the optical power per channel of the first wavelength band is kept at P0 and the optical power per channel of the second wavelength band is increased from P0. In the third control, as shown in the bottom-right part of FIG. 4A, the optical power per channel of the first wavelength band is decreased from P0 and the optical power per channel of the second wavelength band is increased from P0.

When the number of channels in the first wavelength band is decreased from m to m−k in the state as shown the left-hand parts of FIG. 4B, since the optical power of the first wavelength band decreases, the following three kinds of control are available as control to be performed by the controlling section 7 as shown in the right-hand parts of FIG. 4B.

In the first control, as shown in the top-right part of FIG. 4B, the optical power per channel of the first wavelength band is increased from P0 and the optical power per channel of the second wavelength band is kept at P0. In the second control, as shown in the middle-right part of FIG. 4B, the optical power per channel of the first wavelength band is kept at P0 and the optical power per channel of the second wavelength band is decreased from P0. In the third control, as shown in the bottom-right part of FIG. 4B, the optical power per channel of the first wavelength band is increased from P0 and the optical power per channel of the second wavelength band is decreased from P0.

Next, control to be performed when the number of channels in the second wavelength band is increased or decreased will be described.

It is assumed that as shown in the left-hand parts of FIGS. 5A and 5B an m-wave WDM optical signal is set in the first wavelength band, an L-wave WDM optical signal is set in the second wavelength band, and the optical power of each channel is P0.

When the number of channels in the second wavelength band is increased from L to L+h in this state, since the optical power of the second wavelength band increases, the following three kinds of control are available as control to be performed by the controlling section 7 as shown in the right-hand parts of FIG. 5A.

In the first control, as shown in the top-right part of FIG. 5A, the optical power per channel of the first wavelength band is increased from P0 and the optical power per channel of the second wavelength band is kept at P0. In the second control, as shown in the middle-right part of FIG. 5A, the optical power per channel of the first wavelength band is kept at P0 and the optical power per channel of the second wavelength and is decreased from P0. In the third control, as shown in he bottom-right part of FIG. 5A, the optical power per channel f the first wavelength band is increased from P0 and the optical power per channel of the second wavelength band is decreased from P0.

When the number of channels in the second wavelength band is decreased from L to L−h in the state as shown the left-hand parts of FIG. 5B, since the optical power of the second wavelength band decreases, the following three kinds of control are available as control to be performed by the control section 7 as shown in the right-hand parts of FIG. 5B.

In the first control, as shown in the top-right part of FIG. 5B, the optical power per channel-of the first wavelength band is decreased from P0 and the optical power per channel of the second wavelength band is kept at P0. In the second control, as shown in the middle-right part of FIG. 5B, the optical power per channel of the first wavelength band is kept at P0 and the optical power per channel of the second wavelength band is increased from P0. In the third control, as shown in the bottom-right part of FIG. 5B, the optical power per channel of the first wavelength band is decreased from P0 and the optical power per channel of the second wavelength band is increased from P0.

As described above, three kinds of control are available for each of the cases of FIGS. 4A and 4B and FIGS. 5A and 5B. The control section 7 selects and performs one of the three kinds of control.

In each of the above cases, the amount of increase or decrease from P0 of the optical power per channel is determined based on the number k or h of increased or decreased channels, the wavelengths of the first and second wavelength bands, the reference optical power P0, the transmission distance to a predetermined point where the optical powers of the respective wavelength bands are to be equalized, and other factors.

As described above, when the number of channels of a WDM optical signal in the first wavelength band has been increased or decreased or the number of channels of a WDM optical signal in the second wavelength band has been increased or decreased, satisfactory results are obtained in such a manner that the control section 7 increases or decreases the output of the optical amplifying section 5-1 that amplifies the WDM optical signal in the first wavelength band or increases or decreases the output of the optical amplifying section 5-2 that amplifies the WDM optical signal in the second wavelength band so that the optical powers will become approximately identical when the WDM optical signals in the respective wavelength bands are transmitted to a predetermined point. With this control, deterioration in optical SNR at the predetermined point can be reduced.

Embodiment 2

Figure 6:
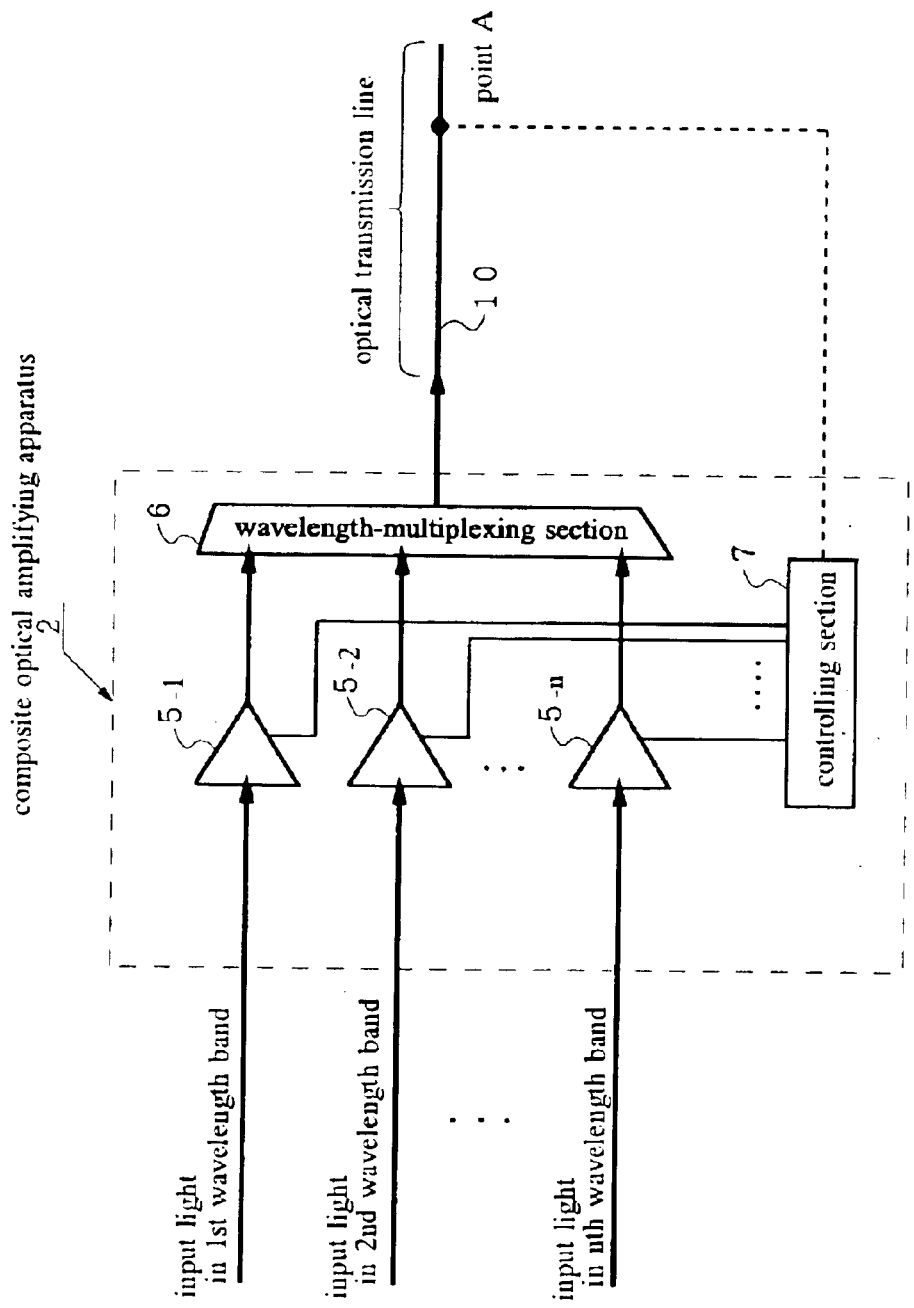
FIG. 6 is a block diagram of a composite optical amplifying apparatus according to a second embodiment of the invention.

As shown in FIG. 6, a composite optical amplifying apparatus 2 is composed of a plurality of optical amplifying sections 5-1 to 5-n, a wavelength-multiplexing section 6, and a control section 7.

Input light in a first wavelength band is input to the optical amplifying section 5-1 for amplifying light in the first wavelength band. Input light in a second wavelength band is input to the optical amplifying section 5-2 for amplifying light in the second wavelength band. Similarly, input light in an n-th wavelength band is input to the optical amplifying section 5-n for amplifying light in the n-th wavelength band. In this manner, the optical amplifying sections 5-1 to 5-n are provided for the respective wavelength bands of the input light and amplify the respective input light to predetermined optical powers under the control of the control section 7. The amplified light beams in the respective wavelength bands are input to the wavelength-multiplexing section 6, where they are wavelength-multiplexed and then output to an optical transmission line 10 that is connected to the wavelength-multiplexing section 6.

In the composite optical amplifying apparatus 2 according to the second embodiment, even if input light in a plurality of wavelength bands are input to the composite optical amplifying apparatus 2, they are input to the optical amplifying sections 5-1 to 5-n for amplifying input light in the respective wavelength bands to predetermined optical powers. Therefore, the optical powers of the light beams of the respective wavelength bands can be adjusted in a reliable manner. Therefore, even if input light in a plurality of wavelength bands are wavelength-multiplexed and then output from the composite optical amplifying apparatus 2, the optical powers of the light beams in the respective wavelength bands can be made approximately uniform at a predetermined point.

Embodiment 3

Figure 7:
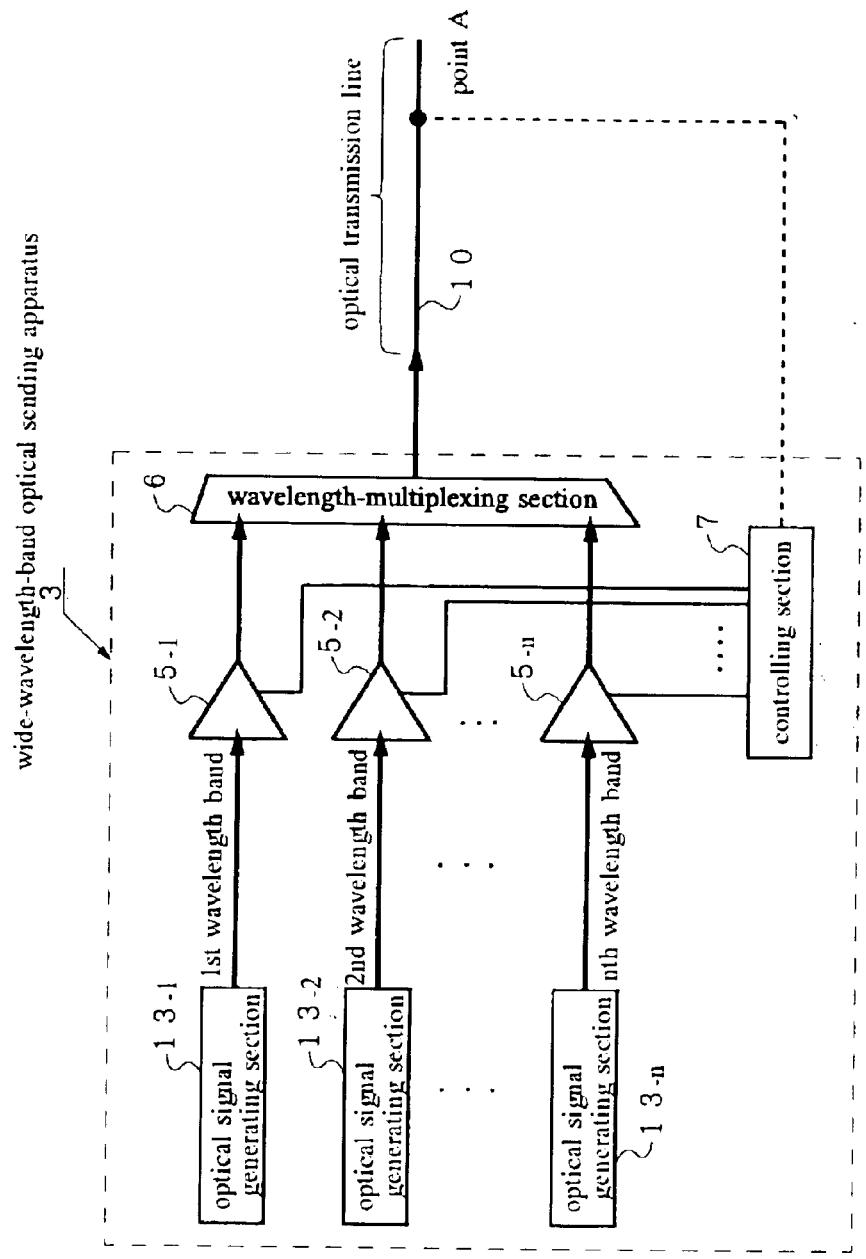
FIG. 7 is a block diagram of a wide-wavelength-band optical sending apparatus according to a third embodiment of the invention.

As shown in FIG. 7, a wide-wavelength-band optical sending apparatus 3 is composed of a plurality of optical signal generating sections 13-1 to 13-n, a plurality of optical amplifying sections 5-1 to 5-n, a wavelength-multiplexing section 6, and a control section 7.

The optical signal generating sections 13-1 to 13-n are provided for respective wavelength bands and generate WDM optical signals in the respective wavelength bands.

The generated WDM optical signals in the respective wavelength bands are amplified to predetermined power levels by the optical amplifying sections 5-1 to 5-n that are controlled by the control section 7. The amplified WDM optical signals are wavelength-multiplexed by the wavelength-multiplexing section 6 and then output to an optical transmission line 10 as an n-wavelength-band WDM optical signal.

That is, the wide-wavelength-band optical sending apparatus 3 according to the third embodiment is constructed by adding, to the composite optical amplifying apparatus 2 according to the second embodiment, the optical signal generating sections 13-1 to 13-n in such a manner that they correspond to the respective optical amplifying sections 5-1 to 5-n of the composite optical amplifying apparatus 2.

The control section 7 performs one of the various kinds of control that were described in the first and second embodiments.

Therefore, the operation principle and the advantageous effects of the wide-wavelength-band optical sending apparatus 3 that relate to making optical powers of the respective wavelength bands at a predetermined point approximately identical and the operation principle and the advantageous effects of the wide-wavelength-band optical sending apparatus 3 that relate to adjusting optical powers of the respective wavelength bands at a predetermined point in consideration of the noise figures of the respective optical amplifying sections 5-1 to 5-n are the same as in the first and second embodiments and hence are not described here.

In the first to third embodiments, the control section 7 may control the outputs of the respective optical amplifying sections 5-1 to 5-n so that when light beams in the respective wavelength bands amplified by the respective optical amplifying sections 5-1 to 5-n travel to a predetermined point, for example, point A, powers obtained by eliminating noise powers in the respective optical amplifying sections 5-1 to 5-n from optical powers of the respective wavelength bands at point A will become approximately identical.

In the first to third embodiments, the control section 7 may control the outputs of the respective optical amplifying sections 5-1 to 5-n so that when light beams in the respective wavelength bands amplified by the respective optical amplifying sections 5-1 to 5-n travel to a predetermined point, for example, point A, on the optical transmission line 10 that is a predetermined distance away from the composite optical amplifying apparatus 1 or 2 or the wide-wavelength-band optical sending apparatus 3, optical powers of the respective wavelength bands at point A will become approximately identical.

In the first to third embodiments, the control amounts of the control section 7 may be determined based on at least one of the stimulated Raman scattering in the optical transmission line 10, the loss in the optical transmission line 10, the loss in the wavelength demultiplexing section 8, and the loss in the wavelength multiplexing section 6.

In the first to third embodiments, the control section 7 may have a detecting section for detecting optical powers of respective wavelength bands at a predetermined point when light beams in the respective wavelength bands amplified by the respective optical amplifying sections 5-1 to 5-n travel to the predetermined point, and may adjust the outputs of the respective optical amplifying sections 5-1 to 5-n based on outputs of the detecting section so that the optical powers of respective wavelength bands at the predetermined point become approximately identical.

In this case, the control section 7 actually detects optical powers of the respective wavelength bands at the predetermined point and feedback-controls the outputs of the respective optical amplifying sections 5-1 to 5-n based on detection results. Therefore, the composite optical amplifying apparatuses 1 and 2 and the wide-wavelength-band optical sending apparatus 3 can reliably make the optical powers of the respective wavelength bands at the predetermined point approximately identical.

In the first to third embodiments, the control section 7 may have a detecting section for detecting optical powers of respective wavelength bands at a predetermined point when light beams in the respective wavelength bands amplified by the respective optical amplifying sections 5-1 to 5-n travel to the predetermined point, and may adjust the outputs of the respective optical amplifying sections 5-1 to 5-n based on outputs of the detecting section so that powers obtained by eliminating noise powers in the respective optical amplifying sections 5-1 to 5-n from the optical powers of respective wavelength bands at the predetermined point become approximately identical.

In this case, the control section 7 actually detects optical powers of the respective wavelength bands at the predetermined point and feedback-controls the outputs of the respective optical amplifying sections 5-1 to 5-n based on detection results and noises in the respective optical amplifying sections 5-1 to 5-n. Therefore, the composite optical amplifying apparatuses 1 and 2 and the wide-wavelength-band optical sending apparatus 3 can reliably make the optical powers of the respective wavelength bands at the predetermined point approximately identical in consideration of noises in the respective optical amplifying sections 5-1 to 5-n.

The above configuration is particularly effective when the stimulated Raman scattering, the loss in the optical transmission line 10, and the loss in the wavelength-multiplexing section 6 are not the only factors that vary the optical powers of the respective wavelength bands.

Where the degree of stimulated Raman scattering, the loss in the optical transmission line 10, and the loss in the wavelength-multiplexing section 6 can be measured in advance, target values of preemphases to be provided for the respective wavelength bands based on the principle described above with reference FIGS. 2A–2E are calculated based on measurement values and the control section 7 stores calculation results. The control can be performed quickly if the control section 7 refers to target values corresponding to outputs of the detecting section and feedback-controls the outputs of the respective optical amplifying sections 5-1 to 5-n based on the target values.

In the first to third embodiments, input light may be an n-wavelength-band WDM optical signal consisting of WDM optical signals in respective wavelength bands, and the control section 7 may have a detecting section for detecting optical power of the shortest-wavelength channel at a predetermined point, for example, point A, and may adjust the outputs of the respective optical amplifying sections 5-1 to 5-n based on an output of the detecting section so that optical powers of WDM optical signals in the respective wavelength bands at the predetermined point become approximately identical.

This control section 7 actually detects optical power of the shortest-wavelength channel at the predetermined point and feedback-controls the outputs of the respective optical amplifying sections 5-1 to 5-n based on a detection result. Since as indicated by Equation (1) the stimulated Raman scattering is the phenomenon that optical power of a shorter wavelength side is transferred to a longer wavelength side, optical powers of the respective wavelength bands at the predetermined point can be calculated according to Equation (1) etc. based on the optical power of the shortest-wavelength channel. Therefore, the composite optical amplifying apparatuses 1 and 2 and the wide-wavelength-band optical sending apparatus 3 can reliably make the optical powers of the respective wavelength bands at the predetermined point approximately identical.

In the first to third embodiments, input light may be an n-wavelength-band WDM optical signal consisting of WDM optical signals in respective wavelength bands, and the control section 7 may have a detecting section for detecting optical power of the shortest-wavelength channel at a predetermined point, for example, point A, and may control the outputs of the respective optical amplifying sections 5-1 to 5-n based on an output of the detecting section so that powers obtained by eliminating noise powers in the respective optical amplifying sections 5-1 to 5-n from optical powers of WDM optical signals in the respective wavelength bands at the predetermined point become approximately identical.

This control section 7 actually detects optical power of the shortest-wavelength channel at the predetermined point and feedback-controls the outputs of the respective optical amplifying sections 5-1 to 5-n based on a detection result and noise powers in the respective optical amplifying sections 5-1 to 5-n. Therefore, the composite optical amplifying apparatuses 1 and 2 and the wide-wavelength-band optical sending apparatus 3 can reliably make the optical powers of the respective wavelength bands at the predetermined point approximately identical in consideration of noises in the respective optical amplifying sections 5-1 to 5-n.

Although in the first to third embodiments the optical powers of the respective wavelength bands are adjusted while light beams in the respective wavelength bands are amplified, they may be adjusted while light beams in the respective wavelength bands are attenuated. In the latter case, an optical attenuator or the like can be used.

Embodiment 4

Figure 8:
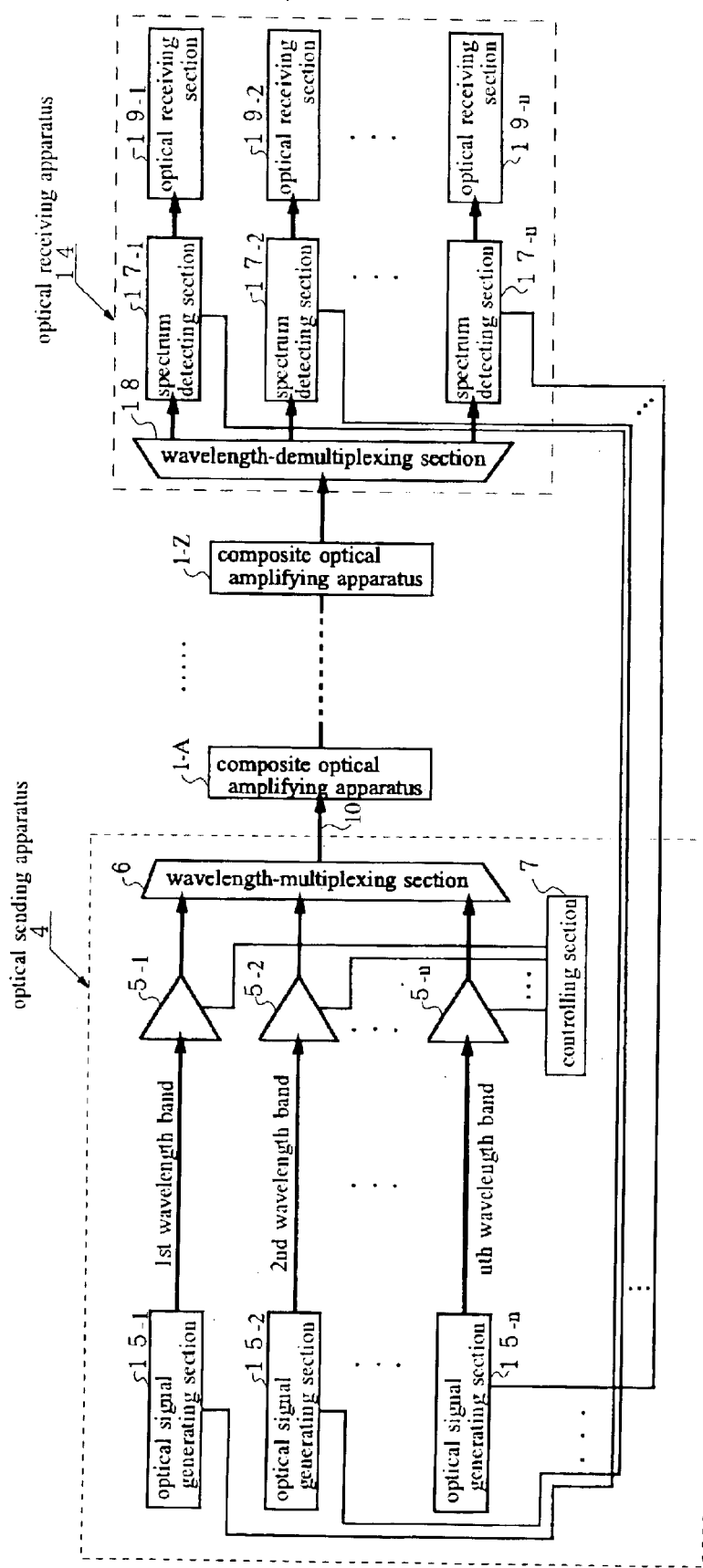
FIG. 8 is a block diagram of an optical transmission system according to a fourth embodiment of the invention.

As shown in FIG. 8, an optical transmission system according to a fourth embodiment is comprised of an optical sending apparatus 4 that generates and sends optical signals, an optical transmission line 10, and an optical receiving apparatus 14 that receives and processing optical signals.

The optical sending apparatus 4 is comprised of a plurality of optical signal generating sections 15-1 to 15-n, a plurality of optical amplifying sections 5-1 to 5-n, a control section 7, and a wavelength-multiplexing section 6.

The optical signal generating sections 15-1 to 15-n are provided for respective wavelength bands. The optical signal generating sections 15-1 to 15-n generate WDM optical signals in the respective wavelength bands. Each WDM optical signal is an optical signal obtained by wavelength-multiplexing optical signals whose optical powers have been adjusted based on detection results of each of spectrum detecting sections 17-1 to 17-n.

The optical amplifying sections 5-1 to 5-n are connected to the respective optical signal generating sections 15-1 to 15-n and amplify WDM signals generated by the respective optical signal generating sections 15-1 to 15-n.

The control section 7 controls the outputs of the respective optical amplifying sections 5-1 to 5-n so that when the WDM optical signals in the respective wavelength bands amplified by the respective optical amplifying sections 5-1 to 5-n are transmitted to a predetermined point, optical powers of the WDM optical signals in the respective wavelength bands at the predetermined point will become approximately identical.

The wavelength-multiplexing section 6 wavelength-multiplexes the amplified WDM optical signals in the respective wavelength bands.

The optical transmission line 10 is connected to the optical sending apparatus 4 and transmits the wide-wavelength-band WDM optical signal to the optical receiving apparatus 14.

The optical receiving apparatus 14 is comprised of a wavelength-demultiplexing section 18, a plurality of spectrum detecting sections 17-1 to 17-n, and a plurality of optical receiving sections 19-1 to 19-n. The spectrum detecting sections 17-1 to 17-n detect spectra of the WDM optical signals and outputs detection results to the optical sending apparatus 4.

Where the transmission distance is so long that the power levels of wide-wavelength-band WDM optical signals that are detected by the optical receiving apparatus 14 are low, optical amplifying apparatuses for amplifying a wide-wavelength-band WDM optical signal, for example, the above-described composite optical amplifying apparatuses 1, may be provided on the optical transmission line 10. In particular, where the composite optical amplifying apparatuses 1 are provided, by installing the next repeater station or the optical receiving apparatus 14 at the above-mentioned predetermined point, the optical powers of the respective wavelength bands of the wide-wavelength-band WDM optical signals at each repeater station or the optical receiving apparatus 14 can be made approximately identical. Therefore, deterioration in the optical SNR of the wide-wavelength-band WDM optical signal that is received by each repeater station or the optical receiving apparatus 14 is reduced and hence ultra-long distance transmission is enabled.

Next, the operation principle and the advantageous effects of the fourth embodiment will be described.

FIG. 9A schematically shows the optical transmission system according to the fourth embodiment. FIG. 9B shows spectra at respective points on the optical transmission line 10, the points being the output end of the optical sending apparatus 4, the input end of a composite optical amplifying apparatus 1A that is the first repeater station, the output end of the composite optical amplifying apparatus 1A, and the input end of the optical receiving apparatus 14 that are arranged in order from the left in FIG. 9A. FIG. 9C, which is prepared to show the advantageous effects of the optical transmission system according to the fourth embodiment, shows spectra at the same points as in FIG. 9B that are obtained when inter-wavelength-band preemphasis is performed but in-wavelength-band preemphasis is not performed by the optical sending apparatus 4. In FIGS. 9B and 9C, the vertical axis represents the optical power and the horizontal axis represents the wavelength.

Although to simplify the description the following description will be directed to a case of a two-wavelength-band WDM optical signal consisting of a WDM optical signal in a first wavelength band and a WDM optical signal in a second wavelength band, a case of an n-wavelength-band WDM optical signal formed by wavelength-multiplexing WDM optical signals in n respective wavelength bands can be explained in a similar manner.

Referring to FIGS. 8 and 9A–9C, a WDM optical signal in the first wavelength band is subjected, in the optical sending apparatus 4, to in-wavelength-band preemphasis that adjusts the optical powers of respective optical signals. Similarly, a WDM optical signal in the second wavelength band is subjected to inner-wavelength band preemphasis in the optical sending apparatus 4.

In an optical transmission system having an optical amplifier, noise due to ASE is necessarily superimposed on an optical signal. Since the ASE depends on the wavelength, in a WDM optical signal produced by wavelength-multiplexing a plurality of optical signals having different wavelengths the levels of noises that are superimposed on the respective optical signals are different from each other. Therefore, the optical signals of the WDM optical signal have different optical SNRs. Since an optical receiving apparatus receives and processes the optical signals having different optical SNRs, it is forced to receive and process the optical signals in such a manner as to adjust itself to an optical signal having the smallest optical SNR. Such optical SNR deviations can be compensated for if the optical sending apparatus 4 adjusts the optical powers of the respective optical signals so as to make the optical power of an optical signal having the smallest optical SNR largest to thereby eliminate the optical SNR deviations between the optical signals. In particular, if the optical sending apparatus 4 adjusts the optical powers of the respective optical signals so that when received by the optical receiving apparatus 14 the optical signals will have optical SNRs that are equal to the largest optical SNR, the optical receiving apparatus 14 can receive optical signals having optical SNRs that are approximately equal to each other and equal to the largest optical SNR.

As for the inner-wavelength band preemphasis, satisfactory results are obtained if the optical sending apparatus 4 adjusts the optical powers of the respective optical signals in the above-described manner based on detection results of the spectrum detecting sections 17-1 and 17-2 of the optical receiving apparatus 14.

After performing the in-wavelength-band preemphasis on each WDM optical signal, the optical sending apparatus 4 causes the optical amplifying sections 5-1 and 5-2, which are gain-controlled by the control section 7, to perform inter-wavelength-band preemphasis.

Since the inter-wavelength-band preemphasis is the same as described above with reference to FIGS. 2A–2E and 3A–3B, it is not described here. Adjustments of the inter-wavelength-band preemphasis may be made by using either the sum or the average (see FIG. 9B) of the optical powers of the optical signals of each WDM optical signal.

After being subjected to the inner-wavelength band preemphasis and the inter-wavelength-band preemphasis, the first wavelength band WDM optical signal and the second wavelength band WDM optical signal are wavelength-multiplexed by the wavelength-multiplexing section 6 and output from the optical sending apparatus 4 to the optical transmission line 10 in the form of a two-wavelength-band WDM optical signal as shown in the leftmost part of FIG. 9B.

At the input end of the composite optical amplifying apparatus 1A, the optical powers of the WDM optical signals of the two-wavelength-band WDM optical signal are varied by the stimulated Raman scattering and the loss in the optical transmission line 10 and other factors. However, since the inter-wavelength-band preemphasis was performed, the optical power of the first wavelength band WDM optical signal is approximately equal to that of the second wavelength band WDM optical signal as shown in the second part (from the left) of FIG. 9B. Therefore, the optical SNRs of the respective optical signals are made larger than in the case where the inter-wavelength-band preemphasis is not performed.

As shown in the third part (from the left) of FIG. 9B, the two-wavelength-band WDM optical signal is subjected to inter-wavelength-band preemphasis and amplification in the composite optical amplifying section 1A and then output to the optical transmission line 10 at the output end of the composite optical amplifying apparatus 1A.

At the input end of the optical receiving apparatus 14, the two-wavelength-band WDM optical signal that was subjected to the inter-wavelength-band preemphasis and amplification sequentially in the composite optical amplifying sections 1 is input to the optical receiving apparatus 14. Since the optical signals of the incident two-wavelength-band WDM optical signal were subjected to the in-wavelength-band preemphasis, deterioration in optical SNR due to ASEs generated by the optical amplifiers in the optical sending apparatus 4, the composite optical amplifying sections 1, and the optical receiving section 14 can be reduced as shown in the rightmost part of FIG. 9B. Further, since the inter-wavelength-band preemphasis was also performed, deterioration in optical SNR due to deviations between the wavelength bands caused by the stimulated Raman scattering etc. can also be reduced.

In general, where the wavelength characteristics of the gains and the noise figures of the respective optical amplifiers are uniform, the transmission intervals of the optical transmission line 10 are constant, and the optical SNRs of the respective channels are made uniform on the receiving side by the in-wavelength-band preemphasis, the gradients of the optical powers are made such that the directions of the gradients are opposite to those in the sending side and the amplitudes of the gradients are approximately equal to those in the sending side.

On the other hand, where the optical sending apparatus 4 performs inter-wavelength-band preemphasis but does not perform inner-wavelength band preemphasis, at the output end of the optical sending apparatus 4 the optical powers of the respective optical signals of the WDM optical signal in each wavelength band are identical as shown in the leftmost part of FIG. 9C.

Such a two-wavelength-band WDM optical signal is transmitted after being subjected to inter-wavelength-band preemphasis in the composite optical amplifying apparatuses 1 as shown in the second and third parts (from the left) of FIG. 9C, at the input end of the optical receiving apparatus 14 deterioration's in optical SNR due to deviations between the wavelength bands are reduced but deterioration in optical SNR within each wavelength band remains as shown in the rightmost part of FIG. 9C.

In conclusion, the optical transmission system according to the fourth embodiment can further increase the distance of ultra-long distance transmission.

Embodiment 5

An optical transmission system according to a fifth embodiment is such that a three-wavelength-band WDM optical signal sending apparatus generates a three-wavelength-band WDM optical signal, composite optical amplifying apparatuses relay the three-wavelength-band WDM optical signal plural times, and a three-wavelength-band WDM optical signal receiving apparatus receives and processes the three-wavelength-band WDM optical signal. The three-wavelength-band WDM optical signal consists of a WDM optical signal having s channels that is set in the $S^+$ band, a WDM optical signal having t channels that is set in the C band, and a WDM optical signal having u channels that is set in the L band.

First, the entire configuration of the optical transmission system according to the fifth embodiment will be described.

Figure 10:
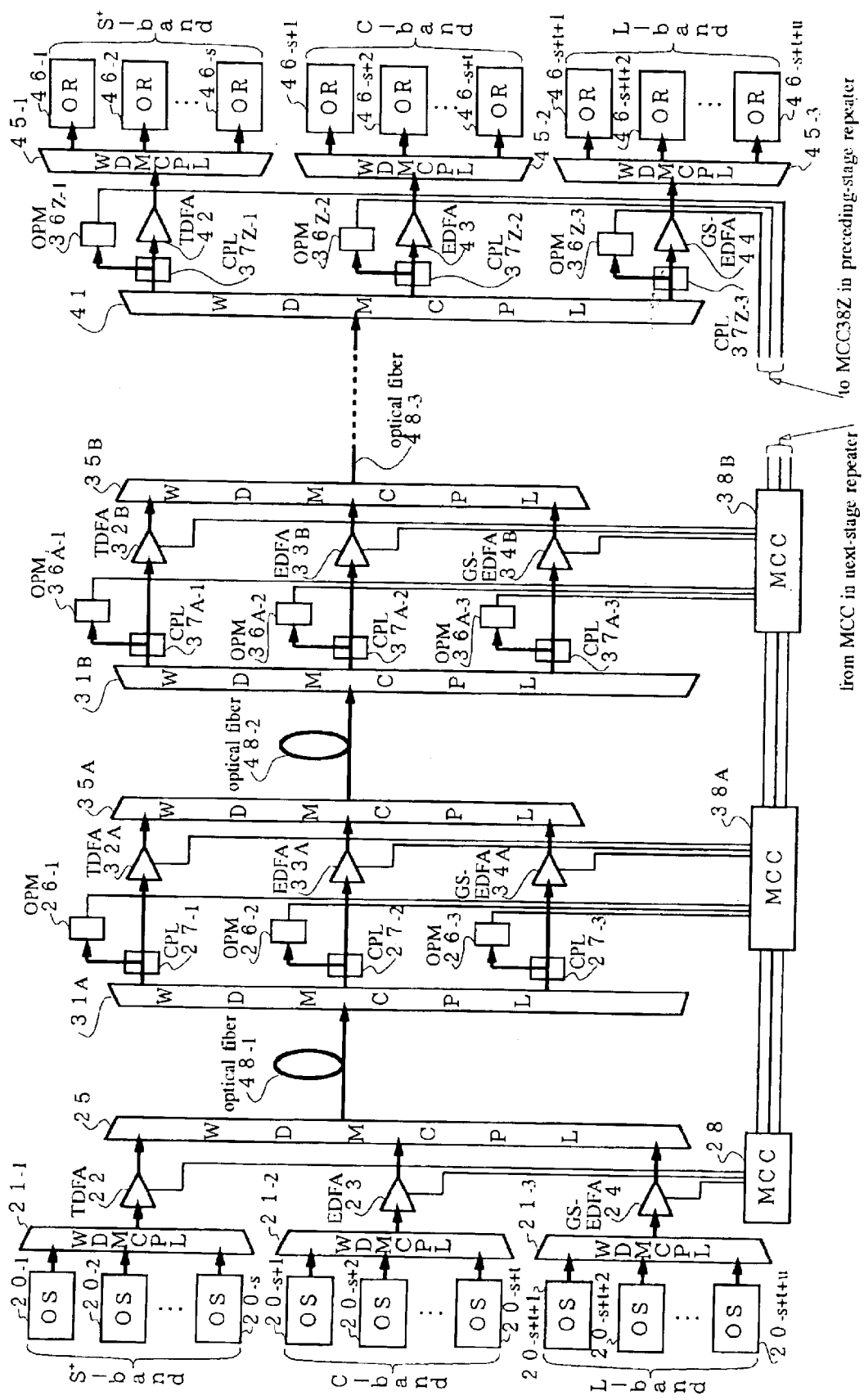
FIG. 10 is a block diagram of an entire optical transmission system according to a fifth embodiment of the invention.

As shown in FIG. 10, s optical senders (OSs) 20-1 to 20-s generate optical signals corresponding to channel-1 to channel-s of the $S^+$ band, respectively. For example, each of the optical senders 20-1 to 20-s can be comprised of a semiconductor laser for emitting laser having a wavelength that is assigned to the associated channel, an MZ modulator for modulating the laser beam with information to be sent out, and a control circuit for driving and controlling the semiconductor laser and the MZ modulator. The semiconductor laser can be any of various semiconductor lasers such as a distributed feedback laser and a distributed Bragg reflection laser.

The optical signals generated by the respective optical senders 20-1 to 20-s are input to a WDM coupler (WDMCPL) 21-1. The WDM coupler 21-1 converts the optical signals into a WDM optical signal by wavelength-multiplexing those. In this manner, a WDM optical signal is generated in which a plurality of optical signals having different wavelengths are wavelength-multiplexed. And an optical sending section that has the optical senders 20-1 to 20-s and the WDM coupler 21-1 and generates an $S^+$-band WDM optical signal is formed. The WDM optical signal that is output from the WDM coupler 21-1 is input to a TDFA 22 and amplified there. For example, the WDM coupler 21-1 is an AWG or a dielectric multilayer optical filter that is an interference filter type optical multi/demultiplexer.

The TDFA 22 controls the optical power of the $S^+$-band WDM optical signal while its output is controlled by a monitoring/control circuit 28(MCC). The optical-power-controlled $S^+$-band WDM optical signal is input to a WDM coupler 25.

An optical-power-controlled C-band WDM optical signal is generated in a similar manner by t optical senders 20-s+1 to 20-s+t, a WDM coupler 21-2, and an EDFA 23.

An optical-power-controlled L-band WDM optical signal is generated in a similar manner by u optical senders 20-s+t+1 to 20-s+t+u, a WDM coupler 21-3, and a GS-EDFA 24.

As described above with reference to FIG. 2D, the WDM coupler 25 have different insertion losses for the respective wavelength bands. Therefore, to increase optical SNRS, where the TDFA 22, the EDFA 23, and the GS-EDFA 24 have different noise figures, it is preferable that a WDM optical signal amplified by a rare-earth-element-doped fiber amplifier having the worst noise figure be input to the WDM coupler 25 in a wavelength band of the smallest insertion loss.

The configurations of the TDFA 22, the EDFA 23, and the GS-EDFA 24 are approximately the same as in a composite optical amplifying apparatus shown in FIG. 11, they will be described in describing the composite optical amplifying apparatus.

The numbers s, t, and u may each be any number. The maximum value of s is determined by the gain-wavelength characteristic of the TDFA 22 that performs amplification in this wavelength band and the space between channels. The maximum value of t is determined by the gain-wavelength characteristic of the EDFA 23 that performs amplification in this wavelength band and the space between channels. The maximum value of u is determined by the gain-wavelength characteristic of the GS-EDFA 24 that performs amplification in this wavelength band and the space between channels.

The $S^+$-band WDM optical signal, the C-band WDM optical signal, and the L-band WDM optical signal are input to the WDM coupler 25, where they are wavelength-multiplexed into a three-wavelength-band WDM optical signal. The three-wavelength-band WDM optical signal is output to an optical fiber 48-1 as an optical transmission line and transmitted through it to the next-stage repeater.

The optical fiber 48-1 is connected to a WDM coupler 31A in the next-stage repeater. The three-wavelength-band WDM optical signal that has been transmitted through the optical fiber 48-1 is input to the WDM coupler 31A, where it is wavelength-demultiplexed into WDM optical signals in the respective bands.

The demultiplexed $S^+$-band WDM optical signal is input to a coupler 37-1 for branching light into two parts at an optical power ratio of 10:1, for example. The branched WDM signal having the smaller optical power is input to an optical power meter (OPM) 36-1 for measuring optical power, where the optical power of the $S^+$-band WDM optical signal is measured. A measurement result is sent to the monitoring/control circuit 28 at the preceding stage. On the other hand, the branched WDM optical signal having the larger optical power is input to a TDFA 32A.

The power of the demultiplexed C-band WDM optical signal is measured by a block that is similar to the above and is composed of a coupler 37-2, an optical power meter 36-2 and an EDFA 33A. A measurement result is sent to the monitoring/control circuit 28 at the preceding stage. The branched WDM optical signal having the larger optical power is input to an EDFA 33A.

The power of the demultiplexed L-band WDM optical signal is measured by a block that is similar to the above and is composed of a coupler 37-3, an optical power meter 36-3 and a GS-EDFA 34A. A measurement result is sent to the monitoring/control circuit 28 at the preceding stage. The branched WDM optical signal having the larger optical power is input to a GS-EDFA 34A.

The monitoring/control circuit 28 receives the outputs of the optical power meters 36-1 to 36-3. The monitoring/control circuit 28 calculates the differences between the optical powers of the respective bands and adjusts the outputs of the TDFA 22, the EDFA 23, and the GS-EDFA 24 that perform amplification in the respective bands so as to eliminate the differences.

On the other hand, the $S^+$-band WDM optical signal having the larger optical power is amplified by the TDFA 32A and input to a WDM coupler 35A. The TDFA 32A controls the optical power of the $S^+$-band WDM optical signal while its output is controlled by a monitoring/control circuit 38A.

The C-band WDM optical signal having the larger optical power is amplified by the EDFA 33A whose output is controlled by the monitoring/control circuit 38A, and is then input to the WDM coupler 35A.

The L-band WDM optical signal having the larger optical power is amplified by the GS-EDFA 34A whose output is controlled by the monitoring/control circuit 3BA, and is then input to the WDM coupler 35A.

The WDM optical signals in the respective bands are wavelength-multiplexed by the WDM coupler 35A and thereby returned to a three-wavelength-band WDM optical signal. The three-wavelength-band WDM optical signal is input to an optical fiber 48-2 and transmitted through it to the next-stage repeater.

The three-wavelength-band WDM optical signal that has been transmitted through the optical fiber 48-2 is input to a WDM coupler 31B in the next-stage repeater, where it is wavelength-demultiplexed into WDM optical signals in the respective bands.

The demultiplexed $S^+$-band WDM optical signal is input to a coupler 37A-1 for branching light into two parts at an optical power ratio of 10:1, for example. The branched WDM signal having the smaller optical power is input to an optical power meter 36A-1 for measuring optical power, where the optical power of the $S^+$-band WDM optical signal is measured. A measurement result is sent to the monitoring/control circuit 38A at the preceding stage. On the other hand, the branched WDM optical signal having the larger optical power is input to a TDFA 32B.

The power of the demultiplexed C-band WDM optical signal is measured by a block that is similar to the above and is composed of a coupler 37A-2, an optical power meter 36A-2 and an EDFA 33B. A measurement result is sent to the monitoring/control circuit 38A at the preceding stage. The branched WDM optical signal having the larger optical power is input to an EDFA 33B.

The power of the demultiplexed L-band WDM optical signal is measured by a block that is similar to the above and is composed of a coupler 37A-3, an optical power meter 36A-3 and a GS-EDFA 34B. A measurement result is sent to the monitoring/control circuit 38A at the preceding stage. The branched WDM optical signal having the larger optical power is input to a GS-EDFA 34B.

The monitoring/control circuit 38A receives the outputs of the optical power meters 36A-1 to 36A-3. The monitoring/control circuit 38A calculates the differences between the optical powers of the respective bands and adjusts the outputs of the TDFA 32A, the EDFA 33A, and the GS-EDFA 34A that perform amplification in the respective bands so as to eliminate the differences.

On the other hand, the $S^+$-band WDM optical signal having the larger optical power is amplified by the TDFA 32B and input to a WDM coupler 35B. The TDFA 32B controls the optical power of the $S^+$-band WDM optical signal while its output is controlled by a monitoring/control circuit 38B.

The C-band WDM optical signal having the larger optical power is amplified by the EDFA 33B whose output is controlled by the monitoring/control circuit 38B, and is then input to the WDM coupler 35B.

The L-band WDM optical signal having the larger optical power is amplified by the GS-EDFA 34B whose output is controlled by the monitoring/control circuit 38B, and is then input to the WDM coupler 35B.

The WDM optical signals in the respective bands are wavelength-multiplexed by the WDM coupler 35B and thereby returned to a three-wavelength-band WDM optical signal. The three-wavelength-band WDM optical signal is input to an optical fiber 48-3 and transmitted through it to the next-stage repeater.

Subsequently, in similar manners, the three-wavelength-band WDM optical signal is demultiplexed into WDM optical signals in the respective bands, subjected to optical power amplification and control, and wavelength-multiplexed. The three-wavelength-band WDM optical signal is relayed plural times in this manner.

As described above, the optical power amplification and control on WDM optical signals in the respective bands are performed by the TDFA 32, the EDFA 33, and the GS-EDFA 34. The outputs of the TDFA 32, the EDFA 33, and the GS-EDFA 34 are controlled based on the outputs of the optical power meters 36-1 to 36-3 in the next-stage composite optical amplifying apparatus, respectively.

A three-wavelength-band WDM optical signal that is output from the final-stage composite optical amplifying apparatus is input to a WDM coupler 41, where it is demultiplexed into WDM optical signals in the respective bands.

The demultiplexed $S^+$-band WDM optical signal is input to a coupler 37Z-1 for branching light into two parts at an optical power ratio of 10:1, for example. The branched WDM signal having the smaller optical power is input to an optical power meter 36Z-1 for measuring optical power, where the optical power of the $S^+$-band WDM optical signal is measured. A measurement result is sent to the monitoring/control circuit 38Z at the preceding stage. On the other hand, the branched WDM optical signal having the larger optical power is input to a WDM coupler 45-1.

The power of the demultiplexed C-band WDM optical signal is measured by a block that is similar to the above and is composed of a coupler 37Z-2, an optical power meter 36Z-2 and a WDM coupler 45-2. A measurement result is sent to the monitoring/control circuit 38Z at the preceding stage. The branched WDM optical signal having the larger optical power is input to the WDM coupler 45-2.

The power of the demultiplexed L-band WDM optical signal is measured by a block that is similar to the above and is composed of a coupler 37Z-3, an optical power meter 36Z-3 and a WDM coupler 45-3. A measurement result is sent to the monitoring/control circuit 38Z at the preceding stage. The branched WDM optical signal having the larger optical power is input to the WDM coupler 45-3.

The $S^+$-band WDM optical signal is wavelength-demultiplexed by the WDM coupler 45-1 into optical signals of channel-1 to channel-s. The wavelength-demultiplexed optical signals of the respective channels are input to respective optical receivers (ORs) 46-1 to 46-s, where they are received and processed.

Similarly, the C-band optical signal is wavelength-demultiplexed by the WDM coupler 45-2 into optical signals of channel-1 to channel-t. The wavelength-demultiplexed optical signals of the respective channels are input to respective optical receivers 46-s+1 to 46-s+t, where they are received and processed. The L-band optical signal is wavelength-demultiplexed by the WDM coupler 45-3 into optical signals of channel-1 to channel-u. The wavelength-demultiplexed optical signals of the respective channels are input to respective optical receivers 46-s+t+1 to 46-s+t+u, where they are received and processed.

Next, the configuration of each composite optical amplifying apparatus in the optical transmission system according to the fifth embodiment will be described.

Figure 11:
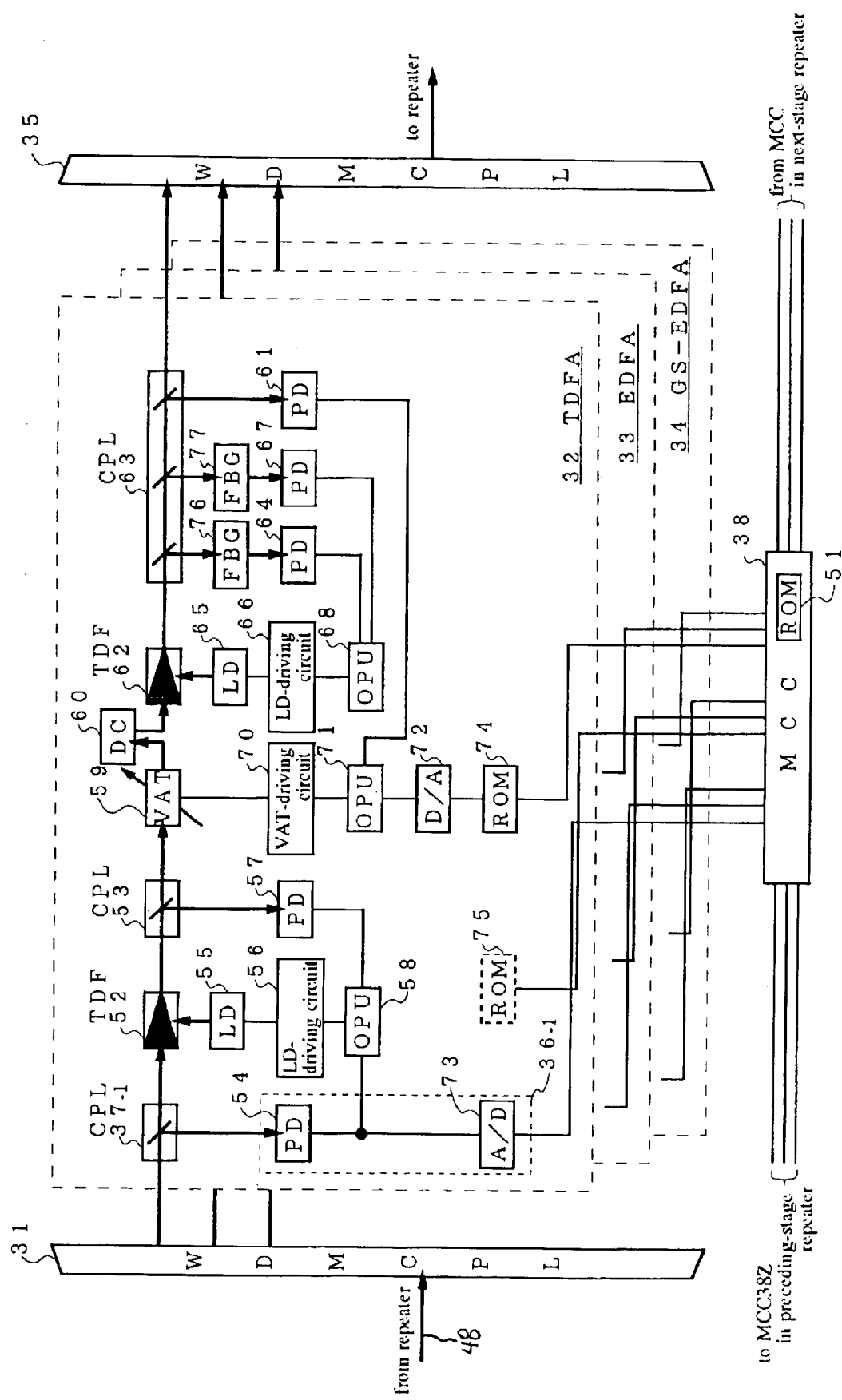
FIG. 11 is a block diagram of each composite optical amplifying apparatus in the optical transmission system of FIG. 10.

As shown in FIG. 11, a three-wavelength-band WDM optical signal is transmitted through the optical fiber 48 and thereby input from the pre-stage composite optical amplifying apparatus to the WDM coupler 31. The three-wavelength-band WDM optical signal is wavelength-demultiplexed by the WDM coupler 31 into WDM optical signals in the respective bands. The demultiplexed $S^+$-band WDM optical signal is input to the coupler 37-1 in the TDFA 32. The demultiplexed C-band WDM optical signal is input to the coupler 37-2 in the EDFA 33. The demultiplexed L-band WDM optical signal is input to the coupler 37-3 in the GS-EDFA 34.

The configurations of the TDFA 32, the EDFA 33, and the GS-EDFA 34 are identical except that they are different from each other in the rare-earth-element-doped optical fiber as the medium for amplifying light and the pump source for pumping it. Therefore, basically the configuration of only the TDFA 32 will be described below. The configurations of the EDFA 33 and the GS-EDFA 34 will be described only in different points than in the TDFA 32.

The TDFA 32 will be described below.

A WDM optical signal having the smaller optical power separated by the coupler 37-1 is input to a photodiode (hereinafter abbreviated as PD) 54, where it is subjected to photoelectric conversion. A resulting current value corresponds to the optical power of the $S^+$-band WDM optical signal. The PD 54 outputs the current to an operation unit (OPU) 58 and an analog-to-digital converter (hereinafter abbreviated as A/D) 73. The A/D 73 converts the input from an analog value to a digital value and outputs the digital conversion result to the monitoring/control circuit 38. The monitoring/control circuit 38 converts the received digital value into an optical signal having information corresponding to the digital value, and sends the optical signal to the monitoring/control circuit in the pre-stage repeater via a control line.

On the other hand, a WDM optical signal having the larger optical power separated by the coupler 37-1 is input to a thulium-doped fiber (hereinafter abbreviated as TDF) 52.

When the TDF 52 absorbs laser beam that is emitted from an LD 55, electrons in the TDF 52 are excited and population inversion of electrons is produced. If a WDM optical signal is input to the TDF 52 in a state that population inversion exists, the WDM optical signal is amplified through stimulated emission. In the LD 55, first a semiconductor laser is laser-oscillated by supplying a drive current to it from an LD driving circuit 56. A solid-state laser is then oscillated by using laser beam that is emitted from the semiconductor laser, whereby laser beam for pumping the TDF 52 is emitted from the LD 55.

The WDM optical signal amplified by the TDF 52 is input to a coupler 53 for branching light into two parts at an optical power ratio of 10:1, for example. The WDM optical signal having the smaller optical power that has been separated by the coupler 53 is input to a PD 57, where it is subjected to photoelectric conversion. The PD 57 outputs a resulting current to the operation unit 58.

The operation unit 58 converts the currents that are input from the PDs 54 and 57 into voltages by using resistors (not shown in FIG. 11), respectively. The operation unit 58 compares the voltages corresponding to the respective PDs 54 and 57 and supplies an output corresponding to the difference between the two voltages to the LD driving circuit 56. The LD driving circuit 56 judges the gain of the WDM optical signal being amplified by the TDF 52 based on the output of the operation unit 56, and adjusts the drive current for the LD 55 so that the gain becomes a predetermined value. The predetermined value can be changed by adjusting the ratio between the resistance values of the resistors that convert currents that are received from the PDs 54 and 57 into voltages.

The coupler 37-1 and PD 54 have two functions. The first function is detecting the optical power of a WDM optical signal that is input to the TDF 52, to make the gain of the TDF 52 constant. The second function is a function of detecting the optical power of a WDM optical signal that has been transmitted to this repeater, to send information of the optical power to the monitoring/control circuit in the pre-stage repeater. The PD 54 and the A/D 73 correspond to the optical power meter 36-1 shown in FIG. 10.

On the other hand, the WDM optical signal having the larger optical power that has been separated by the coupler 53 is input to a variable optical attenuator (hereinafter abbreviated as VAT) 59. The VAT 59 attenuates the optical power of input light and outputs attenuated light. The amount of the attenuation by VAT 59 may be variable. The amount of attenuation is controlled by a VAT driving circuit 70.

The WDM optical signal that is output from the VAT 59 is input to a dispersion compensator (hereinafter abbreviated as DC) 60 that compensates for chromatic dispersion. The DC 60 may be a dispersion compensation fiber, a dispersion compensation grating, or the like. The DC 60 compensates for chromatic dispersion that occurs in the optical fiber between the pre-stage repeater and the repeater concerned and chromatic dispersion that occurs in the optical fiber between the repeater concerned and the next-stage repeater. That is, chromatic dispersion that occurs in the optical fiber between adjacent repeaters is compensated for by both repeaters rather than only one of those.

The WDM optical signal that is output from the DC 60 is input to a TDF 62. Like the TDF 52, the TDF 62 amplifies the WDM optical signal by absorbing laser beam that is emitted from an LD 65 that is supplied with a drive current from an LD driving circuit 66.

The WDM optical signal amplified by the TDF 62 is input to a coupler that branches light into four parts.

A first WDM optical signal separated by the coupler 63 is input to a PD 64 via a fiber grating filter (hereinafter abbreviated as FBG) 76 that is a band-pass filter. The PD 64 performs photoelectric conversion on the first WDM optical signal. The central wavelength (central frequency) of the pass-band of the FBG 76 is so set that that the FBG 76 passes only light of channel-s of the $S^+$-band WDM optical signal, that is, light of the longest-wavelength channel in the $S^+$ band. Therefore, a current value obtained by the PD 64 through photoelectric conversion corresponds to the optical power of the longest-wavelength channel in the $S^+$ band. The PD 64 outputs the current to an operation unit 68.

A second WDM optical signal separated by the coupler 63 is input via an FBG 77 to a PD 67, where it is subjected to photoelectric conversion. The central wavelength of the pass-band of the FBG 77 is so set that that the FBG 77 passes only light of channel-1 of the S⁺-band WDM optical signal, that is, light of shortest-wavelength channel in the S⁺ band. Therefore, a current value obtained by the PD 67 through photoelectric conversion corresponds to the optical power of the shortest-wavelength channel in the S⁺ band. The PD 67 outputs the current to the operation unit 68.

A third WDM optical signal separated by the coupler 63 is input to a PD 61, where it is subjected to photoelectric conversion. A current value obtained by the PD 61 through photoelectric conversion corresponds to the optical power of the S⁺-band WDM optical signal as amplified by the TDFA 32. The PD 61 supplies the current to an operation unit 71.

A fourth WDM optical signal separated by the coupler 63 is input to a WDM coupler 35. Since the fourth WDM signal becomes an optical signal to be transmitted to the next-stage repeater, setting should be so made that the optical power of the fourth WDM optical signal is larger than the optical powers of the first to third WDM optical signals.

The operation unit 68 converts the currents that are supplied from the PDs 64 and 67 into voltages by using resistors (not shown in FIG. 11). The operation unit 68 compares the voltages corresponding to the respective PDs 64 and 67 and supplies an output corresponding to the difference between the two voltages to the LD driving circuit 66. The LD driving circuit 66 judges a gain gradient of the WDM optical signal being amplified by the TDF 62 based on the output of the operation unit 68. The operation unit 68 compensates for the gain-wavelength characteristic of the TDF 62 by adjusting, based on a judgment result, the drive current for the LD 66 so as to eliminate the gain gradient.

The monitoring/control circuit 38 receives, from the monitoring/control circuit of the next-stage repeater, signals indicating optical powers of the respective bands of the three-wavelength-band WDM optical signal that was transmitted from the repeater concerned.

Based on the received signals, the monitoring/control section 38 calculates the differences between the optical powers of the respective bands after transmission. By referring to a correlation table between the sending optical power and the reception optical power that is stored in a ROM 51 in the monitoring/control circuit 38, the monitoring/control circuit 38 calculates, based on the differences, a target value of the optical power of the S⁺-band WDM optical signal.

The correlation table is a table formed in advance for each band by determining, through theoretical calculation or actual measurement, a relationship between the optical power of a WDM optical signal to be output from the repeater concerned and the optical power of a WDM optical signal to be input to the next-stage repeater based on the stimulated Raman scattering in the optical fiber existing between the repeater concerned and the next-stage repeater, the loss in the optical fiber, and the losses in the WDM coupler 35 in the repeater concerned and the WDM coupler 31 in the next-stage repeater.

The monitoring/control circuit 38 converts the target value into a control value of the VAT driving circuit 70 based on a relationship between the target value and the control value of the VAT driving circuit 70 that is stored in a ROM 74. The monitoring/control circuit 38 outputs the resulting control value to a digital-to-analog converter (hereinafter abbreviated as D/A)72. The D/A converts the control value from a digital value to an analog value and outputs the resulting analog control value to the operation unit 71.

The operation unit 71 compares the outputs of the D/A 72 and the PD 61 and supplies an output corresponding to the difference to the VAT driving circuit 70. Based on the output of the operation unit 71, the VAT driving circuit 70 adjusts the attenuation amount of the VAT 59. As a result, the optical power of the S⁺-band WDM optical signal that is output from the repeater concerned is adjusted to a control value.

The configuration of the EDFA 33 is the same as that of the TDFA 32 except that the TDF 52 is replaced by an erbium-doped fiber and the LD 55 is replaced by a semiconductor laser. Various settings of the dispersion compensation fiber 60 and the operation units 58, 68, and 71 and the contents of the ROM 74 are adjusted so as to be suitable for handling of a C-band WDM optical signal.

The configuration of the GS-EDFA 34 is the same as that of the TDFA 32 except that the TDA 52 is replaced by a long, erbium-doped fiber and the LD 55 is replaced by a semiconductor laser. Various settings of the dispersion compensation fiber 60 and the operation units 58, 68, and 71 and the contents of the ROM 74 are adjusted so as to be suitable for handling of an L-band WDM optical signal.

The EDFA 33 that performs amplification in a 1,550-nm wavelength band is different from the GS-EDFA 34 that performs amplification in a 1,580-nm wavelength band in the length of the erbium-doped fiber. Although erbium-doped fibers inherently have the 1,550-nm wavelength band and the 1,580-nm wavelength band as amplification bands, the amplification factor in the 1,580-nm wavelength band is smaller than that in the 1,550-nm wavelength band. Therefore, to realize optical amplification in the 1,580-nm wavelength band in approximately the same degree as in the 1,550-nm wavelength band, it is necessary to make the fiber length of the fiber amplifier in the 1,580-nm wavelength band about 10 times that of the fiber amplifier in the 1,550-nm wavelength band.

The configuration of each composite optical amplifying apparatus has been described above in detail with reference to FIG. 11. The configuration of the three-wavelength-band WDM optical signal sending apparatus shown in FIG. 10 is similar to that of each composite optical amplifying apparatus.

AS for the corresponding relationship between the two apparatuses, the S⁺-band WDM optical signal that is output from the WDM coupler 21-1 corresponds to that output from the WDM coupler 31, the C-band WDM optical signal that is output from the WDM coupler 21-2 corresponds to that output from the WDM coupler 31, and the L-band WDM optical signal that is output from the WDM coupler 21-3 corresponds to that output from the WDM coupler 31. The TDFA 22 corresponds to the TDFA 32, the EDFA 23 corresponds to the EDFA 33, and the GS-EDFA 24 corresponds to the GS-EDFA 34. The WDM coupler 25 corresponds to the WDM coupler 35, couplers 27-1 to 27-3 correspond to the couplers 37-1 to 37-3, and optical power meters 26-1 to 26-3 correspond to the optical power meters 36-1 to 36-3.

In the following description, when a component of the three-wavelength-band WDM optical signal sending apparatus is referred to with reference to FIG. 11 under the above corresponding relationship, a suffix "os" will be added to the reference symbol of the component. For example, the VAT in the TDFA 22 will be referred to as "VAT 59os." "TDF 52os" will mean the TDF in the TDFA 22 and "TDF 52" will mean the TDF in the TDFA 32.

Next, the operation principle and the advantageous effects of the composite optical amplifying apparatus according to the fifth embodiment will be described.

A three-wavelength-band WDM optical signal that has been transmitted from the pre-stage repeater is demultiplexed into WDM optical signals in the respective bands by the WDM coupler 31. Since the operation principle and the advantageous effects are the same for the WDM optical signals in the respective bands, they will be described below for the S$^+$-band WDM optical signal.

The demultiplexed S$^+$-band WDM optical signal is amplified by the TDF 52 at a predetermined gain. Optical powers of the S$^+$-band WDM optical signal before and after the amplification by the TDF 52 are detected by the respective PDs 54 and 57. Since the optical power of pump light for the TDF 52 is adjusted by the operation unit 58's controlling the LD driving circuit 56 based on detection results, the gain of the TDF 52 is kept approximately constant. Since the gain of the TDF 52 depends on the optical power of the pump light, the gain of the TDF 52 can be kept constantly at a predetermined value by adjusting the optical power of the pump light for the TDF 52.

The power of the S$^+$-band WDM optical signal that has been amplified at the predetermined gain is attenuated by the VAT 59.

At this time, the operation unit 71 adjusts the attenuation amount of the VAT 59 so as to eliminate the difference between the outputs of the PD 61 and the D/A 72. The output of the PD 61 corresponds to the optical power of the S$^+$-band WDM optical signal that is actually output from the repeater concerned to the next-stage repeater. The output of the D/A 72 is a control value that is used to equalize the optical powers of the respective bands in the next-stage repeater as well as a control value for the optical power of an S$^+$-band WDM optical signal to be output from the repeater concerned to the next-stage repeater. Since the attenuation amount of the VAT 59 is adjusted in the above manner, the optical powers of the respective bands can be made approximately identical in the next-stage repeater.

The S$^+$-band WDM optical signal that is output from the VAT 59 is dispersion-compensated by the DC 60 and then subjected to adjustment of a gain gradient in the S$^+$ band in the TDF 62. At this time, a gain gradient of the S$^+$-band WDM optical signal that is output from the TDF 62 is detected by the respective PDs 64 and 67. Since the optical power of pump light for the TDF 62 is adjusted by the operation unit 68's controlling the LD driving circuit 66 based on detection results, the monitoring/control circuit 38 can almost eliminate the gain gradient in the S$^+$ band. Since the gain-wavelength characteristic of the TDF 62 depends on the optical power of the pump light, the gain gradient can be almost eliminated by adjusting the optical power of the pump light for the TDF 62.

The reason whey the TDFs 52 and 62 are provided in cascade is that both of the gain and the gain gradient cannot be controlled by a single TDF because both of the gain and the w gain-wavelength characteristic depend on the optical power of the pump light.

As described above, in the optical transmission system according to the fifth embodiment, the gain gradient in each wavelength band can almost be eliminated in each repeater interval by the two-step configuration of rare-earth-element-doped fibers in each of the TDFA 32, the EDFA 33, and the GS-EDFA 34. Further, in the optical transmission system according to the fifth embodiment, since preemphases are provided for the respective bands by means of the respective VATs in the TDFA 32, the EDFA 33, and the GS-EDFA 34, the gain gradients between the three wavelength bands can almost be eliminated in the next-stage repeater.

Next, the operation principle and the advantageous effects of the three-wavelength-band WDM optical signal sending apparatus in the optical transmission system according to the fifth embodiment will be described. Since the operation principle and the advantageous effects are the same for the WDM optical signals in the respective bands that are output from the WDM couplers 21, they will be described below for the S$^+$-band WDM optical signal.

The S$^+$-band WDM optical signal that is outputted from the WDM coupler 21-1 is amplified by the TDF 52os at a prescribed gain. Optical powers of the S$^+$-band WDM optical signal before and after the amplification by the TDF 52os are detected by the respective PDs 54os and 57os. Since the optical power of pump light for the TDF 52os is adjusted by the operation unit 58os's controlling the LD driving circuit 56os based on detection results, the gain of the TDF 52os is kept approximately constant.

The power of the S$^+$-band WDM optical signal that has been amplified at the prescribed gain is attenuated by the VAT 59os.

At this time, the operation unit 71os adjusts the attenuation amount of the VAT 59os so as to eliminate the difference between the outputs of the PD 61os and the D/A 72os. The output of the PD 61os corresponds to the optical power of the S$^+$-band WDM optical signal that is actually output from the three-wavelength-band WDM optical signal sending apparatus concerned to the first-stage repeater. The output of the D/A 72os is a control value that is used to equalize the optical powers of the respective bands in the first-stage repeater as well as a control value for the optical power of an S$^+$-band WDM optical signal to be output from the three-wavelength-band WDM optical signal sending apparatus concerned to the first-stage repeater. Since the attenuation amount of the VAT 59os is adjusted in the above manner, the optical powers of the respective bands can be made approximately identical in the next-stage repeater.

The S$^+$-band WDM optical signal that is output from the VAT 59os is dispersion-compensated by the DC 60os and then subjected to adjustment of a gain gradient in the S$^+$ band in the TDF 62os. At this time, a gain gradient of the S$^+$-band WDM optical signal that is output from the TDF 62os is detected by the respective PDs 64os and 67os. Since the optical power of pump light for the TDF 62os is adjusted by the operation unit 68os's controlling the LD driving circuit 66os based on detection results, the monitoring/control circuit 28 can almost eliminate the gain gradient in the S$^+$ band. Since the gain-wavelength characteristic of the TDF 62os depends on the optical power of the pump light, the gain gradient can be almost eliminated by adjusting the optical power of the pump light for the TDF 62os.

As described above, in the optical transmission system according to the fifth embodiment, the gain gradient in each wavelength band can almost be eliminated in the interval of the three-wavelength-band WDM optical signal sending apparatus and the first repeater by the two-step configuration of rare-earth-element-doped fibers in each of the TDFA 22, the EDFA 23, and the GS-EDFA 24. Further, in the optical transmission system according to the fifth embodiment, since preemphases are provided for the respective bands by means of the respective VATs in the TDFA 22, the EDFA 23, and the GS-EDFA 24, the gain gradients between the three wavelength bands can almost be eliminated.

Since the gain gradients between the three wavelength bands can almost be eliminated in each repeater, the optical SNRs of received WDM optical signals in the respective bands are made uniform and hence the performance of the entire optical transmission system can be improved.

In the above configuration, the monitoring/control circuit 28 or 38 adjusts the outputs of the TDFA 22 or 23, the EDFA 23 or 33, and the GS-EDFA 24 or 34 in consideration of the stimulated Raman scattering, the loss in the optical fiber 48, and the loss in the WDM coupler 25 or 35. As indicated by a broken line in FIG. 11, another configuration is possible in which the composite optical amplifying apparatus or the three-wavelength-band WDM signal sending apparatus is additionally provided with a ROM 75 that stores data relating to noise figures and the monitoring/control circuit 28 or 38 adjusts the outputs while referring to the data stored in the ROM 75.

In this case, the data relating to noise figures are noise figure-wavelength characteristics for each optical power value of laser beam emitted from the LD 55 or 65 as the pump source for each of the TDFA 22 or 32, the EDFA 23 or 33, and the GS-EDFA 24 or 34.

The monitoring/control circuit 38 corrects, based on the noise figure-wavelength characteristics that are stored in the ROM 75, a target value that was calculated by referring to the correspondence table between the sending optical power and the reception optical power that is stored in the ROM 51. The monitoring/control circuit 38 outputs a corrected target value to the ROM 74.

In the above configuration, the monitoring/control circuit 38 adjusts the optical powers of WDM optical signals in the respective wavelength bands to be transmitted from the repeater concerned by comparing the optical powers of WDM optical signals in the respective wavelength bands to be transmitted from the repeater concerned and the optical powers of WDM optical signals in the respective wavelength bands in the next-stage repeater. Another configuration is possible in which another EBG whose central frequency of the pass-band is so set that only light of the shortest-wavelength channel in the band is passed is provided between the coupler 37 and PD 54 and an output of PD 54, rather than the PD 61, is supplied to the operation unit 71. This makes it possible to reduce the number of parts and thereby simplify the circuit. The ROM 75 may further be provided in this case.

Embodiment 6

A sixth embodiment is directed to an optical transmission system.

This optical transmission system is such that a two-wavelength-band WDM optical signal sending apparatus generates a two-wavelength-band WDM optical signal, composite optical amplifying apparatuses relay the two-wavelength-band WDM optical signal plural times, and a WDM optical signal receiving apparatus receives and processes the two-wavelength-band WDM optical signal. The two-wavelength-band WDM optical signal consists of a WDM optical signal having t channels that is set in the C band and a WDM optical signal having u channels that is set in the L band.

Figure 12:
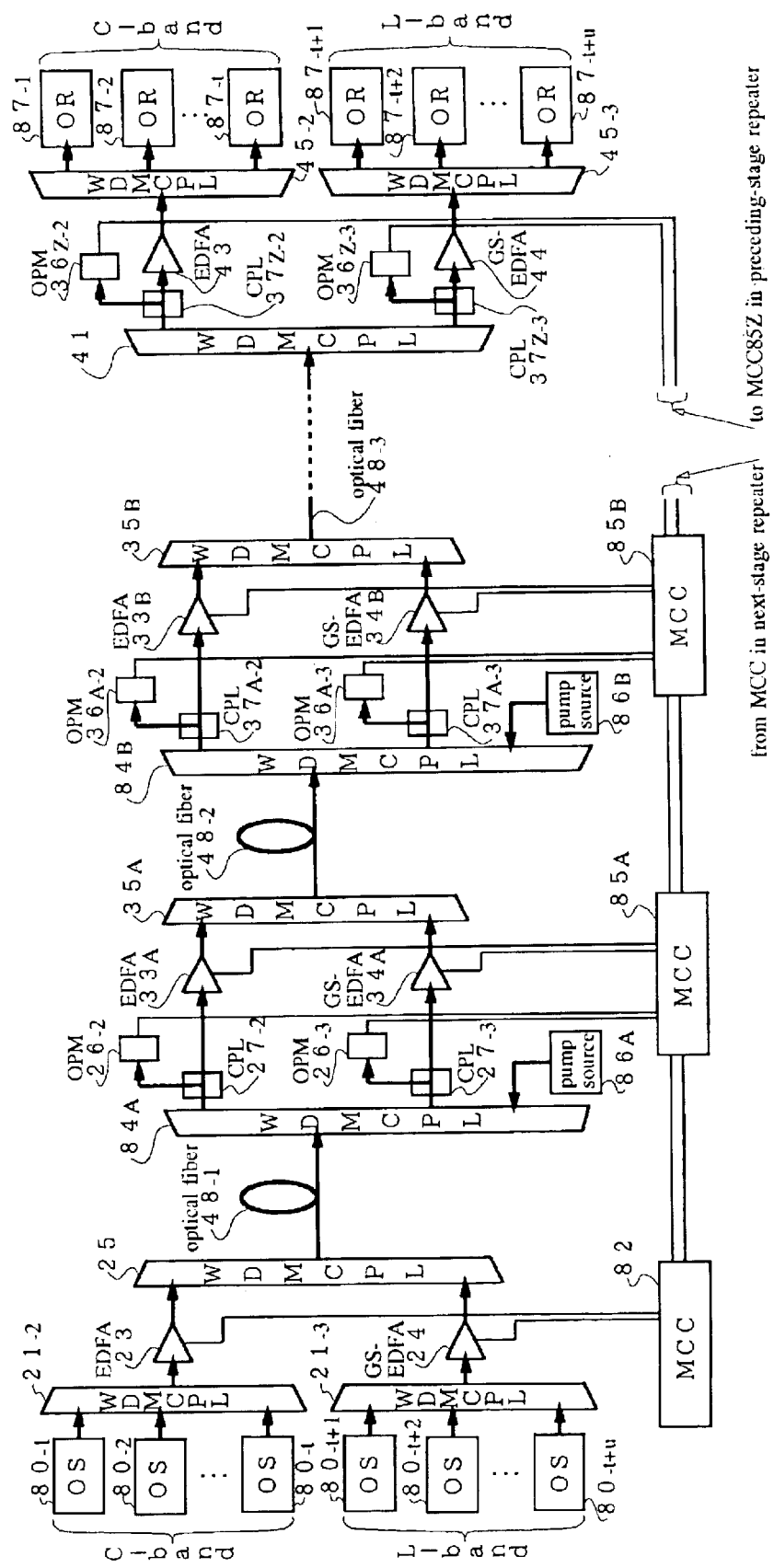
FIG. 12 is a block diagram of an optical transmission system according to a sixth embodiment of the invention.

As shown in FIG. 12, t optical senders 80-1 to 80-t generate optical signals corresponding to channel-1 to channel-t of the C band, respectively. For example, each of the optical senders 80-1 to 80-t can be composed of a semiconductor laser for emitting laser beam having a wavelength that is assigned to the associated channel, an MZ modulator for modulating the laser beam with information to be sent out, and a control section for driving and controlling the semiconductor laser and the MZ modulator. Each of the optical senders 80-1 and 80-t is controlled, as to whether to generate an optical signal, through a control signal that is supplied from a monitoring/control circuit 82.

The optical signals generated by the respective optical senders 80-1 to 80-t are wavelength-multiplexed by a WDM coupler 21-2 into a WDM optical signal, which is input to an EDFA 23.

The output of the EDFA 23 is controlled by the monitoring/control circuit 82, whereby the optical power of the C-band WDM optical signal is controlled. The optical-power-controlled C-band WDM optical signal is input to a WDM coupler 25.

An L-band WDM optical signal is generated by a block that is similar to the above and is composed of u optical senders 80-t+1 to 80-t+u, a WDM coupler 21-3, and a GS-EDFA 24. The generated L-band WDM optical signal is input to the WDM coupler 25.

The C-band WDM optical signal and the L-band WDM optical signal are wavelength-multiplexed by the WDM coupler 25 into a two-wavelength-band WDM optical signal, which is input to an optical fiber 48-1 as an optical transmission line and transmitted through it to the next-stage repeater.

After being transmitted through the optical fiber 48-1, the two-wavelength-band WDM optical signal is input to a WDM coupler 84A in the next-stage repeater, where it is wavelength-demultiplexed into WDM optical signals in the respective bands. The WDM optical signals in the respective bands are input to couplers 27-2 and 27-3.

A pump source 86A is comprised of an LD for emitting laser beam, a driving circuit for supplying a drive current to the LD, and a control circuit for keeping the wavelength and the optical power of the laser beam at predetermined values by controlling the driving circuit. Laser beam emitted from the pump source 86A is input to the optical fiber 48-1 via the WDM coupler 84A. The predetermined wavelength is a wavelength at which a C-band WDM optical signal and an L-band WDM optical signal can be amplified in the optical fiber 48-1 by stimulated Raman scattering. The predetermined optical power is optical power with which losses of a C-band WDM optical signal and an L-band WDM optical signal in the WDM coupler 84A can be compensated for by stimulated Raman scattering in the optical fiber 48-1.

Where the loss in the WDM coupler 84A is compensated for by amplification through stimulated Raman scattering, it is necessary to take into consideration that the amplification through stimulated Raman scattering and the loss in the WDM coupler 84A have wavelength dependence as shown in FIGS. 2B and 2D.

The C-band WDM optical signal is branched by a coupler 27-2 into two parts, which are input to an optical power meter 26-2 and an EDFA 33A. Similarly, the L-band WDM optical signal is branched by a coupler 27-3 into two parts, which are input to an optical power meter 26-3 and a GS-EDFA 34A. The monitoring/control circuit 85A sends, to the pre-stage monitoring/control circuit 82, a result of measurement of the optical power of the C-band WDM optical signal by the optical power meter 26-2 and a result of measurement of the optical power of the L-band WDM optical signal by the optical power meter 26-3.

The monitoring/control circuit 82 receives the outputs of the optical power meters 26-2 and 26-3, calculates the difference between the optical powers of the respective bands, and adjusts the outputs of the EDFA 23 and the GS-EDFA 24 so that the difference will be eliminated.

On the other hand, the C-band WDM optical signal that is input to the EDFA 33A is amplified by the EDFA 33A and input to a WDM coupler 35A. The output of the EDFA 33A is controlled by the monitoring/control circuit 85A, whereby the optical power of the C-band WDM optical signal is controlled.

The L-band WDM optical signal that is input to the GS-EDFA 34A is amplified by the EDFA 34A whose output is controlled by the monitoring/control circuit 85A. The amplified L-band WDM optical signal is input to the WDM coupler 35A.

The WDM optical signals of the respective bands are wavelength-multiplexed by the WDM coupler 35A and thereby returned to a two-wavelength-band WDM optical signal. The two-wavelength-band WDM optical signal is input to an optical fiber 48-2 and transmitted to the next-stage repeater through it.

After being transmitted through the optical fiber 48-2, the two-wavelength-band WDM optical signal is input to a WDM coupler 84B in the next-stage repeater, where it is wavelength-demultiplexed into WDM optical signals in the respective bands. The WDM optical signals in the respective bands are input to respective couplers 37A-2 and 37A-3.

A pump source 86B has the same configuration as the pump source 86A. Laser beam emitted from the pump source 86B is input to the optical fiber 48-2 via the WDM coupler 84B.

The C-band WDM optical signal is branched by a coupler 37A-2 into two parts, which are input to an optical power meter 36A-2 and an EDFA 33B. Similarly, the L-band WDM optical signal is branched by a coupler 37A-3 into two parts, which are input to an optical power meter 36A-3 and a GS-EDFA 34B. The monitoring/control circuit 85B sends, to the pre-stage monitoring/control circuit 85A, a result of measurement of the optical power of the C-band WDM optical signal by the optical power meter 36A-2 and a result of measurement of the optical power of the L-band WDM optical signal by the optical power meter 36A-3.

The monitoring/control circuit 85A receives the outputs of the optical power meters 36A-2 and 36A-3, calculates the difference between the optical powers of the respective bands, and adjusts the outputs of the EDFA 33A and the GS-EDFA 34A so that the difference will be eliminated.

On the other hand, the C-band WDM optical signal that is input to the EDFA 33B is amplified by the EDFA 33B and input to a WDM coupler 35B. The output of the EDFA 33B is controlled by the monitoring/control circuit 85B, whereby the optical power of the C-band WDM optical signal is controlled.

The L-band WDM optical signal that is input to the GS-EDFA 34B is amplified by the GS-EDFA 34B whose output is controlled by the monitoring/control circuit 85B. The amplified L-band WDM optical signal is input to the WDM coupler 35B.

The WDM optical signals of the respective bands are wavelength-multiplexed by the WDM coupler 35B and thereby returned to a two-wavelength-band WDM optical signal. The two-wavelength-band WDM optical signal is input to an optical fiber 48-3 and transmitted to the next-stage repeater through it.

Subsequently, in similar manners, the two-wavelength-band WDM optical signal is demultiplexed into WDM optical signals in the respective bands, subjected to optical power amplification and control, and wavelength-multiplexed. The three-wavelength-band WDM optical signal is relayed plural times in this manner. As described above, the optical power amplification and control on WDM optical signals in the respective bands are performed by the EDFA 33 and the GS-EDFA 34.

A two-wavelength-band WDM optical signal that is output from the final-stage composite optical amplifying apparatus is input to a WDM coupler 41, where it is demultiplexed into WDM optical signals in the respective bands. The WDM optical signals in the respective bands are input to respective couplers 36Z-2 and 36Z-3.

The C-band WDM optical signal is branched by the coupler 37Z-2 into two parts, which are input to an optical power meter 36Z-2 and an EDFA 43. A result of measurement of the optical power of the C-band WDM optical signal by the optical power meter 36Z-2 is sent to the pre-stage monitoring/control circuit 85Z. Similarly, the L-band WDM optical signal is branched by the coupler 37Z-3 into two parts, which are input to an optical power meter 36Z-3 and a GS-EDFA 44. A result of measurement of the optical power of the L-band WDM optical signal by the optical power meter 36Z-3 is sent to the pre-stage monitoring/control circuit 85Z.

The C-band WDM optical signal amplified by the EDFA 43 is input to a WDM coupler 45-2, where it is wavelength-demultiplexed into optical signals of channel-1 to channel-t. The wavelength-demultiplexed optical signals of the respective channels are input to respective optical receivers 87-1 to 87-t, where they are received and processed.

Similarly, the L-band WDM optical signal amplified by the GS-EDFA 44 is wavelength-demultiplexed by a WDM coupler 45-3 into optical signals of channel-1 to channel-u, which are input to respective optical receivers 87-t+1 to 87-t+u, where they are received and processed.

Since the EDFAs 23 and 33 and the GS-EDFAs 24 and 34 are the same as in the fifth embodiment except for the contents of the RON 51os and 51 and the manners of control of the monitoring/control circuits 82 and 85, they are not described here.

The contents of each of the ROMS 51os and 51 are a decrease amount of optical power per channel of a C-band WDM optical signal that should be used to make the optical powers of the two respective bands approximately identical in the next-stage repeater when the number of channels of a C-band WDM optical signal has increased by k ($0 \leq k \leq t-1$) and an increase amount of optical power per channel of a C-band WDM optical signal that should be used to make the optical powers of the two respective bands approximately identical in the next-stage repeater when the number of channels of a C-band WDM optical signal has increased by k ($0 \leq k \leq t-1$).

Increase and decrease amounts are determined in advance for each k value through theoretical calculation or actual measurement in consideration of the stimulated Raman scattering in the optical fiber between the repeater concerned and the next-stage repeater, the loss in the optical fiber, the losses in the WDM coupler 35 in the repeater concerned and the WDM coupler 84 in the next-stage repeater.

Optical power increase and decrease amounts per channel of an L-band WDM optical signal for k=0 (i.e., the number of channel is not changed) are the same as in the correspondence table between the sending optical power and the reception optical power in the fifth embodiment.

Next, the operation principle and the advantageous effects of the sixth embodiment will be described. Since the control of the gain gradient in each wavelength band and the control of the gain gradients between each wavelength band that are performed after the number of channels of the C-band has been increased or decreased are the same as in the fifth embodiment, they are not described here.

To set the number of channels of the C band to m ($1 \leq m \leq t$) in the above optical transmission system, the monitoring/control circuit 82 assigns them channels to optical senders 80-1 to 80-m and causes the optical senders 80-1 to 80-m to generate optical signals.

The generated optical signals are wavelength-multiplexed by the WDM coupler 21-2 and a resulting C-band WDM optical signal is amplified by the EDFA 23. The amplified C-band WDM optical signal consisting of m waves is wavelength-multiplexed by the WDM coupler 25 with an L-band WDM optical signal consisting of u waves into a two-wavelength-band WDM optical signal, which is transmitted through the optical fiber 48-1.

In this case, in the optical fiber 48-1, the two-wavelength-band WDM optical signal is subjected to stimulated Raman scattering that involves pump light that is emitted from the pump source 86A, whereby the loss in the WDM coupler 84A is compensated for. Since the pump light of the pump source 86A amplifies the WDM optical signals in both bands, it does not serve to equalize the optical powers of the respective bands after the transmission through the optical fiber 48-1.

To increase the number of channels of the C-band by, for example, three, the monitoring/control circuit 82 newly assigns three channels to optical senders 80-m+1 to 80-m+3 and causes the optical senders 80-m+1 to 80-m+3 to generate optical signals.

The generated optical signals are wavelength-multiplexed by the WDM coupler 21-2 and amplified by the EDFA 23.

At this time, the monitoring/control circuit 82 adjusts the output of the EDFA 23 by referring to a decrease amount (stored in the ROM 51os) of optical power per channel of a C-band WDM optical signal that should be used when the number of channels of a C-band optical signal has been increased by three ($0 \leq k \leq t-1$). That is, whereas before the increase in the number of channels the optical power of the first wavelength band was controlled by referring to the correspondence table between the sending optical power and the reception optical power by using P0 (see FIG. 4A) as a reference, after the addition of three channels it is controlled by using, as a reference, a new optical power value that is smaller than P0 by the decrease amount.

After being amplified, the C-band WDM optical signal consisting of m+3 waves is wavelength-multiplexed by the WDM coupler 25 with an L-band WDM optical signal consisting of u waves into a two-wavelength-band WDM optical signal, which is transmitted through the optical fiber 48-1.

On the other hand, to decrease the number of channels, in the same manner as in the above case, the monitoring/control circuit 82 sets a new reference by referring to an increase amount (stored in the ROM 51os) of optical power per channel that should be used when the number of channel has been decreased.

With the above control, in the optical transmission system according to the sixth embodiment, preemphases are provided for the respective bands quickly in response to increase or decrease in the number of channels and hence gain gradients between the two wavelength bands can almost be eliminated.

Further, in the optical transmission system according to the sixth embodiment, since gain gradients between the two wavelength bands are almost eliminated in each repeater, the optical SNRs of received WDM optical signals in the respective bands are made uniform and hence the performance of the entire optical transmission system can be improved.

Embodiment 7

A seventh embodiment is directed to an optical transmission system.

This optical transmission system is such that a two-wavelength-band WDM optical signal sending apparatus generates a two-wavelength-band WDM optical signal, composite optical amplifying apparatuses relay the two-wavelength-band WDM optical signal plural times, and a WDM optical signal receiving apparatus receives and processes the two-wavelength-band WDM optical signal. The two-wavelength-band WDM optical signal sending apparatus performs inner-wavelength-band preemphasis and inter-wavelength-band preemphasis on WDM optical signals. Each composite optical amplifying apparatus performs inter-wavelength-band preemphasis while performing optical amplification. The two-wavelength-band WDM optical signal consists of a WDM optical signal having t channels that are set in the C band and a WDM optical signal having u channels that are set in the L band.

Figure 13:
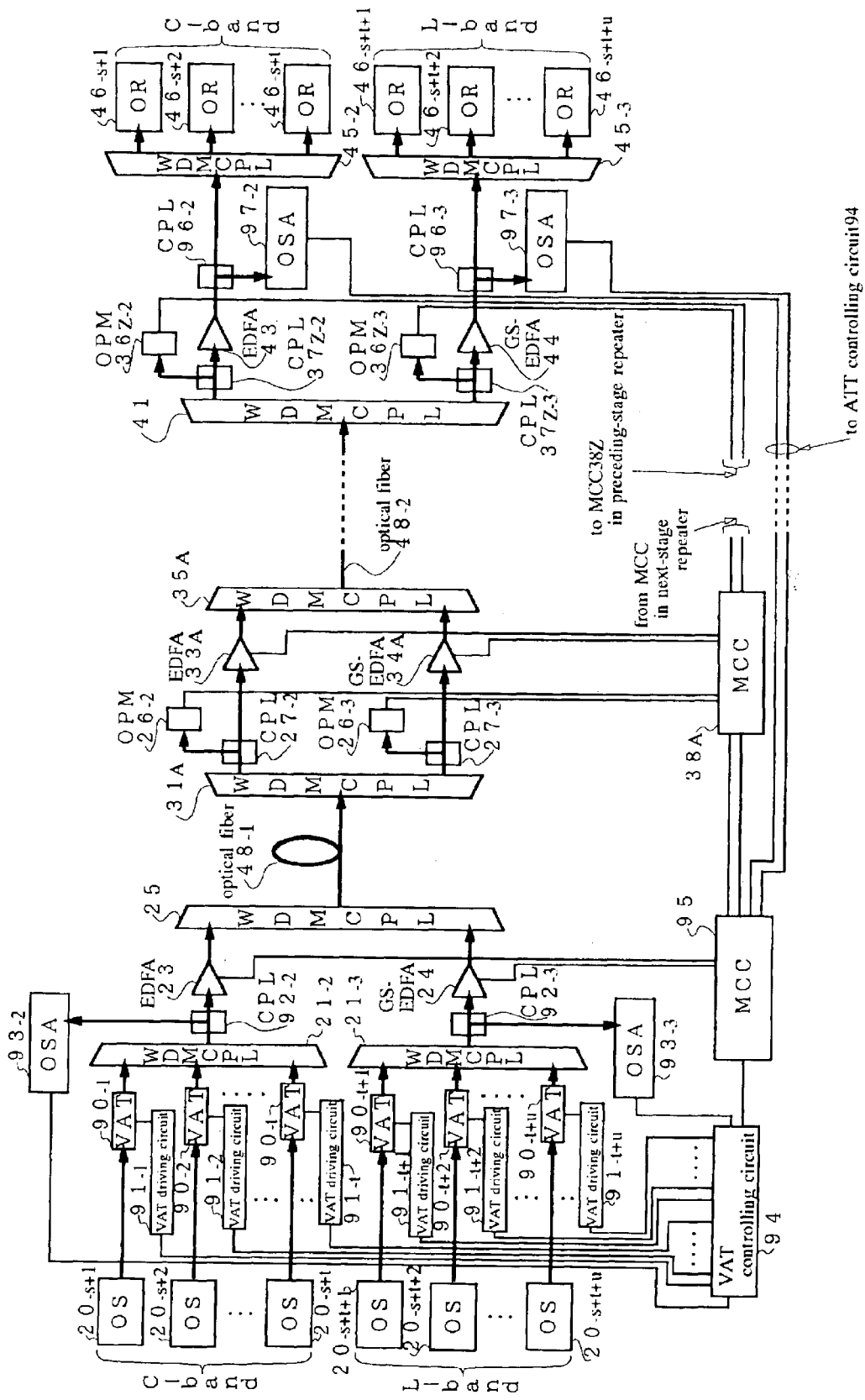
FIG. 13 is a block diagram of an optical transmission system according to a seventh embodiment of the invention.

As shown in FIG. 13, t optical senders 20-s+1 to 20-s+t generate optical signals corresponding to channel-1 to channel-t of the C band, respectively. The generated optical signals are input to respective VATs 90-1 to 90-t.

The VATs 90-1 to 90-t attenuate the optical powers of input light beams and output attenuated light beams. The attenuation amounts are variable. The attenuation amounts are controlled by VAT driving circuits 91-1 to 91-t, setting of which is performed by a VAT control circuit 94.

Since the optical powers of respective optical signals in the C band are adjusted by the respective VATs 90-1 to 90-t, inner-wavelength band preemphasis can be performed.

The optical signals that are output from the respective VATs 90-1 to 90-t are input to a WDM coupler 21-2, where they are wavelength-multiplexed into a C-band WDM optical signal. The C-band WDM optical signal is input to a coupler 92-2 for branching a WDM optical signal into two parts at an optical power ratio of 10:1, for example.

The C-band WDM optical signal having the smaller optical power that has been separated by the coupler 92-2 is input to an optical spectrum analyzer 93-2 for detecting wavelengths of input light and optical power values at the detected wavelengths, where a spectrum of the C-band WDM optical signal is measured. The optical spectrum analyzer 93-2 outputs a measurement result to the VAT control circuit 94.

The C-band WDM optical signal having the larger optical power that has been separated by the coupler 92-2 is input to an EDFA 23. The output of the EDFA 23 is controlled by a monitoring/control circuit 95, whereby the optical power of the C-band WDM optical signal is controlled. The C-band WDM optical signal is input to a WDM coupler 25.

An L-band WDM optical signal is generated by a block that is similar to the above block and is composed of u optical senders 20-s+t+1 to 20-s+t+u, VATs 90-t+1 to 90-t+u, VAT driving circuits 91-t+1 to 91-t+u, a WDM coupler 21-3, a coupler 92-3, an optical spectrum analyzer 93-3, a VAT control circuit 94, and a GS-EDFA 24. The generated L-band WDM optical signal is input to the WDM coupler 25.

The C-band WDM optical signal and the L-band WDM optical signal are wavelength-multiplexed by the WDM coupler 25 into a two-wavelength-band WDM optical signal, which is input to an optical fiber 48-1 as an optical transmission line and transmitted through it to the next-stage repeater.

After being transmitted through the optical fiber 48-1, the two-wavelength-band WDM optical signal is input to a WDM coupler 31A in the next-stage repeater, where it is wavelength-demultiplexed into WDM optical signals in the respective bands. The WDM optical signals in the respective bands are input to couplers 27-2 and 27-3.

The C-band WDM optical signal is branched by a coupler 27-2 into two parts, which are input to an optical power meter 26-2 and an EDFA 33A. Similarly, the L-band WDM optical signal is branched by a coupler 27-3 into two parts, which are input to an optical power meter 26-3 and a GS-EDFA 34A. The monitoring/control circuit 85A sends, to the pre-stage monitoring/control circuit 95, a result of measurement of the optical power of the C-band WDM optical signal by the optical power meter 26-2 and a result of measurement of the optical power of the L-band WDM optical signal by the optical power meter 26-3.

The monitoring/control circuit 95 receives the outputs of the optical power meters 26-2 and 26-3, calculates the difference between the optical powers of the respective bands, and adjusts the outputs of the EDFA 23 and the GS-EDFA 24 so that the difference will be eliminated.

On the other hand, the C-band WDM optical signal that is input to the EDFA 33A is amplified by the EDFA 33A and input to a WDM coupler 35A. The output of the EDFA 33A is controlled by the monitoring/control circuit 85A, whereby the optical power of the C-band WDM optical signal is controlled.

The L-band WDM optical signal that is input to the GS-EDFA 34A is amplified by the EDFA 34A whose output is controlled by the monitoring/control circuit 85A. The amplified L-band WDM optical signal is input to the WDM coupler 35A.

The WDM optical signals of the respective bands are wavelength-multiplexed by the WDM coupler 35A and thereby returned to a two-wavelength-band WDM optical signal. The two-wavelength-band WDM optical signal is input to an optical fiber 48-2 and transmitted to the next-stage repeater through it.

The two-wavelength-band WDM optical signal is relayed plural times by the composite optical amplifying apparatuses in such a manner as to be demultiplexed into WDM optical signals in the respective bands, subjected to optical power amplification and control, and wavelength-multiplexed in the same manner as in a case where no S$^+$-band WDM optical signal exists in the fifth embodiment. The optical power amplification and control on WDM optical signals in the respective bands are performed by the EDFA 33 and the GS-EDFA 34 that are controlled based on the outputs of the optical power meters 36-2 and 36-3 in the next-stage composite optical amplifying apparatus.

A two-wavelength-band WDM optical signal that is output from a composite optical amplifying apparatus as the final-stage repeater is input to a WDM coupler 41, where it is demultiplexed into WDM optical signals in the respective bands. The WDM optical signals in the respective bands are input to respective couplers 36Z-2 and 36Z-3.

The C-band WDM optical signal is branched by the coupler 37Z-2 into two parts, which are input to an optical power meter 36Z-2 and an EDFA 43. A result of measurement of the optical power of the C-band WDM optical signal by the optical power meter 36Z-2 is sent to the pre-stage monitoring/control circuit 38Z.

The C-band WDM optical signal amplified by the EDFA 43 is input to a coupler 96-2 for branching light into two parts at an optical power ratio of 10:1, for example.

The C-band WDM optical signal having the smaller optical power that has been separated by the coupler 92-2 is input to an optical spectrum analyzer 97-2, where a spectrum of the C-band WDM optical signal is measured. The optical spectrum analyzer 97-2 outputs a spectrum measurement result to the monitoring/control apparatus 95, which supplies the received spectrum measurement result to the VAT control circuit 94 as it is.

The C-band WDM optical signal having the larger optical power that has been separated by the coupler 92-2 is input to a WDM coupler 45-2, where it is wavelength-demultiplexed into optical signals of channel-1 to channel-t. The optical signals of the respective channels are input to respective optical receivers 46-s+1 to 46-s+t, where they are received and processed.

The L-band WDM optical signal is received and processed by a block that is similar to the above block and is composed of a coupler 37Z-3, an optical power meter 36Z-3, a GS-EDFA 44, a coupler 96-3, an optical spectrum analyzer 97-3, a WDM coupler 45-3, and optical signal receiving sections 46-s+t+1 to 46-s+t+u.

Next, the configuration of each composite optical amplifying apparatus will be described in detail.

The configuration of each of the EDFA 33 and the GS-EDFA 34 of each composite optical amplifying apparatus are the same as in the fifth embodiment except that an optical filter 98 that equalizes the gain of the fiber amplifier is provided in place of the TDF 62, the FBGs 76 and 77, the PDs 64 and 67, the operation unit 68, the LD driving circuit 66, and the LD 65 that equalize the gain of the fiber amplifier.

The above configuration is employed for the following reason. That is, the method in which the gain-wavelength w characteristic of the EDF 78 is equalized by measuring gains for a shortest-wavelength optical signal and a longest-wavelength optical signal cannot easily equalize the gain-wavelength characteristic of the EDF 78 because a WDM optical signal that is input to the composite optical amplifying apparatus concerned was subjected to in-wavelength-band preemphasis.

Figure 14:
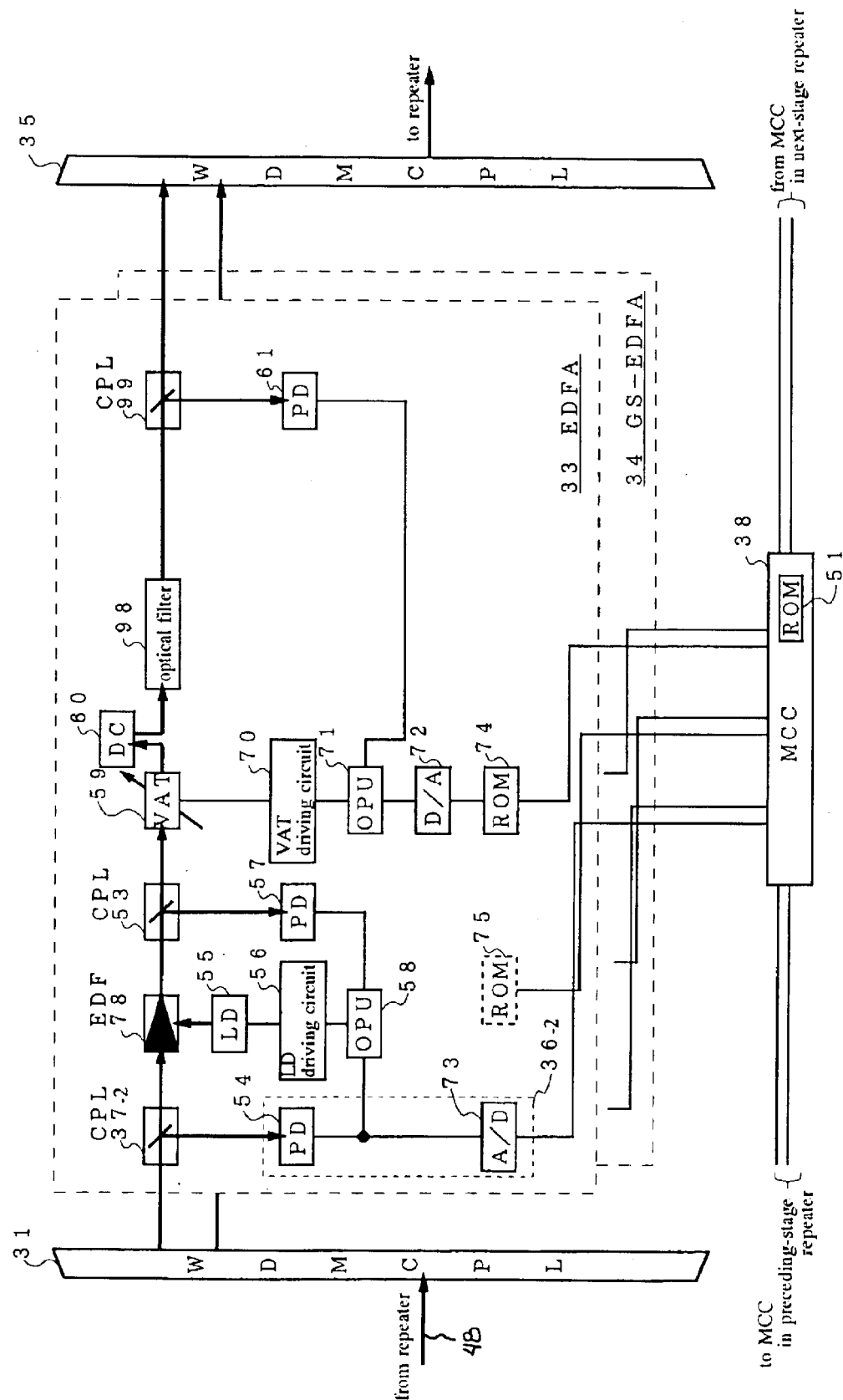
FIG. 14 is a block diagram of each composite optical amplifying apparatus in the optical transmission system of FIG. 13.
Figure 17:
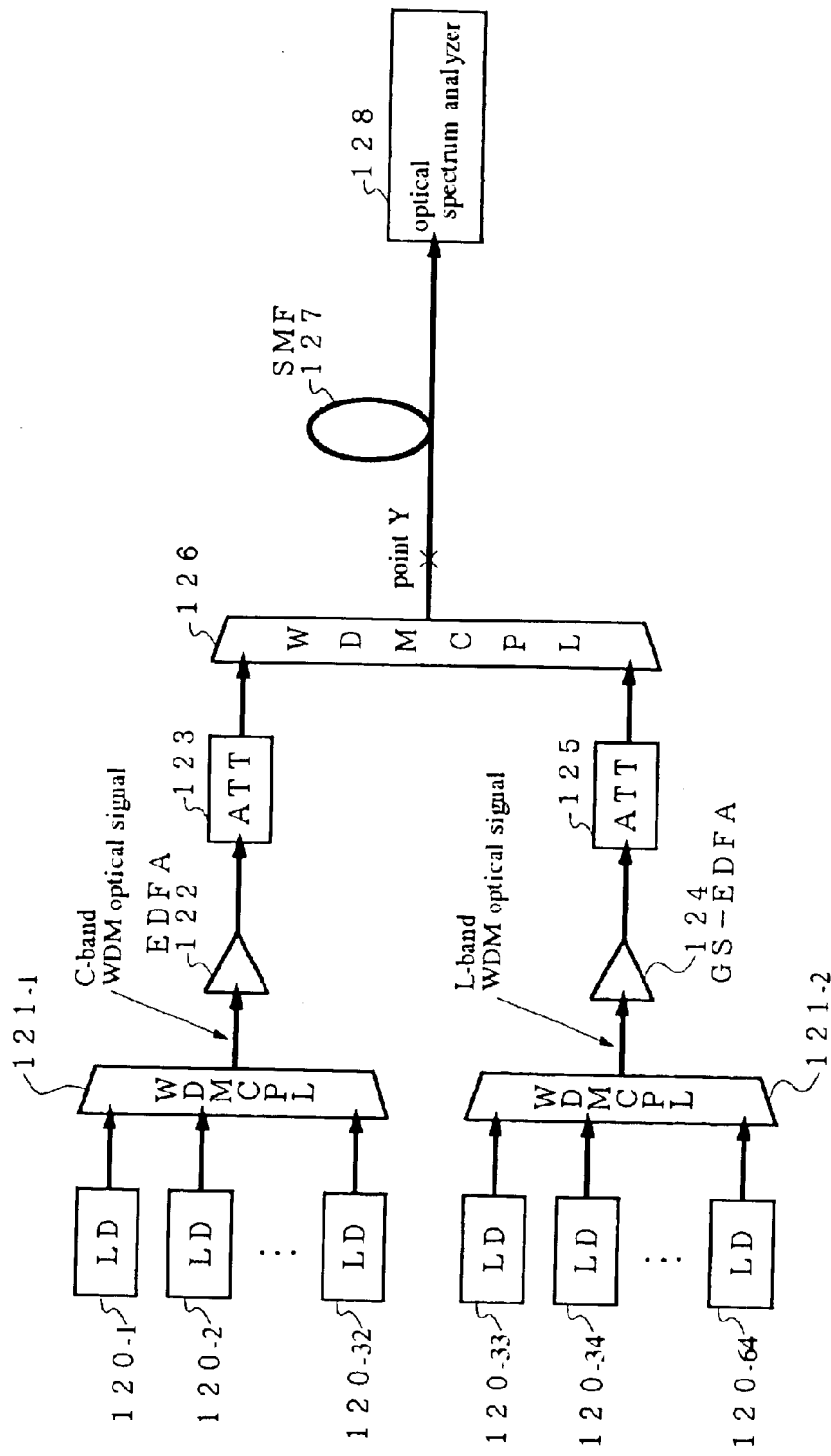
FIG. 17 is a block diagram of a measurement system for measuring a gain gradient due to stimulated Raman scattering in unidirectional transmission.
Figure 18:
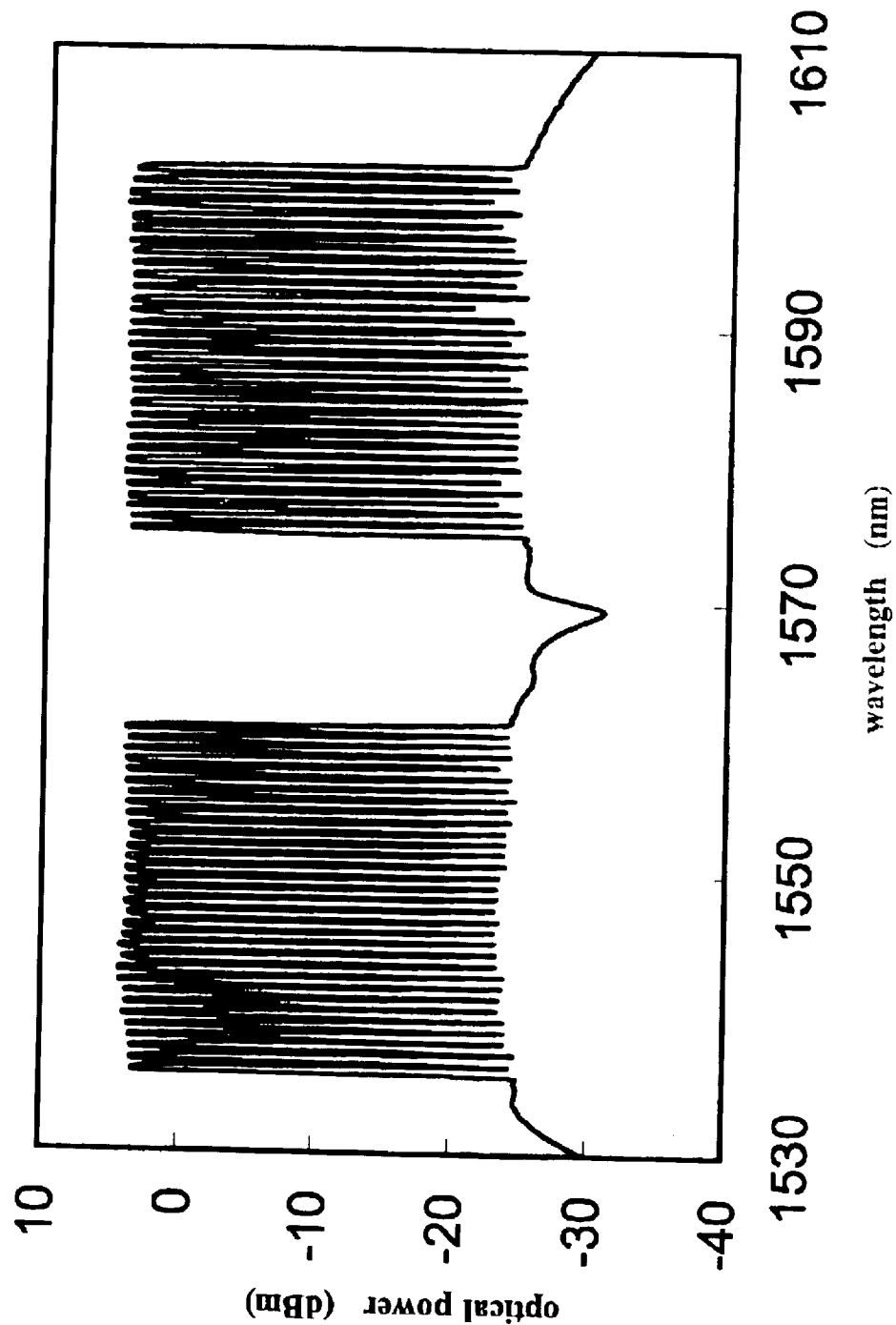
FIG. 18 shows a spectrum of two-wavelength-band WDM light at point Y.
Figure 19:
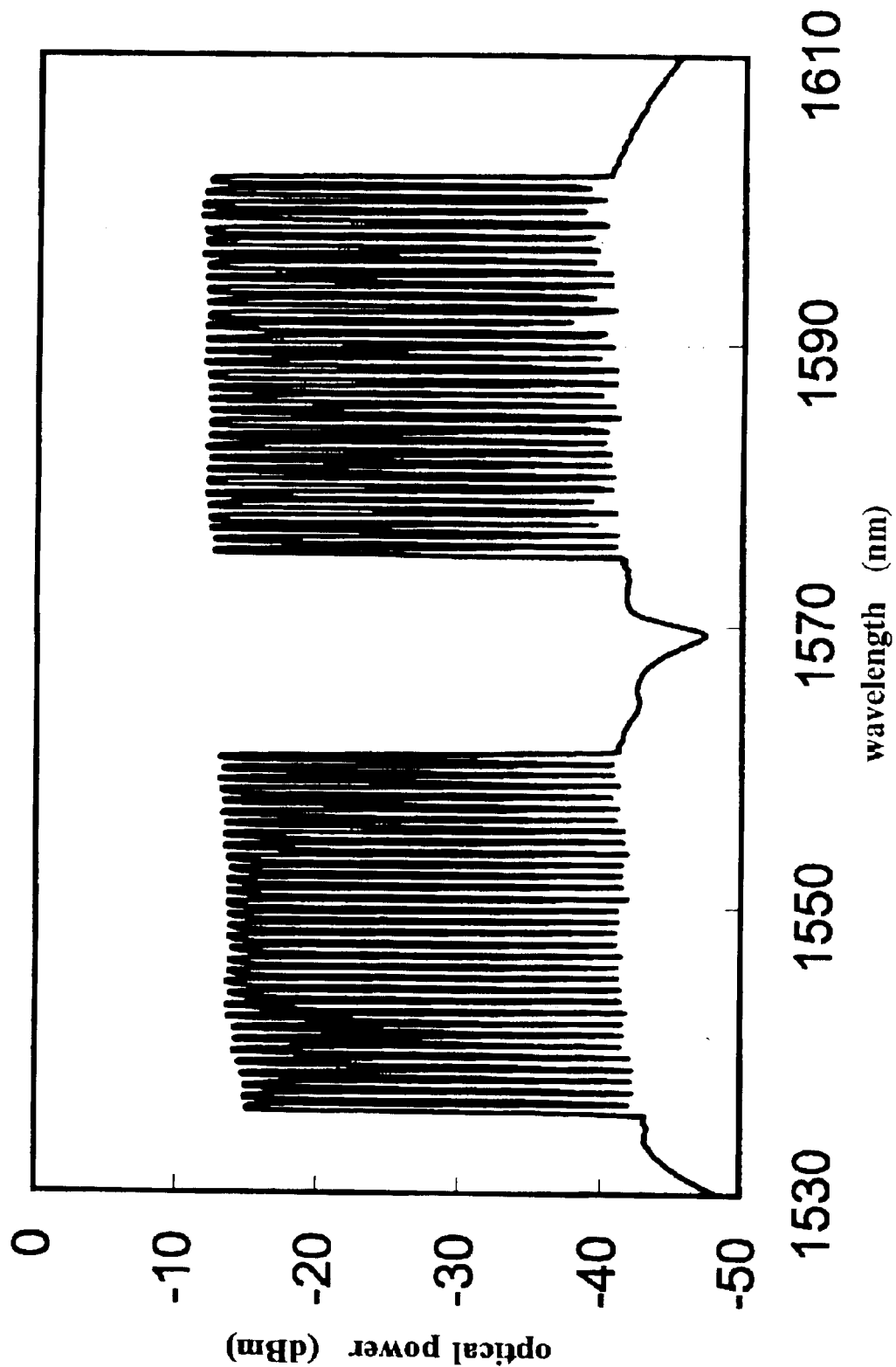
FIG. 19 shows a spectrum of two-wavelength-band WDM light after transmission over 80 km through an SMF.
Figure 20:
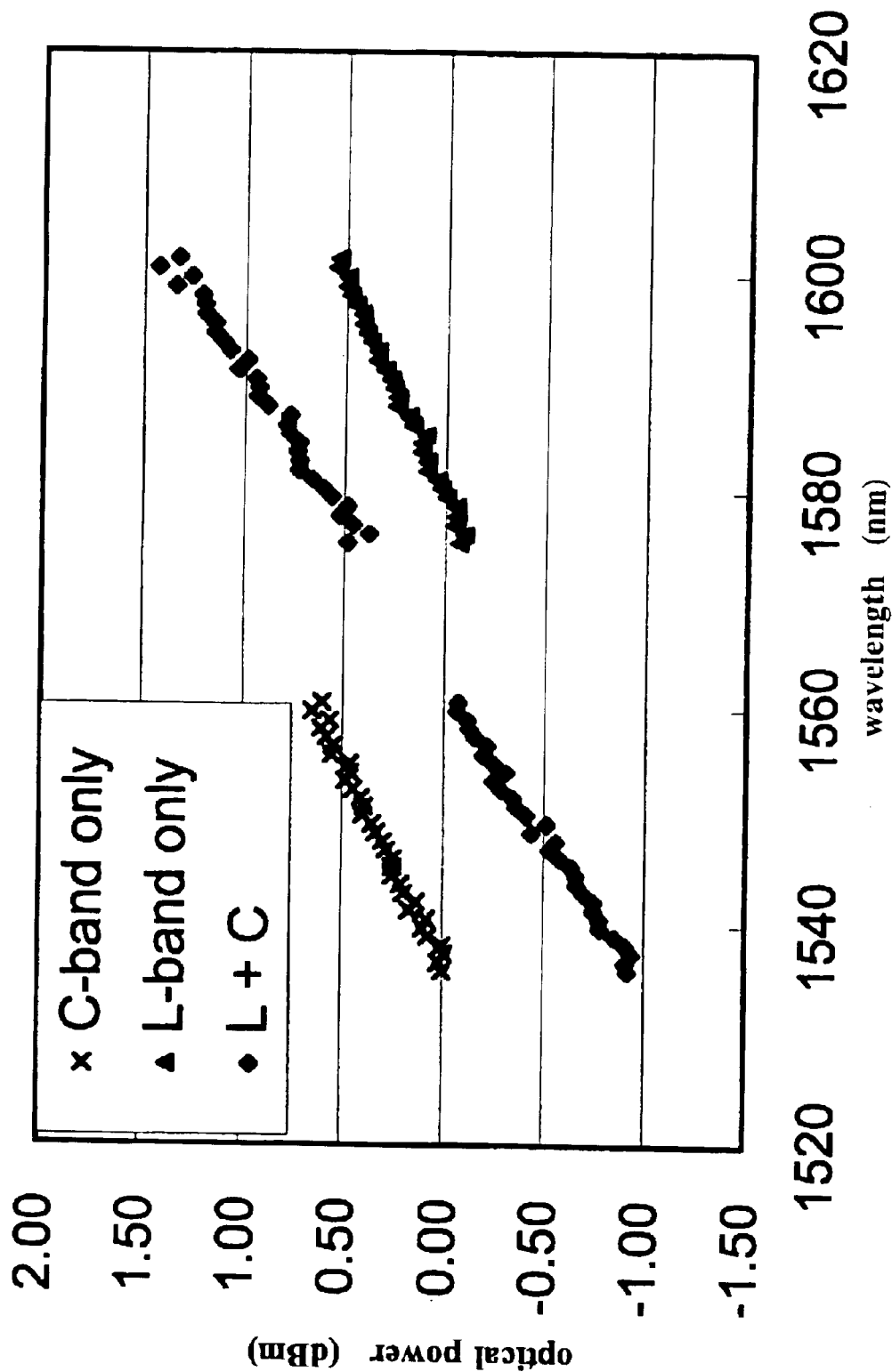
FIG. 20 is a graph showing Raman gains in the case of unidirectional transmission.

As shown in FIG. 14, a two-wavelength WDM optical signal that has been transmitted from the pre-stage composite optical amplifying apparatus through the optical fiber 48 is input to the WDM coupler 31, where it is wavelength-demultiplexed into WDM optical signals in the respective bands. The demultiplexed C-band WDM optical signal is input to the coupler 37-2 of the EDFA 33. The demultiplexed L-band WDM optical signal is input to the coupler 37-3 of the GS-EDFA 34.

Since the configurations of the EDFA 33 and the GS-EDFA 34 are different from each other only in the rare-earth-element-doped fiber and the pump source for pumping it, only the configuration of the EDFA 33 will be described in detail and the configuration of the GS-EDFA 34 will be described only for different points.

The EDFA 33 will be described below.

A WDM optical signal having smaller optical power separated by the coupler 37-2 is input to a PD 54, where it is subjected to photoelectric conversion. The PD 54 outputs a resulting current value to an operation unit 58 and an A/D 73. The A/D 73 converts the input current value from an analog value to a digital value and outputs the digital current value to the monitoring/control circuit 38. The monitoring/control circuit 38 converts the received digital value into an optical signal and sends the optical signal to the monitoring/control circuit in the pre-stage repeater via a control line.

On the other hand, a WDM optical signal having larger optical power separated by the coupler 37-2 is input to an erbium-doped fiber (hereinafter abbreviated as EDF) 78. Population inversion is formed in the EDF 78 through absorption of laser beam that is emitted from an LD 55, and the EDF 78 amplifies the WDM optical signal through stimulated emission. Supplied with a drive current from an LD driving circuit 56, the LD 55 emits laser beam for pumping the EDF 78.

The WDM optical signal amplified by the EDF 78 is input to a coupler 53. A WDM optical signal having smaller optical power that has been separated by the coupler 53 is input to a PD 57, where it is subjected to photoelectric conversion. The PD 57 outputs a resulting current to the operation unit 58.

The operation unit 58 converts the currents that are input from the PDs 54 and 57 into voltages by using resistors (not shown in FIG. 14), respectively. The operation unit 58 compares the voltages corresponding to the respective PDs 54 and 57 and supplies an output corresponding to the difference between the two voltages to the LD driving circuit 56. The LD driving circuit 56 judges the gain of the WDM optical signal being amplified by the EDF 78 based on the output of the operation unit 56, and adjusts the drive current for the LD 55 so that the gain becomes a predetermined value.

On the other hand, a WDM optical signal having larger optical power that has been separated by the coupler 53 is input to a VAT 59. The VAT 59 attenuates the optical power of the input WDM optical signal and outputs the attenuated WDM optical signal, the attenuation amount being controlled by a VAT driving circuit 70.

The WDM optical signal whose optical power has been attenuated by the VAT 59 is input to a DC 60, where chromatic dispersion is compensated for.

The WDM optical signal that is output from the DC 60 is input to an optical filter 98. The optical filter 98 is a gain equalizer for making the gain-wavelength characteristic of the EDF 78 approximately flat.

The WDM optical signal that is output from the optical filter 98 is input to a coupler 99 for branching light into two parts.

One WDM optical signal separated by the coupler 99 is input to a PD 61, where it is subjected to photoelectric conversion. The PD 61 outputs a resulting current to an operation unit 71. The other WDM optical signal separated by the coupler 99 is input to the WDM coupler 35, where it is converted into an optical signal to be transmitted to the next-stage repeater.

The monitoring/control circuit 38 receives, from the monitoring/control circuit of the next-stage repeater, signals indicating the optical powers of the respective bands of the two-wavelength-band WDM optical signal that was transmitted from the repeater concerned. Based on the received signals, the monitoring/control section 38 calculates the difference between optical powers of the respective bands after transmission. By referring to a correlation table between the sending optical power and the reception optical power that is stored in a ROM 51 in the monitoring/control circuit 38, the monitoring/control circuit 38 calculates, based on the difference, a target value of the optical power of a C-band WDM optical signal to be output from the repeater concerned. The monitoring/control circuit 38 converts the target value into a control value of the VAT driving circuit 70 based on a relationship between the target value and the control value of the VAT driving circuit 70 that is stored in a ROM 74. The monitoring/control circuit 38 outputs the resulting control value to a D/A 72. The D/A converts the control value from a digital value to an analog value and outputs the resulting analog control value to the operation unit 71.

The operation unit 71 compares the output of the D/A 72 with a voltage obtained through conversion of the current of the PD 61 by a resistor (not shown in FIG. 14), and supplies an output corresponding to the difference to the VAT driving circuit 70. Based on the output of the operation unit 71, the VAT driving circuit 70 adjusts the attenuation amount of the VAT 59. As a result, the optical power of the C-band WDM optical signal that is output from the repeater concerned is adjusted to a control value.

The configuration of the GS-EDFA 34 is the same as that of the EDFA 33 except that the EDF 78 is replaced by a long, erbium-doped fiber. Various settings of the dispersion compensation fiber 60 and the operation units 58 and 71 and the contents of the ROM 74 are adjusted so as to be suitable for handling of an L-band WDM optical signal.

The configuration of each composite optical amplifying apparatus has been described above in detail with reference to FIG. 14. The configurations of the EDFA 23 and the GS-EDFA 24 of the two-wavelength-band WDM optical signal sending apparatus shown in FIG. 13 are similar to those of each composite optical amplifying apparatus.

As for the corresponding relationship between the two apparatuses, the C-band WDM optical signal that is output from the WDM coupler 21-2 corresponds to that output from the WDM coupler 31 and the L-band WDM optical signal that is output from the WDM coupler 21-3 corresponds to that output from the WDM coupler 31. The EDFA 23 corresponds to the EDFA 33 and the GS-EDFA 24 corresponds to the GS-EDFA 34. The WDM coupler 25 corresponds to the WDM coupler 35, couplers 27-2 and 27-3 correspond to the couplers 37-2 and 37-3, and optical power meters 26-2 and 26-3 correspond to the optical power meters 36-2 and 36-3.

Next, the operation principle and the advantageous effects of the optical transmission system according to the seventh embodiment will be described. Since the control relating to the inter-wavelength-band preemphasis that is performed after the inner-wavelength band preemphasis is the same as in the fifth embodiment, it is not described here.

First, the inner-wavelength band preemphasis will be described.

A two-wavelength-band WDM optical signal that is output from the two-wavelength-band WDM optical signal sending apparatus is amplified and relayed by the repeaters that are composite optical amplifying apparatuses while being transmitted through the optical fibers 48, and then the two-wavelength-band WDM optical signal is input to the WDM optical signal receiving apparatus.

In the WDM optical signal receiving apparatus, a spectrum of the C-band WDM optical signal is measured by the optical spectrum analyzer 97-2. A measurement result is sent to the monitoring/control circuit 95 in the two-wavelength-band WDM optical signal sending apparatus via the control line that is dedicated to control signal transmission. Alternatively, one of the optical signals of the two-wavelength-band WDM optical signal may be used instead of using the control line. In this case, for example, undefined bytes of a section overhead of the SDH (synchronous digital hierarchy) are used. The section overhead is a portion in the SDH to accommodate information that is necessary to operate a network, such as maintenance information and a status monitor.

The monitoring/control circuit 95 outputs the measurement result to the VAT control circuit 94.

Based on the measurement result, the VAT control circuit 94 determines an optical signal having the best optical SNR value among the optical signals of the C-band WDM optical signal. The VAT control circuit 94 supplies signals to the VAT driving circuits 91-1 to 91-t corresponding to the respective optical signals and controls the attenuation amounts of the respective VATs 90-1 to 90-t so that the optical SNRs will be made equal to the best optical SNR value.

The optical signals whose optical powers have been adjusted by the respective VATs 90-1 to 90-t are wavelength-multiplexed by the WDM coupler 21-2 and a resulting C-band WDM optical signal is input to the coupler 92-2. After being separated by the coupler 92-2, part of the C-band WDM optical signal is input to the optical spectrum analyzer 93-2, where its spectrum is measured. The optical spectrum analyzer 93-2 outputs a measurement result to the VAT control circuit 94.

The VAT control circuit 94 judges, based on the measurement result supplied from the optical spectrum analyzer 93-2, whether the optical powers of the respective optical signals are equal to the intended values of the adjustment, and then finely adjusts the VAT driving circuits 91-1 to 91-t.

The inner-wavelength band preemphasis on the C-band WDM optical signal is performed in this manner.

Similarly, the inner-wavelength band preemphasis on the L-band WDM optical signal is performed by the coupler 96-3, the optical spectrum analyzer 97-3, the monitoring/control circuit 95, the VAT control circuit 94, the VAT driving circuits 91-t+1 to 91-t+u, the VATs 90-t+1 to 90-t+u, the coupler 92-3, and the optical spectrum analyzer 93-3.

The WDM optical signals that have been subjected to the inner-wavelength band preemphasis are then subjected to the inter-wavelength-band preemphasis in the manner described in the fifth embodiment, and the resulting WDM signals are output to the optical fiber 48-1.

In the first repeater, the optical powers of the WDM optical signals of the two-wavelength-band WDM signal are varied owing to the stimulated Raman scattering and the loss in the optical transmission line. However, since the inter-wavelength-band preemphasis was performed, the optical power of the C-band WDM optical signal is made approximately equal to that of the L-band WDM optical signal. The two-wavelength-band WDM signal is subjected to the inter-wavelength-band preemphasis and amplification in the repeater, and output to the optical fiber 48-2.

The two-wavelength-band WDM signal is similarly subjected to the inter-wavelength-band preemphasis and amplification in each of the subsequent repeaters. The two-wavelength-band WDM signal is relayed plural times by the plurality of repeaters and then input to the WDM optical signal receiving apparatus.

Since the received two-wavelength-band WDM signal was subjected to the inner-wavelength band preemphasis as described above, deterioration in optical SNRs due to ASEs caused by the EDFA 23 or 33 and the GS-EDFA 24 or 34 in each apparatus can be reduced. Further, since the inter-wavelength-band preemphasis was also performed, deterioration in optical SNRs due to deviations between the wavelength bands caused by the stimulated Raman scattering etc. in the optical fibers 48 can also be reduced.

As such, the optical transmission system according to the seventh embodiment can further increase the distance of ultra-long distance transmission because the optical SNRs of the respective optical signals can greatly be increased.

Although in the seventh embodiment the in-wavelength-band preemphasis is adjusted by using the VATS, the invention is not limited to such a case and any device capable of adjusting optical power can be used. For example, a fiber amplifier and a semiconductor optical amplifier can be used. In the case of a fiber amplifier, the in-wavelength-band preemphasis can be performed by adjusting the gain by adjusting the output of pump light for pumping an optical fiber. In the case of a semiconductor laser optical amplifier, in-wavelength-band preemphasis can be performed by adjusting the gain by adjusting a bias current (drive current).

In the composite optical amplifying apparatus in each of the fifth to seventh embodiments, the gain gradient in each wavelength band is controlled by the next-stage rare-earth-element-doped fiber. Instead, a gain equalizer that is an optical filter can be used.

FIG. 15A shows a case where a gain equalizer is provided in each optical amplifying unit, and FIG. 15B shows a case where a gain equalizer is separated from the corresponding optical amplifying unit.

Referring to FIG. 15A, in this composite optical amplifying apparatus, a WDM coupler 31 demultiplexes an input three-wavelength-band WDM optical signal into WDM optical signals in respective bands. The demultiplexed WDM optical signals are input to optical amplifiers 101-1a to 101-3a of respective amplifying units 101-1 to 101-3. The optical amplifier 101-1a has the same configuration as the TDFA 32 shown in FIG. 11 except that the TDF 62, the LD 65, the LD driving circuit. 66, the operation unit 68, the FBGs 76 and 77, and the PDs 64 and 67 are not provided. The same applies to the other optical amplifiers 101-2a and 101-3a. The WDM optical signals in the respective bands whose optical powers have been adjusted by the respective optical amplifiers 101-1a to 101-3a are input to respective gain equalizers 101-1b to 101-3b. The gain equalizers 101-1b to 101-3b almost flatten the gains of the WDM optical signals in the respective bands. The resulting WDM optical signals in the respective bands are input to a WDM coupler 35, where they are wavelength-multiplexed and thereby returned to a three-wavelength-band WDM optical signal, which is transmitted to the next-stage repeater.

The composite optical amplifying apparatus of FIG. 15B is composed of optical amplifiers 103-1 to 103-3 and gain equalizers 104-1 to 104-3 all of which are independent optical parts. The optical amplifiers 103-1 to 103-3 correspond to the optical amplifiers 101-1a to 101-3a in FIG. 15A and the gain equalizers 104-1 to 104-3 correspond to the gain equalizers 101-1b to 101-3b in FIG. 15A.

The fifth to seventh embodiments were directed to the case where the composite optical amplifying apparatus is fixed in the number of wavelength bands in constructing an optical system. However, by providing optical adapters for each of the WDM couplers 31 and 35, the fifth to seventh embodiments can adapt to a case of decreasing or increasing the number of wavelength bands after construction of an optical system.

To enable attachment/detachment of optical amplifiers, as shown in FIGS. 16A and 16B, optical adapters 106-1 to 106-3 are provided between the WDM coupler 31 and the TDFA 32, EDFA 33, and GS-EDFA 34 and optical adapters 107-1 to 107-3 are provided between the TDFA 32, EDFA 33, and GS-EDFA 34 and the WDM coupler 35. The contents of the ROM 51 in the monitoring/control circuit 38 are written in accordance with decrease or increase in the number of wavelength bands.

The fifth embodiment was directed to the case of handling a three-wavelength-band WDM optical signal, and the seventh embodiment was directed to the case of handling a two-wavelength-band WDM optical signal. However, the invention is not limited to such cases and can be applied to a case of handling an n-wavelength-band WDM optical signal of an arbitrary number of wavelength bands.

Figure 21:
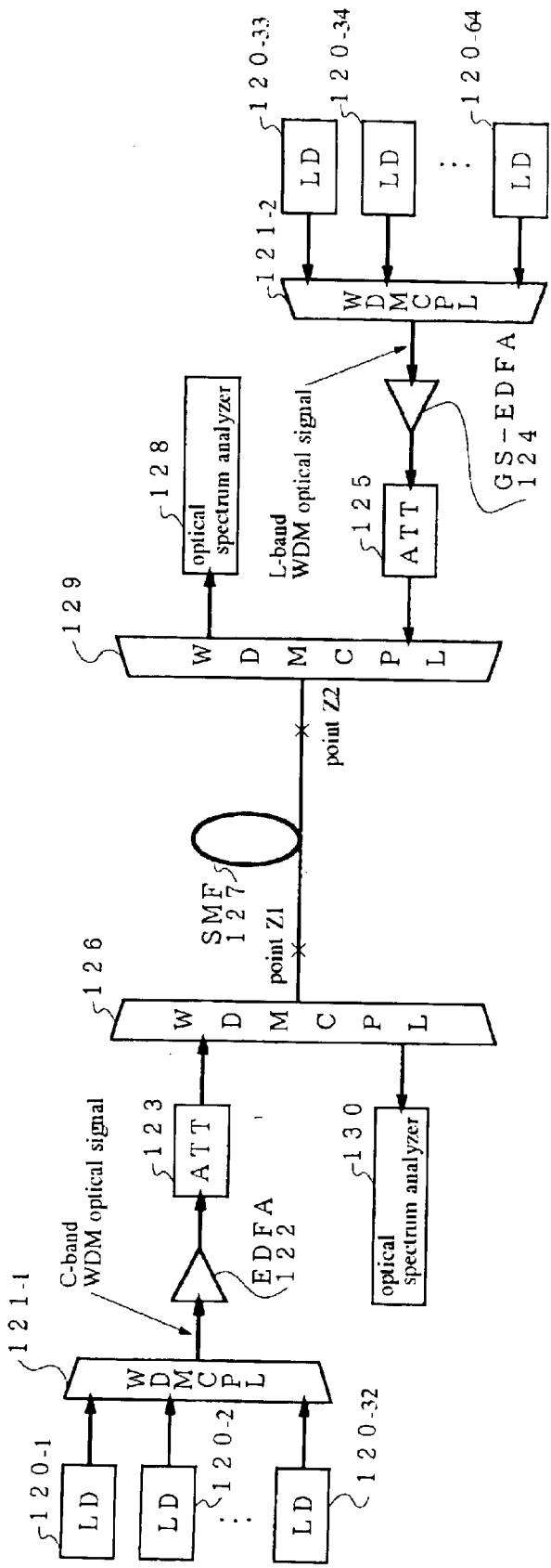
FIG. 21 is a block diagram of a measurement system for measuring a gain gradient due to stimulated Raman scattering in bidirectional transmission.
Figure 22:
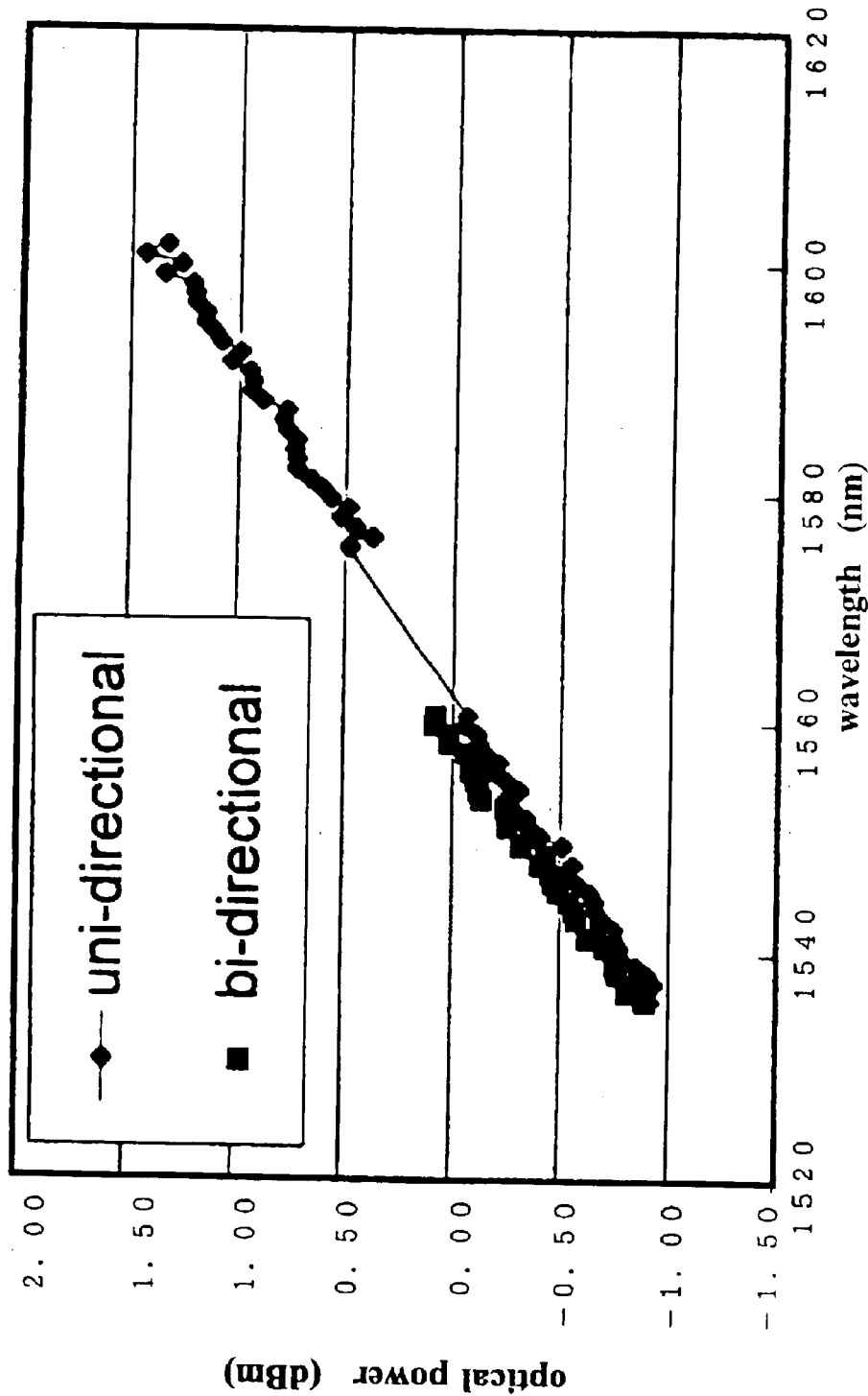
FIG. 22 is a graph showing Raman gains in the case of bidirectional transmission and Raman gains in the case of unidirectional transmission.
Figure 23:
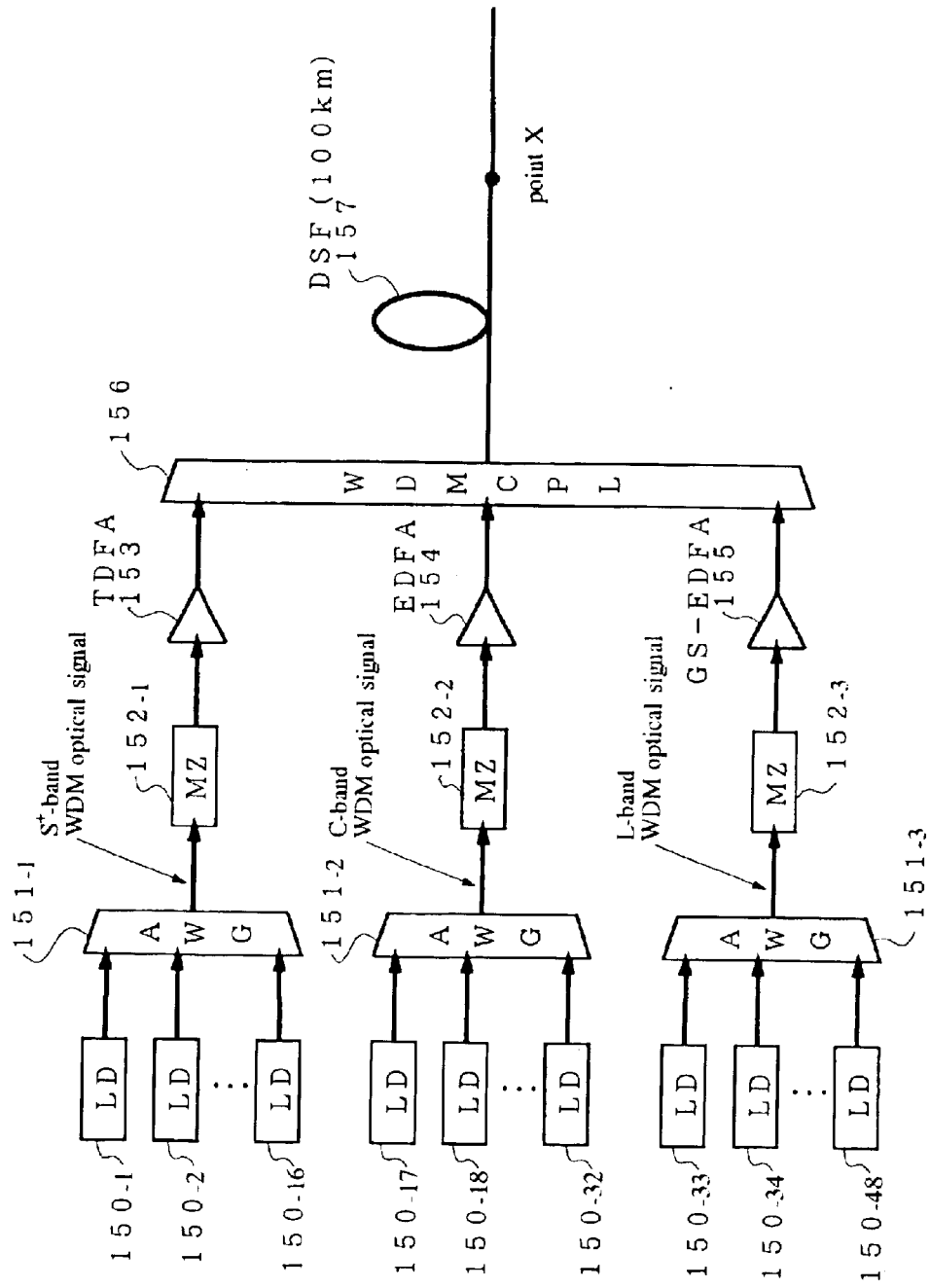
FIG. 23 is a block diagram of a three-wavelength-band WDM transmission system that relates to the invention.

The fifth to seventh embodiments were directed to the case of unidirectional transmission in which WDM optical signals in respective wavelength bands are transmitted in the same direction. However, the invention can also be applied to the case of bidirectional transmission because same results are obtained in unidirectional transmission and bidirectional transmission as was described with reference to FIGS. 21 and 22.

The invention is not limited to the above embodiments and various modifications may be made without departing from the spirit and scope of the invention. Any improvement may be made in part or all of the components.

What is claimed is:

1. An optical amplifying apparatus comprising:
    at least two mutually exclusive wavelength bands, each having at least two channels;
    a plurality of optical adjusting means provided for the respective wavelength bands, for adjusting average optical power per single wavelength channel of light beams, and wavelengths of the respective wavelength bands having approximately equal channel powers;
    wavelength-multiplexing means for wavelength multiplexing outputs of said respective optical adjusting means; and
    controlling means for performing control so that an output of optical adjusting means for adjusting average optical power per single wavelength channel of shorter-wavelength-band light among said plurality of optical adjusting means becomes larger than an output of optical adjusting means for adjusting average optical power per single wavelength channel of longer-wavelength-band light among said plurality of optical adjusting means, and approximate channel powers of the shorter wavelength band light is greater than approximate channel powers of the longer wavelength band light.

2. The optical amplifying apparatus according to claim 1, further comprising:
    wavelength-demultiplexing means for wavelength-demultiplexing input light into light beams in respective wavelength bands; and
    outputting each of the light beams in the respective wavelength bands to said respective optical adjusting means.

3. The optical amplifying apparatus according to claim 2, further comprising an optical transmission line connected to said wavelength-demultiplexing means for transmitting said input light, and a light source for supplying light to said optical transmission line.

4. The optical amplifying apparatus according to claim 2, wherein said controlling means determines a difference between the output of said optical adjusting means for adjusting the average optical power per single wavelength channel of said shorter-wavelength-band light and the output of said optical adjusting means for adjusting the average optical power per single wavelength channel of said longer-wavelength-band light based on at least one of stimulated Raman scattering in an optical transmission line connected to an output side of said optical amplifying apparatus, a loss in said optical transmission line, a loss in said wavelength-demultiplexing means, and a loss in said wavelength-multiplexing means.

5. The optical amplifying apparatus according to claim 1, wherein said controlling means further controls the outputs of said respective optical adjusting means so that average optical power per single wavelength channel of the respective wavelength bands at a predetermined point will become approximately identical when output light of the wavelength-multiplexing means travels to the predetermined point.

6. The optical amplifying apparatus according to claim 5, further comprising detecting means for detecting said optical powers of said respective wavelength bands at said predetermined point, wherein
    said controlling means further controls the outputs of said respective optical adjusting means based on an output of the detecting means.

7. The optical amplifying apparatus according to claim 6, wherein said light beams are WDM optical signals, and wherein
    said detecting means detects optical power of one of the WDM optical signals that corresponds to a shortest-wavelength channel.

8. The optical amplifying apparatus according to claim 1, wherein said controlling means further controls the outputs of said respective optical adjusting means so that powers calculated by subtracting noise powers in the respective optical adjusting means from average optical power per single wavelength channel of said respective wavelength bands at a predetermined point will become approximately identical when output light of the wavelength-multiplexing means travels to the predetermined point.

9. The optical amplifying apparatus according to claim 8, further comprising detecting means for detecting said optical powers of said respective wavelength bands at said predetermined point, wherein
    said controlling means further controls the outputs of said respective optical adjusting means based on an output of said detecting means.

10. The optical amplifying apparatus according to claim 9, wherein said light beams are WDM optical signals, and wherein
    said detecting means detects optical power of one of the WDM optical signals that corresponds to a shortest-wavelength channel.

11. The optical amplifying apparatus according to claim 1, further comprising a light source for supplying light to respective input light beams of said plurality of optical adjusting means.

12. The optical amplifying apparatus according to claim 1, wherein said light beams are a WDM optical signal in a first wavelength band and a WDM optical signal in a second wavelength band having longer wavelength than the first wavelength band, and wherein the number of channels of the WDM optical signal in the first wavelength band is increased or decreased.

13. The optical amplifying apparatus according to claim 1, wherein said light beams are a WDM optical signal in a first wavelength band and a WDM optical signal in a second wavelength band having longer wavelength than the first wavelength band, and wherein the number of channels of the WDM optical signal in the second wavelength band is increased or decreased.

14. The optical amplifying apparatus according to claim 1, wherein said plurality of optical adjusting means are optical amplifiers for amplifying said light beams.

15. The optical amplifying apparatus according to claim 1, wherein said plurality of optical adjusting means are optical attenuators for attenuating said light beams.

16. The optical amplifying apparatus according to claim 1, wherein
said controlling means performs control based on a result of calculating an average output power per single wavelength channel by dividing a total optical output power of each monitored adjusting means by a number of transmitted wavelengths in a wavelength band of an optical signal output from the wavelength-multiplexing means, notified from a predetermined point on an optical path, and comparing the product between each wavelength band.

17. The optical amplifying apparatus according to claim 1, wherein
said controlling means controls output power per each single wavelength channel in the shorter wavelength band to be larger than output power per each single wavelength channel in the longer wavelength band, by relatively changing a total output power of the optical adjusting means when a change in number of transmitted wavelengths occur.

18. An optical sending apparatus comprising:
at least two mutually exclusive wavelength bands, each having at least two channels;
a plurality of optical sending means provided for the respective wavelength bands, and for generating WDM optical signals in the respective wavelength bands, wavelengths of the respective wavelength bands having approximately equal channel powers;
a plurality of optical adjusting means connected to said respective optical sending means, for adjusting optical powers of light beams;
wavelength-multiplexing means for wavelength-multiplexing outputs of said respective optical adjusting means for the respective wavelength bands; and
controlling means for performing control so that an output of optical adjusting means for adjusting average optical power per single wavelength channel of shorter-wavelength-band light among said plurality of optical adjusting means becomes larger than an output of optical adjusting means for adjusting average optical power per single wavelength channel of longer-wavelength-band light among said plurality of optical adjusting means, and approximate channel powers of the shorter wavelength band light is greater than approximate channel powers of the longer wavelength band light.

19. The optical sending apparatus according to claim 18, wherein said controlling means further controls the outputs of said respective optical adjusting means so that average optical power per single wavelength channel of the respective wavelength bands at a predetermined point will become approximately identical when output light of said wavelength-multiplexing means travels to the predetermined point.

20. The optical sending apparatus according to claim 19, further comprising detecting means for detecting said optical powers of said respective wavelength bands at said predetermined point, wherein
said controlling means further controls the outputs of said respective optical adjusting means based on an output of said detecting means.

21. The optical sending apparatus according to claim 20, wherein said detecting means detects optical power of one of the WDM optical signals that corresponds to a shortest-wavelength channel.

22. The optical sending apparatus according to claim 18, wherein said controlling means further controls the outputs of said respective optical adjusting means so that powers obtained by eliminating noise powers in said respective optical adjusting means from average optical power per single wavelength channel of the respective wavelength bands at a predetermined point will become approximately identical when output light of said wavelength-multiplexing means travels to the predetermined point.

23. The optical sending apparatus according to claim 22, further comprising detecting means for detecting one of said optical powers of said respective wavelength bands at said predetermined point, wherein
said controlling means further controls the outputs of said respective optical adjusting means based on an output of said detecting means.

24. The optical sending apparatus according to claim 23, wherein said detecting means detects optical power of one of the WDM optical signals that corresponds to a shortest-wavelength channel.

25. The optical sending apparatus according to claim 18, wherein said controlling means determines a difference between the output of said optical adjusting means for adjusting the optical power of said shorter-wavelength-band light and the output of said optical adjusting means for adjusting the optical power of said longer-wavelength-band light based on at least one of stimulated Raman scattering in an optical transmission line connected to an output side of said optical sending apparatus, a loss in said optical transmission line, and a loss in said wavelength-multiplexing means.

26. The optical sending apparatus according to claim 18, wherein said WDM optical signals in the respective wavelength bands are a WDM optical signal in a first wavelength band and a WDM optical signal in a second wavelength band having longer wavelengths than the first wavelength band, and wherein
the number of channels of said WDM optical signal in the first wavelength band is increased or decreased.

27. The optical sending apparatus according to claim 18, wherein said WDM optical signals in the respective wavelength bands are a WDM optical signal in a first wavelength band and a WDM optical signal in a second wavelength band having longer wavelengths than the first wavelength band, and wherein the number of channels of said WDM optical signal in the second wavelength band is increased or decreased.

28. The optical sending apparatus according to claim 18, wherein each of said plurality of optical sending means generates each WDM optical signal respectively in each of said plurality of wavelength bands by generating a plurality of optical signals having different optical powers and wavelength-multiplexing said plurality of optical signals on a wavelength band basis.

29. The optical sending apparatus according to claim 18, wherein said plurality of optical adjusting means are optical amplifiers for amplifying light beams.

30. The optical sending apparatus according to claim 18, wherein said plurality of optical adjusting means are optical attenuators for attenuating light beams.

31. An optical transmission system comprising:
an optical sending apparatus generating an optical signal of a plurality of wavelength bands;
an optical transmission line transmitting the generated said optical signal;
an optical receiving apparatus receiving and processing said optical signal transmitted through said optical transmission line; and at least one optical amplifying apparatus provided on the optical transmission line, comprising:

wavelength-demultiplexing means for wavelength-demultiplexing said optical signal on a wavelength band basis;

at least two mutually exclusive wavelength bands, each having at least two channels;

a plurality of optical adjusting means for adjusting optical powers of each said optical signal in the respective wavelength bands, that are output from said wavelength-demultiplexing means, and wavelengths of the respective wavelength bands having approximately equal channel powers;

wavelength-multiplexing means for wavelength-multiplexing outputs of said respective optical adjusting means; and controlling means for performing control so that an output of optical adjusting means for adjusting average optical power per single wavelength channel of shorter-wavelength-band light among said plurality of optical adjusting means becomes larger than an output of optical adjusting means for adjusting average optical power per single wavelength channel of longer-wavelength-band light among said plurality of optical adjusting means, and approximate channel powers of the shorter wavelength band light is greater than approximate channel powers of the longer wavelength band light.

32. The optical transmission system according to claim 31, wherein said controlling means of said optical amplifying apparatus further controls the outputs of said respective optical adjusting means so that average optical power per single wavelength channel of the optical signals in the respective wavelength bands at a predetermined point will become approximately identical when an output optical signal of said optical amplifying apparatus travels to the predetermined point.

33. The optical transmission system according to claim 31, wherein said controlling means of said optical amplifying apparatus further controls the outputs of said respective optical adjusting means so that powers obtained by eliminating noise powers in said respective optical adjusting means from average optical power per single wavelength channel of the optical signals in said respective wavelength bands at a predetermined point will become approximately identical when an output optical signal of said optical amplifying apparatus travels to the predetermined point.

34. The optical transmission system according to claim 31, wherein said optical amplifying apparatus further comprises a light source for supplying light to an optical transmission line through which an input optical signal is transmitted.

35. The optical transmission system according to claim 31, wherein said optical sending apparatus generates said optical signal of said plurality of wavelength bands by generating said plurality of optical signals having different optical powers and wavelength-multiplexing the plurality of optical signals on a wavelength band basis.

36. The optical transmission system according to claim 31, wherein said optical receiving apparatus comprises a spectrum detecting section for detecting a spectrum of the optical signal and outputting a result of said detection to the optical sending apparatus, and wherein said optical sending apparatus generates said optical signal of said plurality of wavelength bands by generating sets of optical signals having different optical powers based on the detection result of the spectrum detecting section and wavelength-multiplexing the sets of optical signals on a wavelength band basis.

37. The optical transmission system according to claim 31, wherein said plurality of optical adjusting means of the optical amplifying apparatus are optical amplifiers for amplifying optical signals.

38. The optical sending apparatus according to claim 31, wherein said plurality of optical adjusting means of the optical amplifying apparatus are optical attenuators for attenuating optical signals.

39. A method of amplifying light comprising:

providing at least two mutually exclusive wavelength bands, each having at least two channels, and wavelengths of the respective wavelength bands having approximately equal channel powers;

amplifying light in a longer-wavelength band among a plurality of wavelength bands;

amplifying light in a shorter-wavelength band among said plurality of wavelength bands to have average optical power per single wavelength channel that is larger than average optical power per single wavelength channel of the amplified light in the longer-wavelength band, wherein approximate channel powers of the shorter wavelength band is greater than approximate channel powers of the longer wavelength band; and wavelength-multiplexing light beams of the plurality of wavelength bands.

40. The optical amplifying method according to claim 39, further comprising determining a difference between an amplification output of the light in said shorter-wavelength band and an amplification output of the light in said longer-wavelength band so that average optical power per single wavelength channel of the respective wavelength bands at a predetermined point will become approximately identical when wavelength-multiplexed light of the said plurality of wavelength bands travels to the predetermined point, and wherein said amplifying amplifies said light in the shorter-wavelength band so that it will have average optical power per single wavelength channel that is larger than average optical power per single wavelength channel of amplified light in said longer-wavelength band by said difference.

41. A method of amplifying light comprising:

generating a plurality of optical signals having different optical powers;

generating a plurality of WDM optical signals by wavelength-multiplexing said plurality of optical signals on a wavelength band basis;

providing at least two mutually exclusive wavelength bands, each having at least two channels, and wavelengths of the respective wavelength bands having approximately equal channel powers;

amplifying a WDM optical signal in a longer-wavelength band among the plurality of WDM optical signals;

controlling an optical gain of respective said wavelength bands to have average optical power per single wavelength channel that is larger than average optical power per single wavelength channel of the amplified WDM optical signal in said longer-wavelength band, wherein approximate channel powers of the respective wavelength bands are greater than approximate channel powers of said longer wavelength band; and wavelength-multiplexing said plurality of WDM optical signals.

42. The optical amplifying method according to claim 41, further comprising determining a difference between an amplification output of the WDM optical signal in said shorter-wavelength band and an amplification output of the WDM optical signal in said longer-wavelength band so that average optical power per single wavelength channel of the respective WDM optical signals at a predetermined point will become approximately identical when a wavelength-multiplexed optical signal of the plurality of WDM optical signals travels to the predetermined point, and wherein said amplifying amplifies the WDM optical signal in said shorter-wavelength band so that it will have average optical power per single wavelength channel that is larger than average optical power per single wavelength channel of amplified light in the longer-wavelength band by said difference.

43. A method of inputting light comprising:

providing at least two mutually exclusive wavelength bands, each having at least two channels, and wavelengths of the respective wavelength bands having approximately equal channel powers;

making average optical power per single wavelength channel of a WDM optical signal in a shorter-wavelength band larger than average optical power per single wavelength channel of a WDM optical signal in a longer-wavelength band among a plurality of WDM optical signals in respective wavelength bands, wherein approximate channel powers of the shorter wavelength band is greater than approximate channel powers of the longer wavelength band; and inputting said plurality of WDM optical signals in the respective wavelength bands to an optical transmission line.

44. An optical amplifying apparatus comprising:

a wavelength demultiplexing unit to wavelength demultiplex optical signal light into light beams of respective wavelength bands;

at least two mutually exclusive wavelength bands, each having at least two channels;

a plurality of optical adjusting units provided for the respective wavelength bands, to individually adjust average optical power per single wavelength channel of the light beams, and wavelengths of the respective wavelength bands having approximate equal channel powers;

a wavelength multiplexing unit to wavelength multiplex outputs of the respective optical adjusting units; and a control unit to perform control of the optical adjusting units so that an output of a respective optical adjusting unit for adjusting average optical power per single wavelength channel of shorter-wavelength-band light among the plurality of optical adjusting units becomes larger than an output of a respective optical adjusting unit for adjusting average optical power per single wavelength channel of longer-wavelength-band light among the plurality of optical adjusting units, and approximate channel powers of the shorter wavelength band light is greater than approximate channel powers of the longer wavelength band light.

45. An optical transmission system comprising:

an optical sending device to generate optical signal light of a plurality of wavelength bands;

an optical transmission line to transmit the optical signal light;

an optical receiving device to receive and process the optical signal light transmitted through the optical transmission line; and at least one optical amplifying device provided on the optical transmission line, comprising:

a wavelength demultiplexing unit to wavelength demultiplex the optical signal light into light beams of the respective wavelength bands;

at least two mutually exclusive wavelength bands, each having at least two channels;

a plurality of optical adjusting units provided for the respective wavelength bands, to individually adjust optical powers of the light beams, and wavelengths of the respective wavelength bands having approximate equal channel powers;

a wavelength multiplexing unit to wavelength multiplex outputs of the respective optical adjusting units; and a control unit to perform control of the optical adjusting units so that an output of a respective optical adjusting unit for adjusting average optical power per single wavelength channel of shorter-wavelength-band light among the plurality of optical adjusting units becomes larger than an output of a respective optical adjusting unit for adjusting average optical power per single wavelength channel of longer-wavelength-band light among the plurality of optical adjusting units, and approximate channel powers of the shorter wavelength band light is greater than approximate channel powers of the longer wavelength band light.

* * * * *